(12) United States Patent
Zhang et al.

(10) Patent No.: US 10,263,895 B2
(45) Date of Patent: Apr. 16, 2019

(54) DATA TRANSMISSION METHOD, CENTRAL PROCESSING NODE, GATEWAY, AND BASE STATION

(71) Applicant: HUAWEI TECHNOLOGIES CO., LTD., Guangdong (CN)

(72) Inventors: Jinfang Zhang, Shanghai (CN); Bojie Li, Shanghai (CN); Lu Rong, Guangdong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 150 days.

(21) Appl. No.: 15/390,002

(22) Filed: Dec. 23, 2016

(65) Prior Publication Data

US 2017/0111280 A1 Apr. 20, 2017

Related U.S. Application Data

(63) Continuation of application No. PCT/CN2014/080484, filed on Jun. 23, 2014.

(51) Int. Cl.
*H04L 12/803* (2013.01)
*H04W 28/16* (2009.01)
(Continued)

(52) U.S. Cl.
CPC ....... *H04L 47/122* (2013.01); *H04W 28/0289* (2013.01); *H04W 28/12* (2013.01);
(Continued)

(58) Field of Classification Search
None
See application file for complete search history.

(56) References Cited

U.S. PATENT DOCUMENTS 9,253,097 B1 * 2/2016 Barman .............. H04L 47/122
2011/0218003 A1 9/2011 Qiu
(Continued)

FOREIGN PATENT DOCUMENTS

CN 101299876 A 11/2008
CN 102904908 A 1/2013
(Continued)

OTHER PUBLICATIONS

Stefan Brueck, et al: "Centralized Scheduling for Joint Transmission Coordinated Multi-Point in LTE-Advanced", 2010 International ITG Workshop on Smart Antennas (WSA 2010), 8 Pages.

*Primary Examiner* — Christine T Duong
(74) *Attorney, Agent, or Firm* — Kilpatrick Townsend & Stockton LLP

(57) ABSTRACT

The present disclosure provide a data transmission method, including: receiving, by a central processing node, downlink user data from a first gateway GW; sending, by the central processing node, the downlink user data to a corresponding base station; and when it is determined that an interface between the central processing node and the first GW is congested, sending, by the central processing node, a first bearer switching request message to the first GW, where the first bearer switching request message is used to instruct the first GW to bypass the central processing node when transmitting data. In the embodiments of the present invention, when determining that an interface between a central processing node and a first GW is congested, the central processing node sends a first bearer switching request message to the first GW, so that the first GW transmits downlink user data with the central processing node bypassed.

17 Claims, 16 Drawing Sheets

(51) Int. Cl.
*H04W 28/02* (2009.01)
*H04W 28/12* (2009.01)
*H04W 84/04* (2009.01)
*H04W 88/16* (2009.01)
*H04W 88/08* (2009.01)

(52) U.S. Cl.
CPC .......... *H04W 28/16* (2013.01); *H04W 84/042* (2013.01); *H04W 88/085* (2013.01); *H04W 88/16* (2013.01)

(56) References Cited

U.S. PATENT DOCUMENTS

2014/0036815 A1* 2/2014 Lei .................. H04B 7/024
370/329
2015/0222522 A1* 8/2015 Lingafelt ............. H04L 45/02
370/392

FOREIGN PATENT DOCUMENTS

| CN | 103327630 A | 9/2013 |
| CN | 103841605 A | 6/2014 |
| WO | 2012106966 A1 | 8/2012 |

* cited by examiner

DATA TRANSMISSION METHOD, CENTRAL PROCESSING NODE, GATEWAY, AND BASE STATION

CROSS-REFERENCE TO RELATED APPLICATIONS

This application is a continuation of International Application No. PCT/CN2014/080484, filed on Jun. 23, 2014, the disclosure of which is hereby incorporated by reference in its entirety.

TECHNICAL FIELD

Embodiments of the present invention relate to the communications field, and more specifically, to a data transmission method, a central processing node, a gateway, and a base station.

BACKGROUND

Coordinated multipoint transmission/reception (Coordinated Multi-Point transmission and reception, CoMP) is a technology that is provided in Long Term Evolution (Long Term Evolution-Advanced, LTE-A) and that can effectively improve a system capacity of a wireless network. Coordinated scheduling and joint coding and decoding are performed for user data involved in CoMP, which can effectively improve an interference characteristic of a cell edge user, and can improve transmission efficiency for the cell edge user so as to improve transmission efficiency of an entire system.

For a CoMP application mode such as coordinated scheduling (Coordinated Scheduling, CS) or joint processing (Joint Processing, JP), uplink and downlink CoMP user data is generally aggregated to one central processing node for processing. Processing performed on CoMP user data by the central processing node includes scheduling, joint coding, joint decoding, or the like.

In a cloud radio access network (Cloud Radio Access Network, CRAN) architecture shown in FIG. 1, a central processing node is located in a baseband processing unit center (Base Band Unit center, BBU center), and the central processing node is connected to multiple remote radio units (Remote Radio Unit, RRU) by using a common public radio interface (Common Public Radio Interface, CPRI). The RRU has a radio frequency function. An IQ baseband signal is transmitted between the BBU center and each RRU, and a data transmission amount is relatively large. User data in a coverage area of each RRU needs to be received or sent by using an S1 interface of the BBU center; therefore, a transmission bottleneck is likely to result.

In a hybrid layer 1 (Hybrid L1) architecture shown in FIG. 2, a central processing node is located in a BBU center, and is connected to multiple evolved RRUs (evolved RRU, eRRU) by using a packet transport network (Packet Transport Network, PTN). The eRRU has a radio frequency function and a baseband compression function. Therefore, a baseband signal is transmitted between the BBU center and the eRRU after being compressed, which can reduce a data transmission amount compared with a CRAN. However, CoMP user data in a coverage area of each eRRU still needs to be received or sent by using an S1 interface of the BBU center; therefore, a transmission bottleneck is still present.

SUMMARY

Embodiments of the present invention provide a data transmission method, and can avoid a transmission bottleneck of a central processing node.

According to a first aspect, a data transmission method is provided, and the method includes: receiving, by a central processing node, downlink user data from a first gateway GW; sending, by the central processing node, the downlink user data to a corresponding base station; and when it is determined that an interface between the central processing node and the first GW is congested, sending, by the central processing node, a first bearer switching request message to the first GW, where the first bearer switching request message is used to instruct the first GW to bypass the central processing node when transmitting data.

With reference to the first aspect, in a first possible implementation manner of the first aspect, the downlink user data includes downlink non-coordinated multipoint transmission/reception CoMP user data and downlink CoMP user data; and the sending, by the central processing node, the downlink user data to a corresponding base station includes: sending, by the central processing node, the downlink non-CoMP user data to a first base station, and sending the downlink CoMP user data to at least two base stations, where the first base station is a base station serving a target user of the downlink non-CoMP user data, the at least two base stations are configured to send the downlink CoMP user data in a coordinated manner, and the first bearer switching request message is specifically used to instruct the first GW to bypass the central processing node when transmitting the downlink non-CoMP user data to the first base station.

With reference to the first possible implementation manner of the first aspect, in a second possible implementation manner of the first aspect, the downlink CoMP user data includes first downlink CoMP user data and second downlink CoMP user data; the sending the downlink CoMP user data to at least two base stations includes: sending the first downlink CoMP user data to at least two second-base-stations, and sending the second downlink CoMP user data to at least two third-base-stations, where the at least two second-base-stations are configured to send the first downlink CoMP user data in a coordinated manner, and the at least two third-base-stations are configured to send the second downlink CoMP user data in a coordinated manner; and after the sending, by the central processing node, a first bearer switching request message to the first GW, the method further includes: when it is determined that the interface is still congested, sending, by the central processing node, a second bearer switching request message to the first GW, where the second bearer switching request message is used to instruct the first GW to bypass the central processing node when transmitting the first downlink CoMP user data to the at least two second-base-stations.

With reference to the second possible implementation manner of the first aspect, in a third possible implementation manner of the first aspect, k number of second-base-stations in the at least two second-base-stations are connected to a second GW, the second bearer switching request message is specifically used to instruct the first GW to transmit the first downlink CoMP user data to another base station in the at least two second-base-stations than the k number of second-base-stations with the central processing node bypassed, and is further used to instruct the first GW to generate a forwarding bearer from the first GW to the second GW and send the first downlink CoMP user data to the second GW on the forwarding bearer, and the method further includes: sending, by the central processing node, a bearer generation request message to the second GW, where the bearer generation request message includes identification information of the k number of second-base-stations, and the bearer generation request message is used to instruct the second GW to generate bearers from the second GW to the k number of second-base-stations, so that the second GW transmits, to the k number of second-base-stations, on the bearers with the central processing node bypassed, the first downlink CoMP user data received from the first GW, where k is a positive integer.

With reference to the first aspect, in a fourth possible implementation manner of the first aspect, the downlink user data is downlink CoMP user data, and the downlink CoMP user data includes first downlink CoMP user data and second downlink CoMP user data; and the sending, by the central processing node, the downlink user data to a corresponding base station includes: sending, by the central processing node, the first downlink CoMP user data to at least two second-base-stations, and sending the second downlink CoMP user data to at least two third-base-stations, where the at least two second-base-stations are configured to send the first downlink CoMP user data in a coordinated manner, the at least two third-base-stations are configured to send the second downlink CoMP user data in a coordinated manner, and the first bearer switching request message is specifically used to instruct the first GW to bypass the central processing node when transmitting the first downlink CoMP user data to the at least two second-base-stations.

With reference to the fourth possible implementation manner of the first aspect, in a fifth possible implementation manner of the first aspect, k number of second-base-stations in the at least two second-base-stations are connected to a second GW, the first bearer switching request message is specifically used to instruct the first GW to transmit the first downlink CoMP user data to another base station in the at least two second-base-stations than the k number of second-base-stations with the central processing node bypassed, and is further used to instruct the first GW to generate a forwarding bearer from the first GW to the second GW and send the first downlink CoMP user data to the second GW on the forwarding bearer, and the method further includes: sending, by the central processing node, a bearer generation request message to the second GW, where the bearer generation request message includes identification information of the k number of second-base-stations, and the bearer generation request message is used to instruct the second GW to generate bearers from the second GW to the k number of second-base-stations, so that the second GW transmits, to the k number of second-base-stations, on the bearers with the central processing node bypassed, the first downlink CoMP user data received from the first GW, where k is a positive integer.

With reference to any possible implementation manner in the second possible implementation manner of the first aspect to the fifth possible implementation manner of the first aspect, in a sixth possible implementation manner of the first aspect, the method further includes: receiving, by the central processing node, a downlink scheduling request message sent by a serving base station that is of a target user of the first downlink CoMP user data and that is in the at least two second-base-stations; and performing, by the central processing node, downlink scheduling, and sending a scheduling result to the at least two second-base-stations, where the scheduling result includes at least one of the following: Radio Link Control RLC segmentation information, coding and modulation information, or transmit power.

With reference to the sixth possible implementation manner of the first aspect, in a seventh possible implementation manner of the first aspect, the method further includes: receiving, by the central processing node, an ACK message sent by the base station serving the target user of the first downlink CoMP user data; and sending, by the central processing node, a first message to the at least two second-base-stations, where the first message is used to instruct the at least two second-base-stations to delete a data copy of the first downlink CoMP user data.

With reference to the sixth possible implementation manner of the first aspect, in an eighth possible implementation manner of the first aspect, the method further includes: receiving, by the central processing node, a NACK message sent by the base station serving the target user of the first downlink CoMP user data; and when a quantity of retransmissions does not reach a preset maximum quantity of retransmissions, sending, by the central processing node, a retransmission scheduling acknowledgement message to the at least two second-base-stations, where the retransmission scheduling acknowledgement message is used to instruct the at least two second-base-stations to send the first downlink CoMP user data in a coordinated manner again; or when a quantity of retransmissions reaches a preset maximum quantity of retransmissions, sending, by the central processing node, a first message to the at least two second-base-stations, where the first message is used to instruct the at least two second-base-stations to delete a data copy of the first downlink CoMP user data.

With reference to the first aspect or any one of the foregoing possible implementation manners of the first aspect, in a ninth possible implementation manner of the first aspect, the method further includes: when it is determined that the interface is idle, sending, by the central processing node, a third bearer switching request message to the first GW, where the third bearer switching request message is used to instruct the first GW to transmit the downlink user data to the corresponding base station by way of the central processing node.

According to a second aspect, a data transmission method is provided, and the method includes: receiving, by a central processing node, uplink user data, where the uplink user data includes uplink non-coordinated multipoint transmission/reception CoMP user data sent by a first base station; sending, by the central processing node, the uplink user data to a first gateway GW; and when it is determined that an interface between the central processing node and the first GW is congested, sending, by the central processing node, a first bearer switching request message to the first base station, where the first bearer switching request message is used to instruct the first base station to transmit the uplink non-CoMP user data to the first GW with the central processing node bypassed.

With reference to the second aspect, in a first possible implementation manner of the second aspect, the uplink user data further includes uplink CoMP user data; and the receiving, by a central processing node, uplink user data includes: receiving, by the central processing node, the uplink non-CoMP user data from the first base station, and receiving the uplink CoMP user data from at least two second-base-stations.

With reference to the second aspect or the first possible implementation manner of the second aspect, in a second possible implementation manner of the second aspect, the method further includes: when it is determined that the interface is idle, sending, by the central processing node, a second bearer switching request message to the first base station, where the second bearer switching request message is used to instruct the first base station to transmit the uplink non-CoMP user data to the first GW by way of the central processing node.

According to a third aspect, a data transmission method is provided, and the method includes: sending, by a first device, user data to a central processing node, so that the central processing node sends the user data to a second device; receiving, by the first device, a first bearer switching request message sent by the central processing node, where the first bearer switching request message is used to instruct the first device to bypass the central processing node when transmitting data; and sending, by the first device, the user data to the second device according to the first bearer switching request message.

With reference to the third aspect, in a first possible implementation manner of the third aspect, the first device is a first gateway GW, and the second device is a base station corresponding to the user data.

With reference to the first possible implementation manner of the third aspect, in a second possible implementation manner of the third aspect, the user data includes downlink non-coordinated multipoint transmission/reception CoMP user data and downlink CoMP user data, the first bearer switching request message is specifically used to instruct the first device to bypass the central processing node when transmitting the downlink non-CoMP user data to a first base station, and the first base station is a base station serving a target user of the downlink non-CoMP user data; and the sending, by the first device, the user data to the second device according to the first bearer switching request message includes: transmitting, by the first device, the downlink non-CoMP user data to the first base station with the central processing node bypassed, and sending the downlink CoMP user data to the central processing node, so that the central processing node sends the downlink CoMP user data to at least two base stations, where the at least two base stations are configured to send the downlink CoMP user data in a coordinated manner, and the second device includes the first base station and the at least two base stations.

With reference to the second possible implementation manner of the third aspect, in a third possible implementation manner of the third aspect, the downlink CoMP user data includes first downlink CoMP user data and second downlink CoMP user data, and the method further includes: receiving, by the first device, a second bearer switching request message sent by the central processing node, where the second bearer switching request message is used to instruct the first device to transmit the first downlink CoMP user data to at least two second-base-stations with the central processing node bypassed; and transmitting, by the first device according to the second bearer switching request message, the first downlink CoMP user data to the at least two second-base-stations with the central processing node bypassed, and sending the second downlink CoMP user data to the central processing node, so that the central processing node sends the second downlink CoMP user data to at least two third-base-stations, where the at least two base stations include the at least two second-base-stations and the at least two third-base-stations, the at least two second-base-stations are configured to send the first downlink CoMP user data in a coordinated manner, and the at least two third-base-stations are configured to send the second downlink CoMP user data in a coordinated manner.

With reference to the third possible implementation manner of the third aspect, in a fourth possible implementation manner of the third aspect, k number of second-base-stations in the at least two second-base-stations are connected to a second GW, and the second bearer switching request message is specifically used to instruct the first GW to transmit the first downlink CoMP user data to another base station in the at least two second-base-stations than the k number of second-base-stations with the central processing node bypassed, and is further used to instruct the first GW to generate a forwarding bearer from the first GW to the second GW and send the first downlink CoMP user data to the second GW on the forwarding bearer; and the transmitting the first downlink CoMP user data to the at least two second-base-stations with the central processing node bypassed includes: transmitting the first downlink CoMP user data to the another base station in the at least two second-base-stations than the k number of second-base-stations with the central processing node bypassed, and sending the first downlink CoMP user data to the second GW on the forwarding bearer, so that the second GW transmits the first downlink CoMP user data to the k number of second-base-stations with the central processing node bypassed, where k is a positive integer.

With reference to the first possible implementation manner of the third aspect, in a fifth possible implementation manner of the third aspect, the user data is downlink CoMP user data, the downlink CoMP user data includes first downlink CoMP user data and second downlink CoMP user data, and the first bearer switching request message is specifically used to instruct the first GW to bypass the central processing node when transmitting the first downlink CoMP user data to the at least two second-base-stations; and the sending, by the first device, the user data to the second device according to the first bearer switching request message includes: transmitting, by the first device, the first downlink CoMP user data to the at least two second-base-stations with the central processing node bypassed, and sending the second downlink CoMP user data to the central processing node, so that the central processing node sends the second downlink CoMP user data to at least two third-base-stations, where the second device includes the at least two second-base-stations and the at least two third-base-stations, the at least two second-base-stations are configured to send the first downlink CoMP user data in a coordinated manner, and the at least two third-base-stations are configured to send the second downlink CoMP user data in a coordinated manner.

With reference to the fifth possible implementation manner of the third aspect, in a sixth possible implementation manner of the third aspect, k number of second-base-stations in the at least two second-base-stations are connected to a second GW, and the first bearer switching request message is specifically used to instruct the first GW to transmit the first downlink CoMP user data to another base station in the at least two second-base-stations than the k number of second-base-stations with the central processing node bypassed, and is further used to instruct the first GW to generate a forwarding bearer from the first GW to the second GW and send the first downlink CoMP user data to the second GW on the forwarding bearer; and the transmitting the first downlink CoMP user data to the at least two second-base-stations with the central processing node bypassed includes: transmitting the first downlink CoMP user data to the another base station in the at least two second-base-stations than the k number of second-base-stations with the central processing node bypassed, and sending the first downlink CoMP user data to the second GW on the forwarding bearer, so that the second GW transmits the first downlink CoMP user data to the k number of second-base-stations with the central processing node bypassed, where k is a positive integer.

With reference to the third aspect, in a seventh possible implementation manner of the third aspect, the first device is a first base station, the second device is a first GW, the user data includes uplink non-CoMP user data, and the first bearer switching request message is specifically used to instruct the first device to transmit the uplink non-CoMP user data to the second device with the central processing node bypassed; and the sending, by the first device, the user data to the second device according to the first bearer switching request message includes: transmitting, by the first device, the uplink non-CoMP user data to the second device with the central processing node bypassed.

With reference to the seventh possible implementation manner of the third aspect, in an eighth possible implementation manner of the third aspect, the user data further includes uplink CoMP user data, and the sending, by the first device, the user data to the second device according to the first bearer switching request message further includes: sending, by the first device, the uplink CoMP user data to the central processing node in a coordinated manner together with at least one base station, so that the central processing node sends the uplink CoMP user data to the second device, where the first device and the at least one base station are configured to send the uplink CoMP user data in a coordinated manner.

With reference to the third aspect or any one of the foregoing possible implementation manners of the third aspect, in a ninth possible implementation manner of the third aspect, the method further includes: receiving, by the first device, a third bearer switching request message sent by the central processing node, where the second bearer switching request message is used to instruct the first device to transmit data by way of the central processing node; and sending, by the first device, the user data to the second device according to the second bearer switching request message.

According to a fourth aspect, a data transmission method is provided, and the method includes: receiving, by a base station, downlink coordinated multipoint transmission/reception CoMP user data sent by a gateway GW; sending, by the base station, a downlink scheduling request message to a central processing node, where the downlink scheduling request message is used to request the central processing node to perform downlink scheduling; receiving, by the base station, a scheduling result sent by the central processing node, where the scheduling result includes at least one of the following: Radio Link Control RLC segmentation information, coding and modulation information, or transmit power; and sending, by the base station, the downlink CoMP user data in a coordinated manner together with at least one base station according to the scheduling result, where the base station is a base station serving a target user of the downlink CoMP user data.

With reference to the fourth aspect, in a first possible implementation manner of the fourth aspect, the method further includes: sending, by the base station, an ACK message to the central processing node; receiving, by the base station, a first message sent by the central processing node, where the first message is used to instruct the base station to delete a data copy of the downlink CoMP user data; and deleting, by the base station, the data copy of the downlink CoMP user data.

With reference to the fourth aspect, in a second possible implementation manner of the fourth aspect, the method further includes: sending, by the base station, a NACK message to the central processing node; receiving, by the base station, a retransmission scheduling acknowledgment message or a first message sent by the central processing node, where the retransmission scheduling acknowledgement message is used to instruct the base station to send the downlink CoMP user data in a coordinated manner together with the at least one base station again, and the first message is used to instruct the base station to delete a data copy of the downlink CoMP user data; and sending, by the base station, the downlink CoMP user data in a coordinated manner together with the at least one base station again according to the retransmission scheduling acknowledgement message; or deleting, by the base station, the data copy of the downlink CoMP user data according to the first message.

According to a fifth aspect, a central processing node is provided, and the central processing node includes: a receiving unit, configured to receive downlink user data from a first gateway GW; and a sending unit, configured to send, to a corresponding base station, the downlink user data received by the receiving unit, where the sending unit is further configured to: when it is determined that an interface between the central processing node and the first GW is congested, send a first bearer switching request message to the first GW, where the first bearer switching request message is used to instruct the first GW to bypass the central processing node when transmitting data.

With reference to the fifth aspect, in a first possible implementation manner of the fifth aspect, the downlink user data includes downlink non-coordinated multipoint transmission/reception CoMP user data and downlink CoMP user data; and the sending unit is specifically configured to: send the downlink non-CoMP user data to a first base station, and send the downlink CoMP user data to at least two base stations, where the first base station is a base station serving a target user of the downlink non-CoMP user data, the at least two base stations are configured to send the downlink CoMP user data in a coordinated manner, and the first bearer switching request message is specifically used to instruct the first GW to bypass the central processing node when transmitting the downlink non-CoMP user data to the first base station.

With reference to the first possible implementation manner of the fifth aspect, in a second possible implementation manner of the fifth aspect, the downlink CoMP user data includes first downlink CoMP user data and second downlink CoMP user data; the sending the downlink CoMP user data to at least two base stations includes: sending the first downlink CoMP user data to at least two second-base-stations, and sending the second downlink CoMP user data to at least two third-base-stations, where the at least two second-base-stations are configured to send the first downlink CoMP user data in a coordinated manner, and the at least two third-base-stations are configured to send the second downlink CoMP user data in a coordinated manner; and the sending unit is further configured to: when it is determined that the interface is still congested, send a second bearer switching request message to the first GW, where the second bearer switching request message is used to instruct the first GW to bypass the central processing node when transmitting the first downlink CoMP user data to the at least two second-base-stations.

With reference to the second possible implementation manner of the fifth aspect, in a third possible implementation manner of the fifth aspect, k number of second-base-stations in the at least two second-base-stations are connected to a second GW, and the second bearer switching request message is specifically used to instruct the first GW to transmit the first downlink CoMP user data to another base station in the at least two second-base-stations than the k number of second-base-stations with the central processing node bypassed, and is further used to instruct the first GW to generate a forwarding bearer from the first GW to the second GW and send the first downlink CoMP user data to the second GW on the forwarding bearer; and the sending unit is further configured to send a bearer generation request message to the second GW, where the bearer generation request message includes identification information of the k number of second-base-stations, and the bearer generation request message is used to instruct the second GW to generate bearers from the second GW to the k number of second-base-stations, so that the second GW transmits, to the k number of second-base-stations, on the bearers with the central processing node bypassed, the first downlink CoMP user data received from the first GW, where k is a positive integer.

With reference to the fifth aspect, in a fourth possible implementation manner of the fifth aspect, the downlink user data is downlink CoMP user data, and the downlink CoMP user data includes first downlink CoMP user data and second downlink CoMP user data; and the sending unit is specifically configured to: send the first downlink CoMP user data to at least two second-base-stations, and send the second downlink CoMP user data to at least two third-base-stations, where the at least two second-base-stations are configured to send the first downlink CoMP user data in a coordinated manner, the at least two third-base-stations are configured to send the second downlink CoMP user data in a coordinated manner, and the first bearer switching request message is specifically used to instruct the first GW to bypass the central processing node when transmitting the first downlink CoMP user data to the at least two second-base-stations.

With reference to the fourth possible implementation manner of the fifth aspect, in a fifth possible implementation manner of the fifth aspect, k number of second-base-stations in the at least two second-base-stations are connected to a second GW, and the first bearer switching request message is specifically used to instruct the first GW to transmit the first downlink CoMP user data to another base station in the at least two second-base-stations than the k number of second-base-stations with the central processing node bypassed, and is further used to instruct the first GW to generate a forwarding bearer from the first GW to the second GW and send the first downlink CoMP user data to the second GW on the forwarding bearer; and the sending unit is further configured to send a bearer generation request message to the second GW, where the bearer generation request message includes identification information of the k number of second-base-stations, and the bearer generation request message is used to instruct the second GW to generate bearers from the second GW to the k number of second-base-stations, so that the second GW transmits, to the k number of second-base-stations, on the bearers with the central processing node bypassed, the first downlink CoMP user data received from the first GW, where k is a positive integer.

With reference to any possible implementation manner in the second possible implementation manner of the fifth aspect to the fifth possible implementation manner of the fifth aspect, in a sixth possible implementation manner of the fifth aspect, the central processing node further includes a processing unit; the receiving unit is further configured to receive a downlink scheduling request message sent by a serving base station that is of a target user of the first downlink CoMP user data and that is in the at least two second-base-stations; the processing unit is configured to perform downlink scheduling; and the sending unit is further configured to send a scheduling result of the processing node to the at least two second-base-stations, where the scheduling result includes at least one of the following: Radio Link Control RLC segmentation information, coding and modulation information, or transmit power.

With reference to the sixth possible implementation manner of the fifth aspect, in a seventh possible implementation manner of the fifth aspect, the receiving unit is further configured to receive an ACK message sent by the base station serving the target user of the first downlink CoMP user data; and the sending unit is further configured to send a first message to the at least two second-base-stations, where the first message is used to instruct the at least two second-base-stations to delete a data copy of the first downlink CoMP user data.

With reference to the sixth possible implementation manner of the fifth aspect, in an eighth possible implementation manner of the fifth aspect, the receiving unit is further configured to receive a NACK message sent by the base station serving the target user of the first downlink CoMP user data; and the sending unit is further configured to: when a quantity of retransmissions does not reach a preset maximum quantity of retransmissions, send a retransmission scheduling acknowledgement message to the at least two second-base-stations, where the retransmission scheduling acknowledgement message is used to instruct the at least two second-base-stations to send the first downlink CoMP user data in a coordinated manner again; or when a quantity of retransmissions reaches a preset maximum quantity of retransmissions, send a first message to the at least two second-base-stations, where the first message is used to instruct the at least two second-base-stations to delete a data copy of the first downlink CoMP user data.

With reference to the fifth aspect or any one of the foregoing possible implementation manners of the fifth aspect, in a ninth possible implementation manner of the fifth aspect, the sending unit is further configured to:
when it is determined that the interface is idle, send a third bearer switching request message to the first GW, where the third bearer switching request message is used to instruct the first GW to transmit the downlink user data to the corresponding base station by way of the central processing node.

According to a sixth aspect, a central processing node is provided, and the central processing node includes: a receiving unit, configured to receive uplink user data, where the uplink user data includes uplink non-coordinated multipoint transmission/reception CoMP user data sent by a first base station; and a sending unit, configured to send, to a first gateway GW, the uplink user data received by the receiving unit, where the sending unit is further configured to: when it is determined that an interface between the central processing node and the first GW is congested, send a first bearer switching request message to the first base station, where the first bearer switching request message is used to instruct the first base station to transmit the uplink non-CoMP user data to the first GW with the central processing node bypassed.

With reference to the sixth aspect, in a first possible implementation manner of the sixth aspect, the uplink user data further includes uplink CoMP user data; and the receiving unit is specifically configured to: receive the uplink non-CoMP user data from the first base station, and receive the uplink CoMP user data from at least two second-base-stations.

With reference to the sixth aspect or the first possible implementation manner of the sixth aspect, in a second possible implementation manner of the sixth aspect, the sending unit is further configured to: when it is determined that the interface is idle, send a second bearer switching request message to the first base station, where the second bearer switching request message is used to instruct the first base station to transmit the uplink non-CoMP user data to the first GW by way of the central processing node.

According to a seventh aspect, a first device is provided, and the first device includes: a sending unit, configured to send user data to a central processing node, so that the central processing node sends the user data to a second device; and a receiving unit, configured to receive a first bearer switching request message sent by the central processing node, where the first bearer switching request message is used to instruct the first device to bypass the central processing node when transmitting data, and the sending unit is further configured to send the user data to the second device according to the first bearer switching request message received by the receiving unit.

With reference to the seventh aspect, in a first possible implementation manner of the seventh aspect, the first device is a first gateway GW, and the second device is a base station corresponding to the user data.

With reference to the first possible implementation manner of the seventh aspect, in a second possible implementation manner of the seventh aspect, the user data includes downlink non-coordinated multipoint transmission/reception CoMP user data and downlink CoMP user data, the first bearer switching request message is specifically used to instruct the first device to bypass the central processing node when transmitting the downlink non-CoMP user data to a first base station, and the first base station is a base station serving a target user of the downlink non-CoMP user data; and the sending unit is specifically configured to: bypass the central processing node when transmitting the downlink non-CoMP user data to the first base station, and send the downlink CoMP user data to the central processing node, so that the central processing node sends the downlink CoMP user data to at least two base stations, where the at least two base stations are configured to send the downlink CoMP user data in a coordinated manner, and the second device includes the first base station and the at least two base stations.

With reference to the second possible implementation manner of the seventh aspect, in a third possible implementation manner of the seventh aspect, the downlink CoMP user data includes first downlink CoMP user data and second downlink CoMP user data; the receiving unit is further configured to receive a second bearer switching request message sent by the central processing node, where the second bearer switching request message is used to instruct the first device to transmit the first downlink CoMP user data to at least two second-base-stations with the central processing node bypassed; and the sending unit is further configured to: transmit, according to the second bearer switching request message received by the receiving unit, the first downlink CoMP user data to the at least two second-base-stations with the central processing node bypassed, and send the second downlink CoMP user data to the central processing node, so that the central processing node sends the second downlink CoMP user data to at least two third-base-stations, where the at least two base stations include the at least two second-base-stations and the at least two third-base-stations, the at least two second-base-stations are configured to send the first downlink CoMP user data in a coordinated manner, and the at least two third-base-stations are configured to send the second downlink CoMP user data in a coordinated manner.

With reference to the third possible implementation manner of the seventh aspect, in a fourth possible implementation manner of the seventh aspect, k number of second-base-stations in the at least two second-base-stations are connected to a second GW, and the second bearer switching request message is specifically used to instruct the first GW to transmit the first downlink CoMP user data to another base station in the at least two second-base-stations than the k number of second-base-stations with the central processing node bypassed, and is further used to instruct the first GW to generate a forwarding bearer from the first GW to the second GW and send the first downlink CoMP user data to the second GW on the forwarding bearer; and the transmitting the first downlink CoMP user data to the at least two second-base-stations with the central processing node bypassed includes: transmitting the first downlink CoMP user data to the another base station in the at least two second-base-stations than the k number of second-base-stations with the central processing node bypassed, and sending the first downlink CoMP user data to the second GW on the forwarding bearer, so that the second GW transmits the first downlink CoMP user data to the k number of second-base-stations with the central processing node bypassed, where k is a positive integer.

With reference to the first possible implementation manner of the seventh aspect, in a fifth possible implementation manner of the seventh aspect, the user data is downlink CoMP user data, the downlink CoMP user data includes first downlink CoMP user data and second downlink CoMP user data, and the first bearer switching request message is specifically used to instruct the first GW to bypass the central processing node when transmitting the first downlink CoMP user data to the at least two second-base-stations; and the sending unit is specifically configured to: bypass the central processing node when transmitting the first downlink CoMP user data to the at least two second-base-stations, and send the second downlink CoMP user data to the central processing node, so that the central processing node sends the second downlink CoMP user data to at least two third-base-stations, where the second device includes the at least two second-base-stations and the at least two third-base-stations, the at least two second-base-stations are configured to send the first downlink CoMP user data in a coordinated manner, and the at least two third-base-stations are configured to send the second downlink CoMP user data in a coordinated manner.

With reference to the fifth possible implementation manner of the seventh aspect, in a sixth possible implementation manner of the seventh aspect, k number of second-base-stations in the at least two second-base-stations are connected to a second GW, and the first bearer switching request message is specifically used to instruct the first GW to transmit the first downlink CoMP user data to another base station in the at least two second-base-stations than the k number of second-base-stations with the central processing node bypassed, and is further used to instruct the first GW to generate a forwarding bearer from the first GW to the second GW and send the first downlink CoMP user data to the second GW on the forwarding bearer; and the transmitting the first downlink CoMP user data to the at least two second-base-stations with the central processing node bypassed includes: transmitting the first downlink CoMP user data to the another base station in the at least two second-base-stations than the k number of second-base-stations with the central processing node bypassed, and sending the first downlink CoMP user data to the second GW on the forwarding bearer, so that the second GW transmits the first downlink CoMP user data to the k number of second-base-stations with the central processing node bypassed, where k is a positive integer.

With reference to the seventh aspect, in a seventh possible implementation manner of the seventh aspect, the first device is a first base station, the second device is a first GW, the user data includes uplink non-CoMP user data, and the first bearer switching request message is specifically used to instruct the first device to transmit the uplink non-CoMP user data to the second device with the central processing node bypassed; and the sending unit is specifically configured to transmit the uplink non-CoMP user data to the second device with the central processing node bypassed.

With reference to the seventh possible implementation manner of the seventh aspect, in an eighth possible implementation manner of the seventh aspect, the user data further includes uplink CoMP user data; and the sending unit is further configured to send the uplink CoMP user data to the central processing node in a coordinated manner together with at least one base station, so that the central processing node sends the uplink CoMP user data to the second device, where the first device and the at least one base station are configured to send the uplink CoMP user data in a coordinated manner.

With reference to the seventh aspect or any one of the foregoing possible implementation manners of the seventh aspect, in a ninth possible implementation manner of the seventh aspect, the receiving unit is further configured to receive a third bearer switching request message sent by the central processing node, where the second bearer switching request message is used to instruct the first device to transmit data by way of the central processing node; and the sending unit is further configured to send the user data to the second device according to the second bearer switching request message received by the receiving unit.

According to an eighth aspect, a base station is provided, and the base station includes: a receiving unit, configured to receive downlink coordinated multipoint transmission/reception CoMP user data sent by a gateway GW; and a sending unit, configured to send a downlink scheduling request message to a central processing node, where the downlink scheduling request message is used to request the central processing node to perform downlink scheduling, the receiving unit is further configured to receive a scheduling result sent by the central processing node, and the scheduling result includes at least one of the following: Radio Link Control RLC segmentation information, coding and modulation information, or transmit power; and the sending unit is further configured to send, in a coordinated manner together with at least one base station according to the scheduling result received by the receiving unit, the downlink CoMP user data received by the receiving unit, where the base station is a base station serving a target user of the downlink CoMP user data.

With reference to the eighth aspect, in a first possible implementation manner of the eighth aspect, the base station further includes a processing unit; the sending unit is further configured to send an ACK message to the central processing node; the receiving unit is further configured to receive a first message sent by the central processing node, where the first message is used to instruct the base station to delete a data copy of the downlink CoMP user data; and the processing unit is configured to delete the data copy of the downlink CoMP user data according to the first message received by the receiving unit.

With reference to the eighth aspect, in a second possible implementation manner of the eighth aspect, the base station further includes a processing unit; the sending unit is further configured to send a NACK message to the central processing node; the receiving unit is further configured to receive a retransmission scheduling acknowledgment message or a first message sent by the central processing node, where the retransmission scheduling acknowledgement message is used to instruct the base station to send the downlink CoMP user data in a coordinated manner together with the at least one base station again, and the first message is used to instruct the base station to delete a data copy of the downlink CoMP user data; and the processing unit is configured to send the downlink CoMP user data in a coordinated manner together with the at least one base station again according to the retransmission scheduling acknowledgement message received by the receiving unit; or delete the data copy of the downlink CoMP user data according to the first message received by the receiving unit.

In the embodiments of the present invention, when determining that an interface between a central processing node and a first GW is congested, the central processing node sends a first bearer switching request message to the first GW, so that the first GW transmits downlink user data with the central processing node bypassed. In this way, data traffic on the interface between the central processing node and the first GW can be reduced, and further, a congestion state of the interface can be relieved or eliminated.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
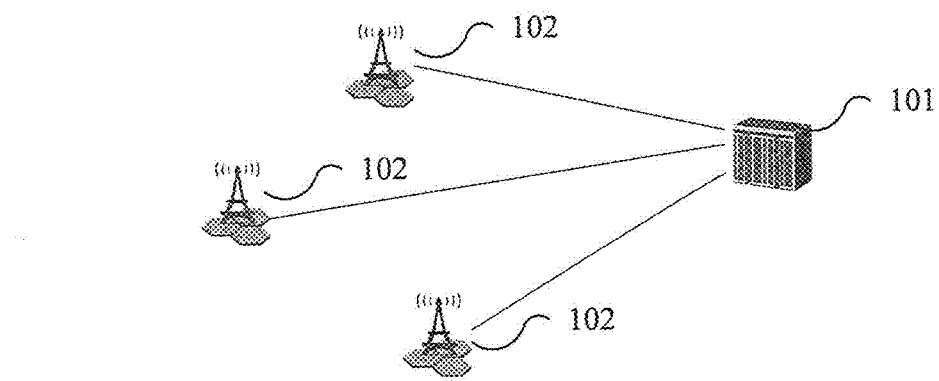
FIG. 1 is a schematic diagram of a cloud radio access network architecture.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed by various computer-readable media that store various data structures. The components may communicate by using a local and/or remote process and according to a signal containing one or more data packets (for example, data from two components interacting with another component in a local system, a distributed system, and/or another network, such as the Internet for interacting with another system by using the signal).

In addition, the embodiments are described with reference to a base station. The base station may be used to communicate with a mobile device. The base station may be a base transceiver station (Base Transceiver Station, BTS) in the Global System for Mobile Communications (Global System of Mobile communication, GSM) or Code Division Multiple Access (Code Division Multiple Access, CDMA), or may be a NodeB (NodeB, NB) in Wideband Code Division Multiple Access (Wideband Code Division Multiple Access, WCDMA), or may be an evolved NodeB (Evolutional Node B, eNB or eNodeB) in Long Term Evolution (Long Term Evolution, LTE), a relay station or an access point, a base station device in a future 5G network, or the like. In addition, the embodiments are described with reference to an access terminal. The access terminal may also be referred to as a system, a subscriber unit, a subscriber station, a mobile station, a mobile station, a remote station, a remote terminal, a mobile device, a user terminal, a terminal, a wireless communications device, user agent, a user apparatus, or user equipment (User Equipment, UE). The access terminal may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a computing device, or another processing device connected to a wireless modem.

In addition, aspects or features of the present invention may be implemented as a method, an apparatus or a product that uses standard programming and/or engineering technologies. The term "product" used in this application covers a computer program that can be accessed from any computer readable component, carrier, or medium. For example, the computer-readable medium may include but is not limited to: a magnetic storage component (for example, a hard disk, a floppy disk, or a magnetic tape), an optical disc (for example, a compact disc (Compact Disk, CD) or a digital versatile disc (Digital Versatile Disk, DVD)), a smart card, and a flash memory component (for example, an erasable programmable read-only memory (Erasable Programmable Read-Only Memory, EPROM), a card, a stick, or a key drive). In addition, various storage media described in this specification may indicate one or more devices and/or other machine-readable media that is used to store information. The term "machine readable media" may include but is not limited to a radio channel, and various other media that can store, contain, and/or carry an instruction and/or data.

FIG. 1 is a schematic diagram of a cloud radio access network architecture. The CRAN architecture in FIG. 1 includes a BBU center 101 and RRUs 102. The RRU 102 and the BBU center 101 are interconnected by using a CPRI interface. A central processing node is located in the BBU center.

All user data, including CoMP user data and non-CoMP user data of each RRU 102, in a coverage area of each RRU 102 needs to be received or sent by using an S1 interface of the BBU center 101. Therefore, a transmission bottleneck of the S1 interface is likely to result.

Figure 2:
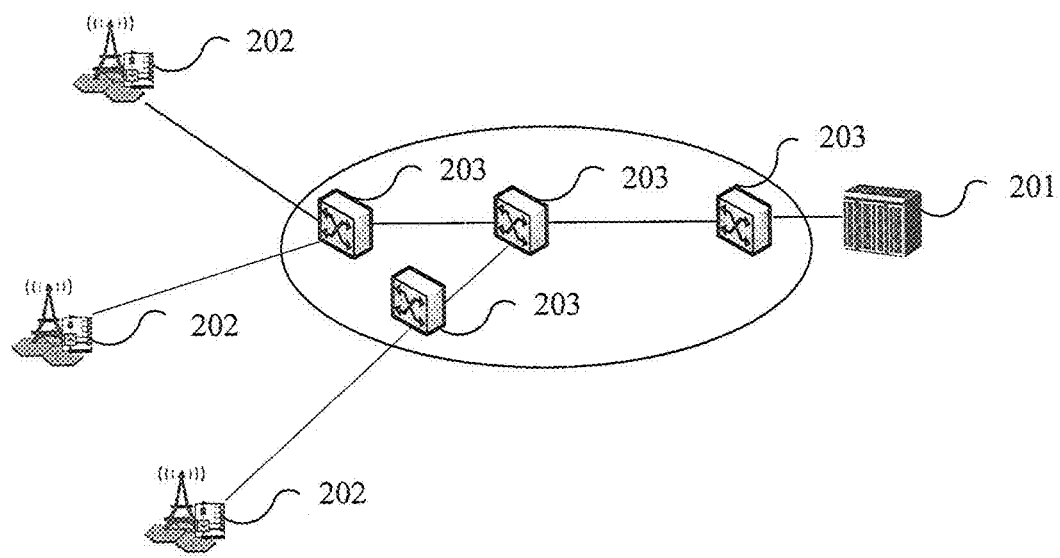
FIG. 2 is a schematic diagram of a Hybrid L1 architecture.

FIG. 2 is a schematic diagram of a Hybrid L1 architecture. The Hybrid L1 architecture in FIG. 2 includes a BBU center 201, base stations 202, and switching devices 203. The base station 202 is connected to the BBU center 201 by using a PTN. The PTN may include at least one switching device 203. The base station 202 may be an eRRU, and a central processing node is located in the BBU center. Downlink CoMP user data is first transmitted from a core network (not shown in FIG. 2) to the central processing node, and then is transmitted from the central processing node to each coordinating base station by using the PTN. Uplink CoMP user data is transmitted from each coordinating base station to the central processing node by using the PTN, and then is transmitted from the central processing node to the core network. The central processing node is connected to the core network by using an S1 interface; therefore, a transmission bottleneck of the S1 interface of the central processing node is likely to result.

Figure 3:
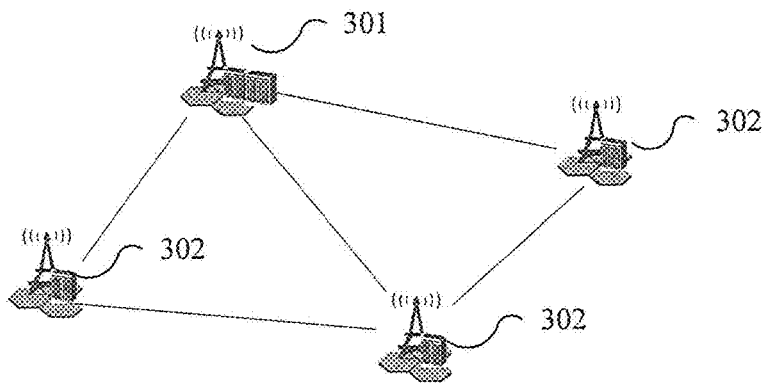
FIG. 3 is a schematic diagram of an application scenario according to an embodiment of the present invention.

FIG. 3 is a schematic diagram of an application scenario according to an embodiment of the present invention. The scenario shown in FIG. 3 is a distributed architecture that includes a central processing node 301 and base stations 302. The base stations 302 are interconnected by using e-X2, and the central processing node 301 and the base station 302 are interconnected by using e-X2. It should be noted that the central processing node shown in FIG. 3 may be a base station. For example, the central processing node may be a macro base station.

Generally, downlink CoMP user data is first transmitted from a core network (not shown in FIG. 3) to the central processing node 301, and then is transmitted from the central processing node 301 to each coordinating base station 302.

Downlink non-CoMP user data may be transmitted from the core network (not shown in FIG. 3) to the central processing node 301, and then is transmitted from the central processing node 301 to a base station serving a target user of the downlink non-CoMP user data; or downlink non-CoMP user data may be directly transmitted from the core network (not shown in FIG. 3) to a base station serving a target user of the downlink non-CoMP user data.

Uplink CoMP user data is transmitted from each coordinating base station 302 to the central processing node 301, and then is transmitted from the central processing node 301 to the core network.

Uplink non-CoMP user data may be transmitted from a base station to the central processing node 301, and then is transmitted from the central processing node 301 to the core network (not shown in FIG. 3); or uplink non-CoMP user data may be directly transmitted from a base station to the core network (not shown in FIG. 3).

When there is relatively heavy data traffic of transmission between the central processing node 301 and the core network, an interface between the central processing node 301 and the core network may be congested, and further, a transmission bottleneck of the interface is caused. For example, the interface between the central processing node 301 and the core network may be an S1 interface.

For the scenario shown in FIG. 3, the embodiments of the present invention propose a data transmission method, which can avoid a transmission bottleneck of an interface between a central processing node and a core network.

It should be noted that, in the embodiments of the present invention, a gateway (Gateway, GW) is used as an edge node in the core network.

It should be noted that, in the embodiments of the present invention, the central processing node is a logical unit, and the central processing node may be located in a BBU center, or the central processing node may be a base station that is in a distributed architecture and that provides a central processing node function. The present invention sets no limitation thereon.

In the embodiments of the present invention, a connection between the central processing node and each base station is over a customized interface. Specifically, the interface between the central processing node and each base station is a non-S1 interface, for example, may be an X2 interface, an eX2 interface, an Ethernet interface, or the like.

In the embodiments of the present invention, the central processing node and the core network are interconnected by using an S1 interface, and each base station and the core network are interconnected by using an S1 interface. It should be noted that the S1 interface is a logical interface.

In the embodiments of the present invention, the base station has L2 (data link layer) and L1 (physical layer) data processing functions. For example, the base station has functions of an L2 protocol stack including the Packet Data Convergence Protocol (Packet Data Convergence Protocol, PDCP), the Radio Link Control layer (Radio Link Control, RLC), and the Medium Access Control layer (Medium Access Control, MAC).

The central processing node has complete base station functions of L3 (radio resource control) to L1. For example, the central processing node has not only the L2 protocol stack functions such as PDCP, RLC, and MAC, but also L2 scheduling and downlink hybrid automatic repeat request (Hybrid Automatic Repeat reQuest, HARQ) entity maintenance functions.

Figure 4:
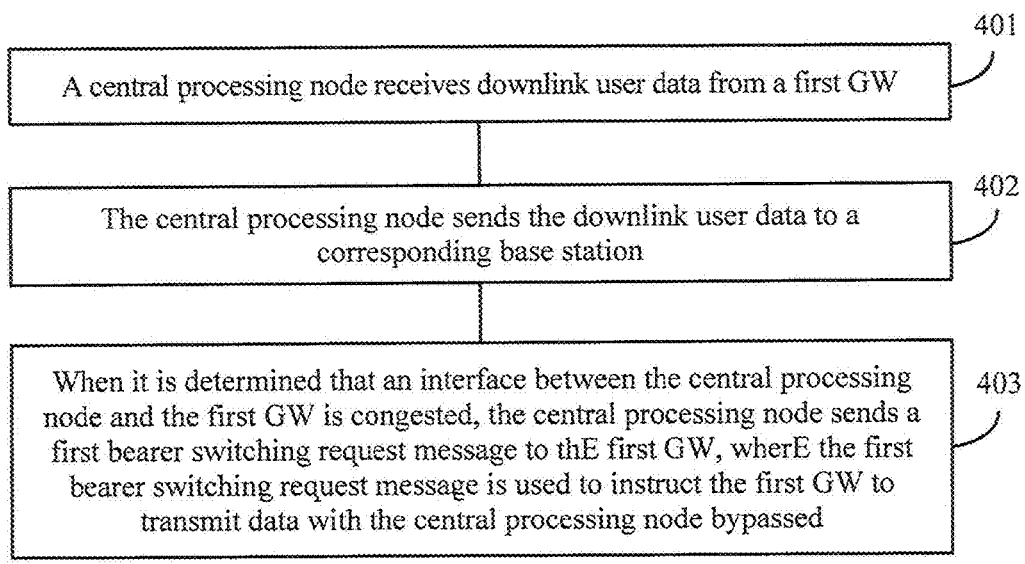
FIG. 4 is a flowchart of a data transmission method according to an embodiment of the present invention.

FIG. 4 is a flowchart of a data transmission method according to an embodiment of the present invention. The method shown in FIG. 4 includes:

401. A central processing node receives downlink user data from a first GW.

402. The central processing node sends the downlink user data to a corresponding base station.

403. When it is determined that an interface between the central processing node and the first GW is congested, the central processing node sends a first bearer switching request message to the first GW, where the first bearer switching request message is used to instruct the first GW to bypass the central processing node when transmitting data.

In this embodiment of the present invention, when determining that an interface between a central processing node and a first GW is congested, the central processing node sends a first bearer switching request message to the first GW, so that the first GW transmits downlink user data with the central processing node bypassed. In this way, data traffic on the interface between the central processing node and the first GW can be reduced, further, a congestion state of the interface can be relieved or eliminated, and a transmission bottleneck of the interface between the central processing node and the first GW can be effectively avoided.

It should be noted that, in this embodiment of the present invention, the interface between the central processing node and the first GW may be an S1 interface.

Specifically, in step 403, the central processing node may detect a status of the interface to determine that the interface is congested. The status of the interface may include bandwidth utilization of the interface. The central processing node may detect the status of the interface at a definite time or periodically. For example, detection may be performed at intervals of 15 minutes from 9 o'clock to 18 o'clock of a workday, or detection may be performed at intervals of 10 minutes from 20 o'clock to 24 o'clock every day, or detection may be performed with a cycle of 24 hours. The present invention sets no limitation thereon.

It should be noted that a method for detecting the status of the interface is not limited in this embodiment of the present invention. For example, the central processing node may directly detect the status of the interface between the central processing node and the first GW. For another example, the central processing node may, alternatively, detect a status of a link interface between the central processing node and each base station, and further perform calculation by using a specific algorithm, to obtain the status of the interface between the central processing node and the first GW. The present invention sets no limitation thereon.

It may be understood that, that the central processing node determines that the interface is congested may be that the central processing node learns, by means of detection, that the bandwidth utilization of the interface is always greater than a first threshold in a period of time. For example, the central processing node performs detection at intervals of one minute in consecutive ten minutes. If it is detected, in every time of detection, that the bandwidth utilization of the interface is greater than the first threshold, the central processing node may determine that the interface is congested. Alternatively, the central processing node may determine, according to the status of the interface by using another method, that the interface is congested. The present invention sets no limitation thereon.

It should be noted that, in this embodiment of the present invention, the first threshold may be predefined by an operator. The present invention sets no limitation thereon.

In this embodiment of the present invention, the downlink user data in step 401 may include downlink non-CoMP user data and/or downlink CoMP user data.

Specifically, in step 401, the central processing node receives the downlink user data from the first GW by using the interface.

It should be noted that, in this embodiment of the present invention, in step 403, that the central processing node sends a first bearer switching request message to the first GW may be that the central processing node directly sends the first bearer switching request message to the first GW, or may be that the central processing node indirectly sends the first bearer switching request message to the first GW, for example, may be that the central processing node sends the first bearer switching request message to a first mobility management entity (Mobility Management Entity, MME), and then, the first MME sends a bearer update request message to the first GW. The present invention sets no limitation thereon.

Optionally, in an embodiment, the downlink user data in step 401 includes the downlink non-CoMP user data and the downlink CoMP user data, and it may be understood that the first GW performs downlink transmission for both the downlink non-CoMP user data and the downlink CoMP user data, and transmission is by way of the central processing node in both cases.

Specifically, in step 402, the central processing node sends the downlink non-CoMP user data to a first base station, and sends the downlink CoMP user data to at least two base stations. The first base station is a base station serving a target user of the downlink non-CoMP user data, and the at least two base stations are configured to send the downlink CoMP user data in a coordinated manner.

The sending the downlink CoMP user data to at least two base stations may be that the central processing node performs joint precoding on the downlink CoMP user data, and then sends jointly-precoded downlink CoMP user data to the at least two base stations, so that the at least two base stations send the jointly-precoded downlink CoMP user data in a coordinated manner; or may be that the central processing node generates precoding control information according to the downlink CoMP user data, and then sends both the downlink CoMP user data and the precoding control information to the at least two base stations, so that the at least two base stations perform joint precoding on the downlink CoMP user data and send jointly-precoded downlink CoMP user data in a coordinated manner. The present invention sets no limitation thereon.

In addition, the first bearer switching request message in step 403 is specifically used to instruct the first GW to bypass the central processing node when transmitting the downlink non-CoMP user data to the first base station. The first bearer switching request message may carry identification information of the first base station. The identification information in this embodiment of the present invention may be a MAC address or a physical address, or may be other identification information. The present invention sets no limitation thereon.

In this way, after receiving the first bearer switching request message, the first GW may transmit, according to the first bearer switching request message, the downlink non-CoMP user data to the first base station with the central processing node bypassed. Specifically, the first GW may change a transmission route of the downlink non-CoMP user data, so that a forwarding path from the first GW to the first base station does not include the central processing node.

For example, if the central processing node receives the downlink non-CoMP user data directly from the first GW in step 401, after step 403, the first GW may change a next-hop address of a transmission path of the downlink non-CoMP user data to directly transmit the downlink non-CoMP user data to the first base station, which may mean that the downlink path of the downlink non-CoMP user data is switched to the first base station on a user plane of the first GW.

Optionally, the first GW may generate a bearer from the first GW to the first base station according to the identification information of the first base station that is carried in the first bearer switching request message, and transmit the downlink non-CoMP user data to the first base station on the bearer from the first GW to the first base station.

Optionally, after receiving the first bearer switching request message, the first GW may further release a bearer that is from the first GW to the central processing node and that is used for transmitting the downlink non-CoMP user data.

In this embodiment of the present invention, a first GW releases, in a timely manner, a bearer that is no longer used, which can avoid a resource waste and reduce resource occupation, and therefore, resource utilization can be improved.

Optionally, after receiving the first bearer switching request message, the first GW may further generate first indication information and send the first indication information to the central processing node. The first indication information is used to indicate that the first GW has stopped sending the downlink non-CoMP user data to the central processing node. It may be understood that the first indication information is an end marker (end marker). Specifically, the first indication information is an end marker of the process in which the first GW sends the downlink non-CoMP user data to the central processing node.

In this way, after step 403, the method in this embodiment of the present invention may further include: receiving, by the central processing node, the first indication information from the first GW. The first indication information is used to indicate that the first GW has stopped sending the downlink non-CoMP user data to the central processing node, that is, the central processing node has stopped receiving the downlink non-CoMP user data from the first GW.

Optionally, after receiving the first bearer switching request message, the first GW may also generate a first bearer switching response message and send the first bearer switching response message to the central processing node. It should be noted that, that the first GW sends the first bearer switching response message to the central processing node may be that the first GW directly sends the first bearer switching response message to the central processing node, or may be that the first GW indirectly sends the first bearer switching response message to the central processing node. For example, the indirect sending may be that the first GW sends a bearer update response message to the first MME, and then, the first MME sends the first bearer switching response message to the central processing node. The present invention sets no limitation thereon.

In this way, after step 403, the method in this embodiment of the present invention may further include: receiving, by the central processing node, the first bearer switching response message from the first GW.

Optionally, after step 403, the method in this embodiment of the present invention may further include: sending, by the central processing node to the first base station, downlink non-CoMP user data that has already been received from the first GW and that is stored in a buffer of the central processing node.

If the central processing node receives the first indication information from the first GW, the central processing node may subsequently send, to the first base station, the first indication information received from the first GW, where the first indication information is used to indicate that the central processing node has completed sending of the downlink non-CoMP user data that is received from the first GW and stored in the buffer of the central processing node. For example, the central processing node may add the first indication information to the last data packet of the downlink non-CoMP user data sent to the first base station. It may be understood that the first indication information sent by the central processing node to the first base station is an end marker of the process in which the central processing node sends the downlink non-CoMP user data to the first base station.

Further, after sending the first indication information to the first base station, the central processing node may further release a downlink transmission resource used for transmitting the downlink non-CoMP user data.

In this embodiment of the present invention, a central processing node releases, in a timely manner, a transmission resource that is no longer used, which can avoid a resource waste and reduce resource occupation, and therefore, resource utilization can be improved.

For the first base station, in step 402, it may be understood that the first base station receives the downlink non-CoMP user data from the central processing node. After step 403, the first base station receives the downlink non-CoMP user data from the first GW. In addition, the first base station also receives the downlink non-CoMP user data in the buffer of the central processing node from the central processing node. The downlink non-CoMP received by the first base station from the first GW may arrive at the first base station earlier than or at the same time as the downlink non-CoMP user data that is in the buffer and sent by the central processing node.

In this way, the first base station may first send, to the target user, the downlink non-CoMP user data received from the central processing node, and send, to the target user only after receiving the first indication information, the downlink non-CoMP user data received from the first GW. For example, if the last data packet sent by the central processing node to the first base station carries the first indication information, after obtaining the first indication information by means of parsing, the first base station may determine that a data packet that carries the first indication information is the last data packet sent by the central processing node, and then, the first base station may continue to parse the downlink non-CoMP user data received from the first GW.

It may be understood that, in this embodiment of the present invention, after step 403, the central processing node continues to receive the downlink CoMP user data from the first GW, and send the downlink CoMP user data to the at least two base stations. The at least two base stations are configured to send the downlink CoMP user data in a coordinated manner.

For the first GW, after step 403, the first GW still sends the downlink CoMP user data to the central processing node, so that the central processing node sends the downlink CoMP user data to the at least two base stations. The first GW sends subsequent downlink non-CoMP user data to the first base station with the central processing node bypassed.

In this way, after the foregoing embodiment, the first GW sends the downlink non-CoMP user data to the first base station with the central processing node bypassed. For example, the first GW may directly send the downlink non-CoMP user data to the first base station. It may be understood that the first GW may send the downlink non-CoMP user data to the first base station by using an interface between the first GW and the first base station. The interface between the first GW and the first base station may be an S1 interface. In addition, the first GW still sends the downlink CoMP user data to the central processing node, and the central processing node sends the downlink CoMP user data to the at least two base stations.

In the foregoing embodiment, when a central processing node determines that an interface between the central processing node and a first GW is congested, the central processing node sends a first bearer switching request message to the first GW, so that the first GW can transmit downlink non-CoMP user data to a corresponding base station with the central processing node bypassed. In this way, data traffic that passes through the interface between the central processing node and the first GW can be reduced, and a congestion state of the interface can be relieved or eliminated.

In addition, in the foregoing embodiment, downlink non-CoMP user data is transmitted with a central processing node bypassed, which can improve transmission efficiency of the downlink non-CoMP user data. In another aspect, downlink CoMP user data is still transmitted by way of the central processing node, which can ensure transmission efficiency of the downlink CoMP user data.

It should be noted that the foregoing embodiment is merely an embodiment of the present invention, and another embodiment obtained by a person of ordinary skill in the art based on the foregoing embodiment shall fall within the protection scope of the present invention.

For example, if the downlink non-CoMP user data includes first downlink non-CoMP user data and second downlink non-CoMP user data, in step 402, the central processing node sends the first downlink non-CoMP user data to a first base station A1, and sends the second downlink non-CoMP user data to a first base station A2. The first base station A1 is a base station serving a target user of the first downlink non-CoMP user data, and the first base station A2 is a base station serving a target user of the second downlink non-CoMP user data. Further, after receiving the first bearer switching request message, the first GW may transmit the first downlink non-CoMP user data to the first base station A1 with the central processing node bypassed, and transmit the second downlink non-CoMP user data to the first base station A2 with the central processing node bypassed. Alternatively, further, after receiving the first bearer switching request message, the first GW may first transmit only the first downlink non-CoMP user data to the first base station A1 with the central processing node bypassed, and if after this, the interface between the central processing node and the first GW is still congested, the first GW transmits the second downlink non-CoMP user data to the first base station A2 with the central processing node bypassed.

That is, there may be M groups of downlink non-CoMP user data, where M is a positive integer. Therefore, in step 402, the central processing node sends the M groups of downlink non-CoMP user data to M first base stations. Further, after receiving the first bearer switching request message, the first GW may first transmit one or more groups in the M groups of downlink non-CoMP user data to one or more corresponding first base stations with the central processing node bypassed. It should be noted that a quantity of target users of the M groups of downlink non-CoMP user data may be greater than M; for example, multiple target users may be within a service range of a same first base station. The present invention sets no limitation thereon.

Optionally, in the foregoing embodiment, the downlink CoMP user data may include first downlink CoMP user data and second downlink CoMP user data, and the sending the downlink CoMP user data to at least two base stations includes: sending the first downlink CoMP user data to at least two second-base-stations, and sending the second downlink CoMP user data to at least two third-base-stations. The at least two second-base-stations are configured to send the first downlink CoMP user data in a coordinated manner, and the at least two third-base-stations are configured to send the second downlink CoMP user data in a coordinated manner.

The sending the first downlink CoMP user data to at least two second-base-stations may be that the central processing node performs joint precoding on the first downlink CoMP user data, and then sends jointly-precoded first downlink CoMP user data to the at least two second-base-stations, so that the at least two second-base-stations send the jointly-precoded first downlink CoMP user data in a coordinated manner; or may be that the central processing node generates first precoding control information according to the first downlink CoMP user data, and then sends both the first downlink CoMP user data and the first precoding control information to the at least two second-base-stations, so that the at least two second-base-stations perform joint precoding on the first downlink CoMP user data and send jointly-precoded first downlink CoMP user data in a coordinated manner. The present invention sets no limitation thereon.

The sending the second downlink CoMP user data to at least two third-base-stations may be that the central processing node performs joint precoding on the second downlink CoMP user data, and then sends jointly-precoded second downlink CoMP user data to the at least two third-base-stations, so that the at least two third-base-stations send the jointly-precoded second downlink CoMP user data in a coordinated manner; or may be that the central processing node generates second precoding control information according to the second downlink CoMP user data, and then sends both the second downlink CoMP user data and the second precoding control information to the at least two third-base-stations, so that the at least two third-base-stations perform joint precoding on the second downlink CoMP user data and send jointly-precoded second downlink CoMP user data in a coordinated manner. The present invention sets no limitation thereon.

After the foregoing embodiment, the method in FIG. 4 may further include: when it is determined that the interface is still congested, sending, by the central processing node, a second bearer switching request message to the first GW, where the second bearer switching request message is used to instruct the first GW to bypass the central processing node when transmitting the first downlink CoMP user data to the at least two second-base-stations.

It may be understood that, after the foregoing embodiment, data transmitted by way of the central processing node is the downlink CoMP user data, and if the interface between the central processing node and the first GW is still congested, a part of data in the downlink CoMP user data may be switched. For example, the first downlink CoMP user data may be switched.

It should be noted that, that the central processing node sends the second bearer switching request message to the first GW may be that the central processing node directly sends the second bearer switching request message to the first GW, or may be that the central processing node indirectly sends the second bearer switching request message to the first GW, for example, may be that the central processing node sends the second bearer switching request message to the first MME, and then, the first MME sends another bearer update request message to the first GW. The present invention sets no limitation thereon.

In this embodiment of the present invention, the second bearer switching request message may carry identification information of the at least two second-base-stations.

In this way, after receiving the second bearer switching request message, the first GW may transmit, according to the second bearer switching request message, the first downlink CoMP user data to the at least two second-base-stations with the central processing node bypassed. Specifically, the first GW may change a transmission route of the first downlink CoMP user data, so that forwarding paths from the first GW to the at least two second-base-stations do not include the central processing node.

Optionally, the first GW may generate bearers from the first GW to the at least two second-base-stations according to the identification information of the at least two second-base-stations that is carried in the second bearer switching request message, and transmit the first downlink non-CoMP user data to the at least two second-base-stations on the bearers from the first GW to the at least two second-base-stations.

It may be understood that, in this embodiment, the at least two second-base-stations are all connected to the first GW.

Optionally, after receiving the second bearer switching request message, the first GW may further release a bearer that is from the first GW to the central processing node and that is used for transmitting the first downlink non-CoMP user data.

In this embodiment of the present invention, a first GW releases, in a timely manner, a bearer that is no longer used, which can avoid a resource waste and reduce resource occupation, and therefore, resource utilization can be improved.

Optionally, after receiving the second bearer switching request message, the first GW may further generate second indication information and send the second indication information to the central processing node. The second indication information is used to indicate that the first GW has stopped sending the first downlink CoMP user data to the central processing node. It may be understood that the second indication information is an end marker. Specifically, the second indication information is an end marker of the process in which the first GW sends the first downlink CoMP user data to the central processing node.

In this way, the method in this embodiment of the present invention may further include: receiving, by the central processing node, the second indication information from the first GW. The second indication information is used to indicate that the first GW has stopped sending the first downlink CoMP user data to the central processing node, that is, the central processing node has stopped receiving the first downlink CoMP user data from the first GW.

Optionally, after receiving the second bearer switching request message, the first GW may further generate a second bearer switching response message and send the second bearer switching response message to the central processing node. It should be noted that, that the first GW sends the second bearer switching response message to the central processing node may be that the first GW directly sends the second bearer switching response message to the central processing node, or may be that the first GW indirectly sends the second bearer switching response message to the central processing node. For example, the indirect sending may be that the first GW sends another bearer update response message to the first MME, and then, the first MME sends the second bearer switching response message to the central processing node. The present invention sets no limitation thereon.

In this way, the method in this embodiment of the present invention may further include: receiving, by the central processing node, the second bearer switching response message from the first GW.

Optionally, the method in this embodiment of the present invention may further include: sending, by the central processing node to the at least two second-base-stations, first downlink CoMP user data that has already been received from the first GW and stored in the buffer of the central processing node.

If the central processing node receives the second indication information from the first GW, the central processing node may send, to the at least two second-base-stations, the second indication information received from the first GW, where the second indication information is used to indicate that the central processing node has completed sending of the first downlink CoMP user data that is received from the first GW and stored in the buffer of the central processing node. For example, the central processing node may add the second indication information to the last data packet of the first downlink CoMP user data sent to the at least two second-base-stations. It may be understood that the second indication information sent by the central processing node to the at least two second-base-stations is an end marker of the process in which the central processing node sends the first downlink CoMP user data to the at least two second-base-stations.

Further, after sending the second indication information to the at least two second-base-stations, the central processing node may further release a downlink transmission resource used for transmitting the first downlink CoMP user data.

In this embodiment of the present invention, a central processing node releases, in a timely manner, a transmission resource that is no longer used, which can avoid a resource waste and reduce resource occupation, and therefore, resource utilization can be improved.

It may be understood that, in this embodiment of the present invention, after the foregoing method, the central processing node continues to receive the second downlink CoMP user data from the first GW, and sends the second downlink CoMP user data to the at least two third-base-stations. The at least two third-base-stations are configured to send the second downlink CoMP user data in a coordinated manner.

For the first GW, after the foregoing method, the first GW still sends the second downlink CoMP user data to the central processing node, so that the central processing node sends the second downlink CoMP user data to the at least two third-base-stations. The first GW sends subsequent first downlink CoMP user data to the at least two second-base-stations with the central processing node bypassed.

For the at least two second-base-stations, after the foregoing method, it may be understood that the at least two second-base-stations receive the first downlink CoMP user data from the first GW. In addition, the at least two second-base-stations further receive the first downlink CoMP user data in the buffer of the central processing node from the central processing node. The first downlink CoMP received by the at least two second-base-stations from the first GW may arrive at the at least two second-base-stations earlier than or at the same time as the first downlink CoMP user data that is in the buffer and sent by the central processing node.

In this way, the at least two second-base-stations may first send, to a target user in a coordinated manner, the first downlink CoMP user data received from the central processing node, and send, to the target user in a coordinated manner only after receiving the second indication information, the first downlink CoMP user data received from the first GW. For example, if the last data packet sent by the central processing node to the at least two second-base-stations carries the second indication information, after obtaining the second indication information by means of parsing, the at least two second-base-stations may determine that a data packet that carries the second indication information is the last data packet sent by the central processing node, and then, the at least two second-base-stations may continue to parse the first downlink CoMP user data received from the first GW.

In this embodiment of the present invention, that the at least two second-base-stations send, to the target user in a coordinated manner, the first downlink CoMP user data received from the first GW may include: sending, by the at least two second-base-stations, the first downlink CoMP user data to the at least two second-base-stations in a coordinated manner according to scheduling information of the central processing node.

Specifically, the central processing node may receive a downlink scheduling request message sent by a serving base station that is of the target user of the first downlink CoMP user data and that is in the at least two second-base-stations, and the central processing node performs downlink scheduling and sends a scheduling result to the at least two second-base-stations. The scheduling result may include at least one of the following: Radio Link Control (Radio Link Control, RLC) segmentation information, coding and modulation information, or transmit power.

The downlink scheduling request message may include at least one of the following: identification information of the target user of the first downlink CoMP user data, identification information of the serving base station that is of the target user of the first downlink CoMP user data and that is in the at least two second-base-stations, or a total amount of data that is in the buffer and waits to be sent. Alternatively, the downlink scheduling request message may further include a data priority and an amount of data waiting to be sent of each priority.

Correspondingly, the scheduling result may further include physical resource block (Physical Resource Block, PRB) quantity and location information, transmit layer quantity information, antenna quantity information, or the like.

In this way, the at least two second-base-stations may send the first downlink CoMP user data to the target user of the first downlink CoMP user data according to the scheduling result. The at least two second-base-stations receive feedback information from the target user of the first downlink CoMP user data. Specifically, the feedback information is an ACK message or a NACK message.

Further, the serving base station that is of the target user of the first downlink CoMP user data and that is in the at least two second-base-stations sends the feedback information to the central processing node.

In one case, the central processing node receives an ACK message sent by the base station serving the target user of the first downlink CoMP user data, and the central processing node sends a first message to the at least two second-base-stations, where the first message is used to instruct the at least two second-base-stations to delete a data copy of the first downlink CoMP user data.

If the base station serving the target user of the first downlink CoMP user data performs ACK decoding, the base station serving the target user of the first downlink CoMP user data receives an ACK message sent by the target user of the first downlink CoMP user data, and performs ACK decoding, so that it may be determined that the first downlink CoMP user data is transmitted successfully. In this case, the base station serving the target user of the first downlink CoMP user data sends the ACK message to the central processing node, and the base station serving the target user of the first downlink CoMP user data deletes the stored data copy of the first downlink CoMP user data. Then, after receiving the ACK message, the central processing node generates the first message, and sends the first message to another second base station in the at least two second-base-stations than the base station serving the target user of the first downlink CoMP user data, where the first message is used to instruct the another second base station to delete the data copy of the first downlink CoMP user data.

If the central processing node performs ACK decoding, after receiving an ACK message sent by the target user of the first downlink CoMP user data, the base station serving the target user of the first downlink CoMP user data forwards the ACK message to the central processing node, which may mean that the ACK message is transparently transmitted to the central processing node. After receiving the ACK message, the central processing node performs ACK decoding and determines that the first downlink CoMP user data is transmitted successfully. Then, the central processing node generates the first message and sends the first message to the at least two second-base-stations, where the first message is used to instruct the at least two second-base-stations to delete the data copy of the first downlink CoMP user data.

In another case, the central processing node receives a NACK message sent by the base station serving the target user of the first downlink CoMP user data; when a quantity of retransmissions does not reach a preset maximum quantity of retransmissions, the central processing node sends a retransmission scheduling acknowledgement message to the at least two second-base-stations, where the retransmission scheduling acknowledgement message is used to instruct the at least two second-base-stations to send the first downlink CoMP user data again in a coordinated manner; or when a quantity of retransmissions reaches a preset maximum quantity of retransmissions, the central processing node sends a first message to the at least two second-base-stations, where the first message is used to instruct the at least two second-base-stations to delete a data copy of the first downlink CoMP user data.

In the another case, the base station serving the target user of the first downlink CoMP user data may perform NACK decoding, or the central processing node may perform NACK decoding. The present invention sets no limitation thereon.

In this way, after the foregoing embodiment, the first GW sends the first downlink CoMP user data to the at least two second-base-stations with the central processing node bypassed. For example, the first GW may directly send the first downlink CoMP user data to the at least two second-base-stations. It may be understood that the first GW may send the first downlink CoMP user data to the at least two second-base-stations by using interfaces between the first GW and the at least two second-base-stations. The interfaces between the first GW and the at least two second-base-stations may be S1 interfaces. In addition, the first GW still sends the second downlink CoMP user data to the central processing node, and the central processing node sends the second downlink CoMP user data to the at least two third-base-stations.

Optionally, if k number of second-base-stations in the at least two second-base-stations are connected to a second GW, the second bearer switching request message is specifically used to instruct the first GW to transmit the first downlink CoMP user data to another base station in the at least two second-base-stations than the k number of second-base-stations with the central processing node bypassed, and is further used to instruct the first GW to generate a forwarding bearer from the first GW to the second GW and send the first downlink CoMP user data to the second GW on the forwarding bearer, where k is a positive integer, and k is less than a quantity of base stations in the at least two second-base-stations.

It may be understood that the another base station in the at least two second-base-stations than the k number of second-base-stations is connected to the first GW.

For example, if the target user of the first downlink CoMP user data is at an edge of a network in which the first GW is located, the base station serving the target user of the first downlink CoMP user data is connected to the first GW, and the at least two second-base-stations that participate in coordinated sending of the first downlink CoMP user data may be connected to different GWs.

It should be noted that, for transmitting, by the first GW, the first downlink CoMP user data to the another base station in the at least two second-base-stations than the k number of second-base-stations with the central processing node bypassed, reference may be made to descriptions of the first GW in the foregoing embodiment. To avoid repetition, details are not described herein again.

The method may further include: sending, by the central processing node, a bearer generation request message to the second GW, where the bearer generation request message includes identification information of the k number of second-base-stations, and the bearer generation request message is used to instruct the second GW to generate bearers from the second GW to the k number of second-base-stations, so that the second GW transmits, to the k number of second-base-stations, on the bearers with the central processing node bypassed, the first downlink CoMP user data received from the first GW.

Correspondingly, the second GW may generate a bearer generation response message and send the bearer generation response message to the central processing node.

It should be noted that, the sending, by the centralized processing, the bearer generation request message to the second GW may mean that the central processing node that has an MME function directly sends the bearer generation request message to the second GW, or may be that after the central processing node sends the second bearer switching request message to the first MME, the first MME sends a redirection message to a second MME, and then, the second MME sends the bearer generation request message to the second GW. The first MME is an MME in the network in which the first GW is located, and the second MME is an MME in a network in which the second GW is located. The present invention sets no limitation thereon.

Correspondingly, that the second GW sends the bearer generation response message to the central processing node may be that the second GW sends the bearer generation response message to the second MME, then, the second MME returns a redirection feedback message to the first MME, and finally, the first MME forwards the bearer generation response message to the central processing node. The present invention sets no limitation thereon.

In this embodiment of the present invention, message communication manners between the central processing node and the first GW and between the central processing node and the second GW are not limited. For example, the manner may be direct communication, or may be indirect communication by way of another device. The present invention sets no limitation thereon.

In this way, the first GW may transmit subsequent first downlink CoMP user data to the another base station in the at least two second-base-stations than the k number of second-base-stations with the central processing node bypassed, and send the subsequent first downlink CoMP user data to the second GW on the forwarding bearer from the first GW to the second GW, and then, the second GW sends the subsequent first downlink CoMP user data to the k number of second-base-stations in the at least two second-base-stations on the bearers from the second GW to the k number of second-base-stations in the at least two second-base-stations. Further, the at least two second-base-stations then send the subsequent first downlink CoMP user data to the target user of the first downlink CoMP user data in a coordinated manner.

That the at least two second-base-stations send the subsequent first downlink CoMP user data in a coordinated manner means that the at least two second-base-stations perform coordinated sending according to a scheduling result of the central processing node, and reference may be made to related descriptions in the foregoing embodiment. To avoid repetition, details are not described herein again.

Optionally, if the at least two second-base-stations are all connected to a second GW, the second bearer switching request message is used to instruct the first GW to generate a forwarding bearer from the first GW to the second GW, and the first GW sends the first downlink CoMP user data to the second GW on the forwarding bearer.

The method may further include: sending, by the central processing node, a bearer generation request message to the second GW, where the bearer generation request message includes the identification information of the at least two second-base-stations, and the bearer generation request message is used to instruct the second GW to generate bearers from the second GW to the at least two second-base-stations, so that the second GW transmits, to the at least two second-base-stations, on the bearers with the central processing node bypassed, the first downlink CoMP user data received from the first GW.

Correspondingly, the second GW may generate a bearer generation response message and send the bearer generation response message to the central processing node.

In this way, the first GW may send subsequent first downlink CoMP user data to the second GW on the forwarding bearer from the first GW to the second GW. The second GW may send the subsequent first downlink CoMP user data to the at least two second-base-stations on the bearers from the second GW to the at least two second-base-stations. Then, the at least two second-base-stations send the subsequent first downlink CoMP user data to the target user of the first downlink CoMP user data in a coordinated manner.

That the at least two second-base-stations send the subsequent first downlink CoMP user data in a coordinated manner means that the at least two second-base-stations perform coordinated sending according to a scheduling result of the central processing node, and reference may be made to related descriptions in the foregoing embodiment. To avoid repetition, details are not described herein again.

In this embodiment of the present invention, when a central processing node determines that an interface between the central processing node and a first GW is congested, the central processing node sends a first bearer switching request message to the first GW, so that the first GW can transmit downlink non-CoMP user data to a corresponding base station with the central processing node bypassed. Further, if the central processing node determines that the interface between the central processing node and the first GW is still congested, the central processing node sends a second bearer switching request message to the first GW, so that the first GW can transmit first downlink CoMP user data to at least two second-base-stations with the central processing node bypassed. In this way, data traffic that passes through the interface between the central processing node and the first GW can be further reduced, and a congestion state of the interface can be relieved or eliminated.

In addition, in the foregoing embodiment, first downlink CoMP user data is transmitted with a central processing node bypassed, and second CoMP user data is still transmitted by way of the central processing node, which can ensure transmission efficiency of the second downlink CoMP user data.

It should be noted that the foregoing embodiment is merely an embodiment of the present invention, and another embodiment obtained by a person of ordinary skill in the art based on the foregoing embodiment shall fall within the protection scope of the present invention.

For example, the downlink CoMP user data may further include third downlink CoMP user data sent to at least two fourth base stations.

It should be noted that, in the foregoing embodiment, the first downlink CoMP user data may have multiple target users, and downlink CoMP user data sent to the multiple target users is sent by at least two second-base-stations in a coordinated manner. For example, it is assumed that the target users of the first downlink CoMP user data is a terminal T1 and a terminal T2, the first downlink CoMP user data includes first data whose target user is the terminal T1 and second data whose target user is the terminal T2, base stations that send, in a coordinated manner, the first data whose target user is the terminal T1 are the at least two second-base-stations, and base stations that send, in a coordinated manner, the second data whose target user is the terminal T2 are also the at least two second-base-stations.

It may be understood that, in the foregoing embodiment, the downlink CoMP user data may be multiple groups of downlink CoMP user data, and the second bearer switching request message may be used to instruct the first GW to switch one or more groups in the multiple groups of downlink CoMP user data. The present invention sets no limitation thereon. The switching described herein refers to switching from transmission by way of the central processing node to transmission with the central processing node bypassed. Each group of downlink CoMP user data refers to downlink user data sent by same at least two base stations in a coordinated manner.

In this embodiment of the present invention, when determining that an interface between a central processing node and a first GW is congested, the central processing node may instruct the first GW to first transmit downlink non-CoMP user data with the central processing node bypassed, so that data traffic that passes through the interface is reduced, and a congestion state of the interface is relieved or eliminated. If further, it is determined that the interface is still congested, the first GW is then instructed to transmit a part of downlink CoMP user data with the central processing node bypassed, so that the data traffic that passes through the interface can be further reduced, and further, the congestion state of the interface can be eliminated.

Optionally, in another embodiment, the downlink user data in step 401 is downlink CoMP user data, and the downlink CoMP user data includes first downlink CoMP user data and second downlink CoMP user data. In step 402, that the central processing node sends the downlink user data to a corresponding base station includes: sending, by the central processing node, the first downlink CoMP user data to at least two second-base-stations, and sending the second downlink CoMP user data to at least two third-base-stations. The at least two second-base-stations are configured to send the first downlink CoMP user data in a coordinated manner, and the at least two third-base-stations are configured to send the second downlink CoMP user data in a coordinated manner. The first bearer switching request message in step 403 is specifically used to instruct the first GW to bypass the central processing node when transmitting the first downlink CoMP user data to the at least two second-base-stations.

It may be understood that, in this case, in step 401, data for which the first GW performs downlink transmission by way of the central processing node does not include the downlink non-CoMP user data.

Optionally, if k number of second-base-stations in the at least two second-base-stations are connected to a second GW, the first bearer switching request message is specifically used to instruct the first GW to transmit the first downlink CoMP user data to another base station in the at least two second-base-stations than the k number of second-base-stations with the central processing node bypassed, and is further used to instruct the first GW to generate a forwarding bearer from the first GW to the second GW and send the first downlink CoMP user data to the second GW on the forwarding bearer. The method further includes: sending, by the central processing node, a bearer generation request message to the second GW, where the bearer generation request message includes identification information of the k number of second-base-stations, and the bearer generation request message is used to instruct the second GW to generate bearers from the second GW to the k number of second-base-stations, so that the second GW transmits, to the k number of second-base-stations, on the bearers with the central processing node bypassed, the first downlink CoMP user data received from the first GW, where k is a positive integer, and k is less than a quantity of base stations in the at least two second-base-stations.

Optionally, if the at least two second-base-stations are connected to a second GW, the first bearer switching request message is used to instruct the first GW to generate a forwarding bearer from the first GW to the second GW, and the first GW sends the first downlink CoMP user data to the second GW on the forwarding bearer. The method may further include: sending, by the central processing node, a bearer generation request message to the second GW, where the bearer generation request message includes identification information of the at least two second-base-stations, and the bearer generation request message is used to instruct the second GW to generate bearers from the second GW to the at least two second-base-stations, so that the second GW transmits, to the at least two second-base-stations, on the bearers with the central processing node bypassed, the first downlink CoMP user data received from the first GW.

It should be noted that the first GW transmits, according to the first bearer switching request message, the first downlink CoMP user data to the at least two second-base-stations with the central processing node bypassed. Reference may be made to descriptions, in the foregoing embodiment, of transmitting, by the first GW according to the second bearer switching request message, the first downlink CoMP user data to the at least two second-base-stations with the central processing node bypassed. To avoid repetition, details are not described herein again.

Further, for sending, by the at least two second-base-stations, the first downlink CoMP user data to the target user in a coordinated manner, reference may also be made to related descriptions in the foregoing embodiment. To avoid repetition, details are not described herein again.

In this embodiment of the present invention, when determining that an interface between a central processing node and a first GW is congested, the central processing node may instruct the first GW to transmit a part of data in downlink CoMP user data with the central processing node bypassed, so that data traffic that passes through the interface is reduced, and further, a congestion state of the interface can be relieved or eliminated.

Optionally, in another embodiment, the downlink user data in step 401 is downlink non-CoMP user data. It may be understood that, in this embodiment, the downlink user data does not include the downlink CoMP user data. There may be M groups of downlink non-CoMP user data, where M is a positive integer. The first bearer switching request message in step 403 may be used to instruct the first GW to switch one or more groups in the M groups of downlink non-CoMP user data. The present invention sets no limitation thereon. Each group of downlink non-CoMP user data may have multiple target users, and serving base stations of the multiple target users are the same. The switching described herein refers to switching from transmission by way of the central processing node to transmission with the central processing node bypassed.

For example, the $i^{th}$ group of downlink non-CoMP user data in the M groups of downlink non-CoMP user data includes first downlink non-CoMP user data and second downlink non-CoMP user data, where i is any positive integer not greater than M. A target user of the first downlink non-CoMP user data is a terminal T1, a serving base station of T1 is a first base station A1, a target user of the second downlink non-CoMP user data is a terminal T2, and a serving base station of T2 is also the first base station A1. After receiving the first bearer switching request message, the first GW may switch both the first downlink non-CoMP user data and the second downlink non-CoMP user data.

Specifically, for a method for switching, by the first GW, the one or more groups in the M groups of downlink non-CoMP user data according to the first bearer switching request message, reference may be made to a method in the foregoing embodiment for transmitting, by the first GW according to the first bearer switching request message, the downlink non-CoMP user data with the central processing node bypassed. To avoid repetition, details are not described herein again.

In this way, in this embodiment of the present invention, if downlink user data sent by a first GW is downlink non-CoMP user data, when a central processing node determines that an interface between the central processing node and the first GW is congested, a part of data in the downlink non-CoMP user data is switched, so that a congestion state of the interface can be eliminated.

If downlink user data sent by a first GW is downlink CoMP user data, when a central processing node determines that an interface between the central processing node and the first GW is congested, a part of data in the downlink CoMP user data is switched, so that a congestion state of the interface can be eliminated.

If downlink user data sent by a first GW is downlink non-CoMP user data and downlink CoMP user data, when a central processing node determines that an interface between the central processing node and the first GW is congested, a part of data in the downlink non-CoMP user data is switched, so that a congestion state of the interface can be relieved or eliminated. If the interface is still congested, a part of data in the downlink CoMP user data is also switched, so that the congestion state of the interface can be eliminated.

The switching described herein refers to switching data from transmission by way of the central processing node to transmission with the central processing node bypassed.

Figure 5:
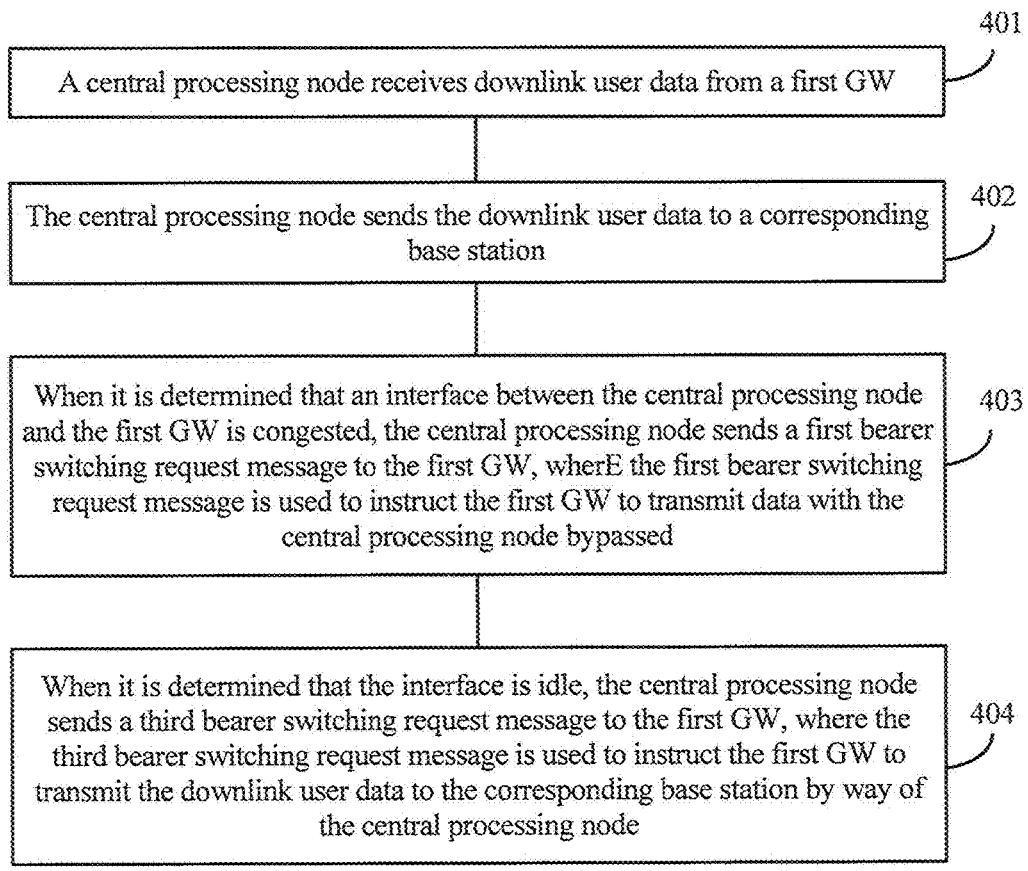
FIG. 5 is a flowchart of a data transmission method according to another embodiment of the present invention.

Optionally, after any one of the foregoing embodiments, as shown in FIG. 5, the data transmission method may further include:

404. When it is determined that the interface is idle, the central processing node sends a third bearer switching request message to the first GW, where the third bearer switching request message is used to instruct the first GW to transmit the downlink user data to the corresponding base station by way of the central processing node.

Specifically, in step 404, the central processing node may detect the status of the interface to determine that the interface is idle. The status of the interface may include the bandwidth utilization of the interface. The central processing node may determine, according to the bandwidth utilization of the interface, that the interface is idle. For example, if determining that the bandwidth utilization of the interface is always less than a second threshold in consecutive multiple times of detection in a period of time, the central processing node may determine that the interface is idle. In this embodiment of the present invention, the second threshold may be preconfigured by the operator. The present invention sets no limitation thereon.

In this embodiment of the present invention, a manner of determining, by the central processing node, that the interface is idle is not limited. For example, the central processing node may directly detect the status of the interface between the central processing node and the first GW, or may detect the status of the interface between the central processing node and each base station to determine the status of the interface between the central processing node and the first GW. The present invention sets no limitation thereon.

Optionally, in an embodiment, if the downlink user data being sent by the first GW includes downlink CoMP user data, and the first GW transmits first downlink CoMP user data in the downlink CoMP user data to at least two second-base-stations with the central processing node bypassed, after receiving the third bearer switching request message, the first GW transmits, according to the third bearer switching request message, the first downlink CoMP user data to the at least two second-base-stations by way of the central processing node. The at least two second-base-stations are configured to send the first downlink CoMP user data in a coordinated manner.

Specifically, after receiving the third bearer switching request message, the first GW may send subsequent first downlink CoMP user data to the central processing node. Specifically, the first GW may change a downlink transmission route of the first downlink CoMP user data.

For example, the first GW may change a next-hop address of a transmission path of the first downlink CoMP user data to directly transmit the first downlink CoMP user data to the central processing node.

It may be understood that after step 404, the method may further include: receiving, by the central processing node, the subsequent first downlink CoMP user data from the first GW, and sending the subsequent first downlink CoMP user data to the at least two second-base-stations, so that the at least two second-base-stations send the subsequent first downlink CoMP user data in a coordinated manner.

Specifically, after receiving the subsequent first downlink CoMP user data, the central processing node may perform joint precoding on the subsequent first downlink CoMP user data, and then send jointly-precoded subsequent first downlink CoMP user data to the at least two second-base-stations. Alternatively, after receiving the subsequent first downlink CoMP user data, the central processing node may generate precoding control information, and then send both the subsequent first downlink CoMP user data and the precoding control information to the at least two second-base-stations. The present invention sets no limitation thereon.

Optionally, the third bearer switching request message may include identification information of the central processing node. After receiving the third bearer switching request message, the first GW may generate a first bearer from the first GW to the central processing node, and send the subsequent first downlink CoMP user data to the central processing node on the first bearer.

Optionally, after receiving the third bearer switching request message, the first GW may release bearers that are from the first GW to the at least two second-base-stations and that are used for transmitting the first downlink CoMP user data.

In this embodiment of the present invention, a first GW releases, in a timely manner, a bearer that is no longer used, which can avoid a resource waste and reduce resource occupation, and therefore, resource utilization can be improved.

Optionally, after receiving the third bearer switching request message, the first GW may generate third indication information and send the third indication information to the at least two second-base-stations. It may be understood that the third indication information is an end marker. Specifically, the third indication information is an end marker of the process in which the first GW sends the first downlink CoMP user data to the at least two second-base-stations.

In this way, only after receiving the third indication information can the at least two second-base-stations send, in a coordinated manner, the subsequent first downlink CoMP user data received from the central processing node.

Specifically, the first GW may add the third indication information to the last data packet sent to the at least two second-base-stations. After obtaining the third indication information by means of parsing, the at least two secondbase-stations may determine that a data packet currently being parsed is the last data packet sent by the first GW. Then, the at least two second-base-stations may start to parse the subsequent first downlink CoMP user data received from the central processing node.

Optionally, after receiving the third bearer switching request message, the first GW may also generate a third bearer switching response message and send the third bearer switching response message to the central processing node. It should be noted that, the sending, by the first GW, the third bearer switching response message to the central processing node may be that the first GW directly sends the third bearer switching response message to the central processing node, or may be that the first GW indirectly sends the third bearer switching response message to the central processing node. For example, the indirect sending may be that the first GW sends a bearer update response message to the first MME, and then, the first MME sends the third bearer switching response message to the central processing node. The present invention sets no limitation thereon.

It may be understood that, after step 404, the method may further include: receiving, by the central processing node, the third bearer switching response message from the first GW.

Optionally, if k base stations in the at least two second-base-stations are connected to a second GW, before step 404, the first GW sends the first downlink CoMP user data to another base station in the at least two second-base-stations than the k base stations, and the first GW sends the first downlink CoMP user data to the second GW on a forwarding bearer from the first GW to the second GW. After step 404, that is, after the first GW receives the third bearer switching request message, the forwarding bearer from the first GW to the second GW may be released.

In this way, in this embodiment of the present invention, when determining that an interface between a central processing node and a first GW is idle, the central processing node may switch first downlink CoMP user data sent by the first GW from transmission with the central processing node bypassed to transmission by way of the central processing node. In this way, not only utilization of the interface between the central processing node and the first GW can be improved, but also transmission efficiency of the first downlink CoMP user data can be improved.

Further, after step 404, if all downlink CoMP user data in the downlink user data being transmitted by the first GW is transmitted by way of the central processing node, the first downlink non-CoMP user data in the downlink user data is transmitted with the central processing node bypassed, and the central processing node determines that the interface between the central processing node and the first GW is still idle, the central processing node may send a fourth bearer switching request message to the first GW, where the fourth bearer switching request message is used to instruct the first GW to transmit the first downlink non-CoMP user data by way of the central processing node.

Optionally, after receiving the fourth bearer switching request message, the first GW may send the first downlink non-CoMP user data to the central processing node, so that the central processing node sends the first downlink non-CoMP user data to a first base station. The first base station is a base station serving a target user of the first downlink non-CoMP user data.

It may be understood that, after the foregoing embodiment, the method may further include: receiving, by the central processing node, the first downlink non-CoMP user data from the first GW, and sending the first downlink non-CoMP user data to the first base station.

Optionally, after receiving the fourth bearer switching request message, the first GW may generate a second bearer from the first GW to the central processing node, and send the first downlink non-CoMP user data to the central processing node on the second bearer.

Optionally, after receiving the fourth bearer switching request message, the first GW may release a bearer that is from the first GW to the first base station and that is used for transmitting the first downlink non-CoMP user data.

Optionally, after receiving the fourth bearer switching request message, the first GW may generate fourth indication information and send the fourth indication information to the first base station. It may be understood that the fourth indication information is an end marker. Specifically, the fourth indication information is an end marker of the process in which the first GW sends the first downlink non-CoMP user data to the first base station with the central processing node bypassed.

For example, the first GW may add the fourth indication information to the last data packet of the first downlink non-CoMP user data sent to the first base station. In this way, after parsing the fourth indication information, the first base station may determine that a data packet currently being parsed is the last data packet sent by the first GW. Then, the first base station sends, to the target user of the first downlink non-CoMP user data, the first downlink non-CoMP user data received from the central processing node.

Optionally, after receiving the fourth bearer switching request message, the first GW may generate a fourth bearer switching response message and send the fourth bearer switching response message to the central processing node.

It may be understood that, after the foregoing embodiment, the method may further include: receiving, by the central processing node, the fourth bearer switching response message sent by the first GW.

In this way, when a first GW transmits downlink CoMP user data by way of a central processing node, if the central processing node determines that an interface between the central processing node and the first GW is still idle, the first GW may switch first downlink non-CoMP user data that is sent from transmission with the central processing node bypassed to transmission by way of the central processing node. In this way, utilization of the interface between the central processing node and the first GW can be further improved.

Optionally, in another embodiment, if the downlink user data being sent by the first GW does not include downlink CoMP user data, or all downlink CoMP user data in the downlink user data being sent by the first GW is transmitted by way of the central processing node, and first downlink non-CoMP user data in the downlink user data being sent by the first GW is transmitted to a first base station with the central processing node bypassed, in step 404, the third bearer switching request message may be used to instruct the first GW to transmit the first downlink non-CoMP user data to the first base station by way of the central processing node.

Specifically, for the method, reference may be made to a method in the foregoing embodiment for transmitting, by the first GW according to the fourth switching request message, the first downlink non-CoMP user data to the first base station by way of the central processing node. To avoid repetition, details are not described herein again.

It may be understood that, as shown in FIG. 3, the central processing node may be a base station. It should be noted that the downlink user data in this embodiment of the present invention does not include user data sent by the GW to a terminal that uses the central processing node as a serving base station. The user data sent by the GW to the terminal that uses the central processing node as a serving base station needs to be transmitted by way of the central processing node. In other words, it may be understood that, in this embodiment of the present invention, the user data sent by the GW to the terminal that uses the central processing node as a serving base station is not switched.

Figure 6:
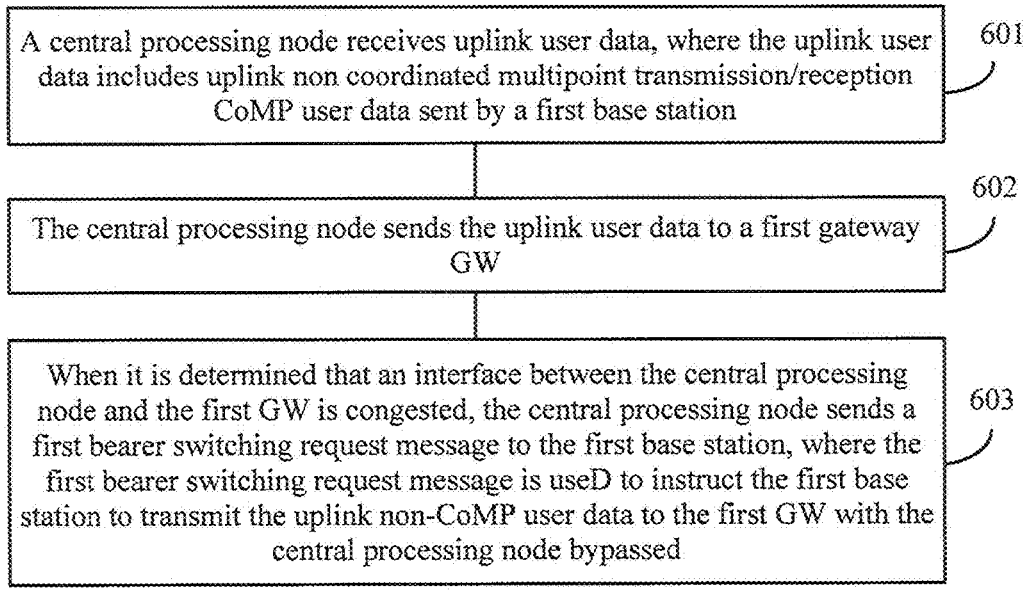
FIG. 6 is a flowchart of a data transmission method according to another embodiment of the present invention.

FIG. 6 is a flowchart of a data transmission method according to another embodiment of the present invention. The method shown in FIG. 6 includes:

601. A central processing node receives uplink user data, where the uplink user data includes uplink non-coordinated multipoint transmission/reception CoMP user data sent by a first base station.

602. The central processing node sends the uplink user data to a first gateway GW.

603. When it is determined that an interface between the central processing node and the first GW is congested, the central processing node sends a first bearer switching request message to the first base station, where the first bearer switching request message is used to instruct the first base station to transmit the uplink non-CoMP user data to the first GW with the central processing node bypassed.

In this way, in this embodiment of the present invention, in an uplink data transmission process, when a central processing node determines that an interface between the central processing node and a first GW is congested, the central processing node sends a first bearer switching request message to a first base station, so that uplink non-CoMP user data is transmitted to the first GW with the central processing node bypassed, so that data traffic that passes through the interface between the central processing node and the first GW can be reduced, and further, a congestion state of the interface can be relieved or eliminated.

In this embodiment of the present invention, step 601 may include: receiving, by the central processing node, the uplink non-CoMP user data from the first base station.

For example, it is assumed that the uplink non-CoMP user data is sent from a terminal T3 to the first GW, and the first base station is a serving base station of the terminal T3. Then, before step 601, the first base station may receive the uplink non-CoMP user data from the terminal T3 by using an air interface (AirInterface, AI).

Further, in step 602, the central processing node may send the uplink non-CoMP user data to the first gateway GW by using the interface between the central processing node and the first GW. Specifically, the central processing node may send the uplink non-CoMP user data to the first gateway GW on a bearer from the central processing node to the first GW.

Optionally, the uplink user data in step 601 may further include other uplink non-CoMP user data. In this embodiment of the present invention, it may be understood that when it is determined that the interface is congested, a part or all of non-CoMP user data in the uplink user data is transmitted with the central processing node bypassed. In this way, data traffic that passes through the central processing node can be reduced.

It should be noted that in step 601, the uplink user data may further include uplink CoMP user data. Specifically, step 601 may further include: receiving, by the central processing node, the uplink CoMP user data from at least two second-base-stations.

Further, in step 602, the central processing node sends the uplink CoMP user data to the first GW. Specifically, the central processing node may perform joint decoding on the uplink CoMP user data, and then send jointly-decoded uplink CoMP user data to the first GW.

It should be noted that, in step 603, for a method for determining, by the central processing node, that the interface is congested, reference may be made to the method in step 403 in FIG. 4 for determining, by the central processing node, that the interface is congested. To avoid repetition, details are not described herein again.

In this embodiment of the present invention, after receiving the first bearer switching request message, the first base station may send the uplink non-CoMP user data to the first GW with the central processing node bypassed.

Specifically, the first base station may change a transmission path of the uplink non-CoMP user data. For example, a next-hop address may be changed from an address of the central processing node to an address of the first GW.

Optionally, the first bearer switching request message may include first bearer context information. After receiving the first bearer switching request message, the first base station may establish a user plane according to the first bearer context information. Specifically, a third bearer from the first base station to the first GW may be generated according to the first bearer switching request message, and subsequent uplink non-CoMP user data may be sent to the first GW on the third bearer.

Optionally, after receiving the first bearer switching request message, the first base station may release an uplink transmission resource that is from the first base station to the central processing node and that is used for transmitting the uplink non-CoMP user data.

In this embodiment of the present invention, a first base station releases, in a timely manner, an uplink transmission resource that is no longer used, which can avoid a resource waste and reduce resource occupation, and therefore, resource utilization can be improved.

Optionally, after receiving the first bearer switching request message, the first base station may generate first indication information and send the first indication information to the central processing node. It may be understood that the first indication information is an end marker. Specifically, the first indication information is an end marker of the process in which the first base station sends the uplink non-CoMP user data to the central processing node.

Optionally, after receiving the first bearer switching request message, the first base station may generate a first bearer switching response message and send the first bearer switching response message to the central processing node.

It may be understood that, after step 603, the method may further include: receiving, by the central processing node, the first bearer switching response message sent by the first base station.

Optionally, after step 603, the method may further include: releasing, by the central processing node, the bearer that is from the central processing node to the first GW and that is used for transmitting the uplink non-CoMP user data.

Optionally, after step 603, the method may further include: sending, by the central processing node to the first GW, uplink non-CoMP user data that has already been received from the first base station and stored in a buffer of the central processing node.

In addition, the central processing node may further send, to the first GW, the first indication information received from the first base station. For example, the central processing node may add the first indication information to the last data packet sent to the first GW. In this way, after receiving the first indication information, the first GW sends, to a core network, the uplink non-CoMP user data received from the first base station.

In this way, in this embodiment of the present invention, in an uplink transmission process, when it is determined that an interface between a central processing node and a first GW is congested, uplink non-CoMP user data in uplink user data is transmitted to the first GW with the central processing node bypassed, so that data traffic on the interface between the central processing node and the first GW can be reduced, and further, a congestion state of the interface can be relieved or eliminated.

It may be understood that, in the foregoing embodiment, there may be M groups of uplink non-CoMP user data. For example, in step 601, the central processing node receives first uplink non-CoMP user data from a first base station A1, and receives second uplink non-CoMP user data from a first base station A2. In step 603, the first base station A1 receives the first bearer switching request message, and transmits the first uplink non-CoMP user data to the first GW with the central processing node bypassed, and the first base station A2 also receives the first bearer switching request message, and transmits the second uplink non-CoMP user data to the first GW with the central processing node bypassed.

Further, the method may further include: when it is determined that the interface is idle, sending, by the central processing node, a second bearer switching request message to the first base station, where the second bearer switching request message is used to instruct the first base station to transmit the uplink non-CoMP user data to the first GW by way of the central processing node.

Specifically, after receiving the second bearer switching request message, the first base station may send the uplink non-CoMP user data to the central processing node.

Optionally, after receiving the second bearer switching request message, the first base station may generate a second bearer switching response message and send the second bearer response message to the central processing node. The second bearer switching response message may include second bearer context information.

It may be understood that, after the foregoing embodiment, the method may further include: receiving, by the central processing node, the second bearer switching response message sent by the first base station.

Optionally, the central processing node may generate a fourth bearer from the central processing node to the first GW according to the second bearer context information. In this way, the central processing node may send, to the first GW and on the fourth bearer, the uplink non-CoMP user data received from the first base station.

Optionally, after receiving the second bearer switching request message, the first base station may release the bearer that is from the first base station to the first GW and that is used for transmitting the uplink non-CoMP user data.

Optionally, after receiving the second bearer switching request message, the first base station may generate second indication information and send the second indication information to the first GW. It may be understood that the second indication information is an end marker. Specifically, the second indication information is an end marker of the process in which the first base station sends the uplink non-CoMP user data to the first GW.

For example, the first base station may add the second indication information to the last data packet sent to the first GW. In this way, after obtaining the second indication information by means of parsing, the first GW may determine that a data packet being parsed is the last data packet received from the first base station, and then, the first GW may continue to parse the uplink non-CoMP user data received from the central processing node. After sending, to the core network, all of the uplink non-CoMP user data received from the first base station, the first GW sends, to the core network, the uplink non-CoMP user data received from the central processing node.

Likewise, as shown in FIG. 3, the central processing node may be a base station. It should be noted that the uplink non-CoMP user data in this embodiment of the present invention does not include non-CoMP user data sent by a terminal that uses the central processing node as a serving base station to the first GW. It may be understood that the non-CoMP user data sent by the terminal that uses the central processing node as a serving base station needs to be transmitted to the first GW by using the interface between the central processing node and the first GW. In other words, in this embodiment of the present invention, non-CoMP user data sent by the terminal that uses the central processing node as a serving base station is not switched.

Figure 7:
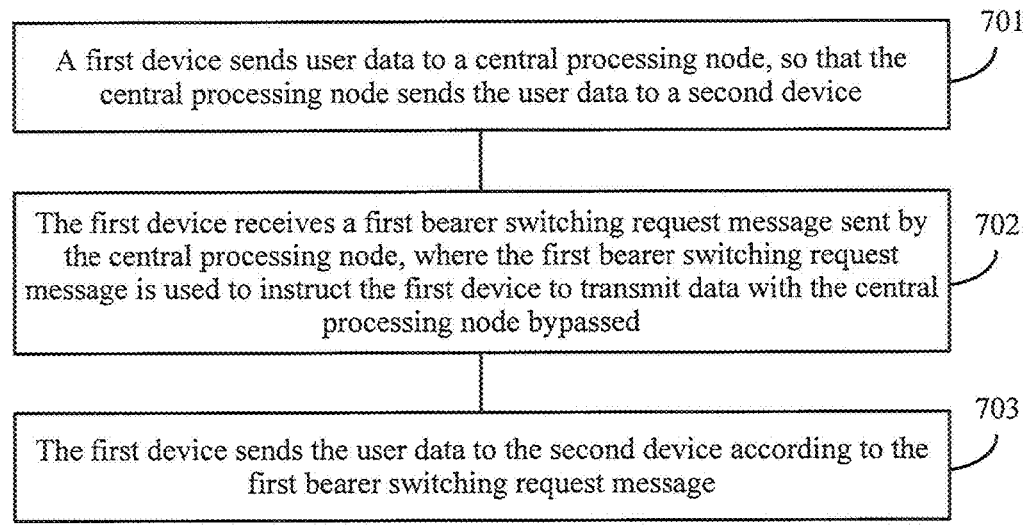
FIG. 7 is a flowchart of a data transmission method according to another embodiment of the present invention.

FIG. 7 is a flowchart of a data transmission method according to another embodiment of the present invention. The method shown in FIG. 7 includes:

701. A first device sends user data to a central processing node, so that the central processing node sends the user data to a second device.

702. The first device receives a first bearer switching request message sent by the central processing node, where the first bearer switching request message is used to instruct the first device to bypass the central processing node when transmitting data.

703. The first device sends the user data to the second device according to the first bearer switching request message.

In this embodiment of the present invention, a first device switches, according to a first bearer switching request message sent by a central processing node, a part of data in user data from transmission by way of the central processing node to transmission with the central processing node bypassed. In this way, data traffic that passes through an interface between the central processing node and a first GW can be reduced, and further, a congestion state of the interface can be relieved or eliminated.

Optionally, after step 702, the method may further include: generating, by the first device, a first bearer response message, and sending the first bearer response message to the central processing node.

Optionally, in an embodiment, the first device may be a first GW, and the second device is a base station corresponding to the user data. The user data in step 701 may include downlink non-CoMP user data and downlink CoMP user data.

If the user data includes the downlink non-CoMP user data and the downlink CoMP user data, the first bearer switching request message is specifically used to instruct the first device to bypass the central processing node when transmitting the downlink non-CoMP user data to a first base station, where the first base station is a base station serving a target user of the downlink non-CoMP user data.

In step 703, the first device transmits the downlink non-CoMP user data to the first base station with the central processing node bypassed, and sends the downlink CoMP user data to the central processing node, so that the central processing node sends the downlink CoMP user data to at least two base stations, where the at least two base stations are configured to send the downlink CoMP user data in a coordinated manner. The second device includes the first base station and the at least two base stations.

Optionally, the first bearer switching request message may carry identification information of the first base station. After receiving the first bearer switching request message, the first GW may generate a bearer from the first GW to the first base station, and transmit the downlink non-CoMP user data to the first base station on the bearer from the first GW to the first base station.

Optionally, after receiving the first bearer switching request message, the first GW may release a bearer that is from the first GW to the central processing node and that is used for transmitting the downlink non-CoMP user data.

Optionally, after receiving the first bearer switching request message, the first GW may further generate first indication information and send the first indication information to the central processing node. The first indication information is used to indicate that the first GW has stopped sending the downlink non-CoMP user data to the central processing node. It may be understood that the first indication information is an end marker. Specifically, the first indication information is an end marker of the process in which the first GW sends the downlink non-CoMP user data to the central processing node.

Optionally, the downlink CoMP user data includes first downlink CoMP user data and second downlink CoMP user data, and the method may further include: receiving, by the first device, a second bearer switching request message sent by the central processing node, where the second bearer switching request message is used to instruct the first device to transmit the first downlink CoMP user data to at least two second-base-stations with the central processing node bypassed; and transmitting, by the first device according to the second bearer switching request message, the first downlink CoMP user data to the at least two second-base-stations with the central processing node bypassed, and sending the second downlink CoMP user data to the central processing node, so that the central processing node sends the second downlink CoMP user data to at least two third-base-stations. The at least two base stations include the at least two second-base-stations and the at least two third-base-stations, the at least two second-base-stations are configured to send the first downlink CoMP user data in a coordinated manner, and the at least two third-base-stations are configured to send the second downlink CoMP user data in a coordinated manner.

Optionally, after receiving the second bearer switching request message, the first GW may transmit, according to the second bearer switching request message, the first downlink CoMP user data to the at least two second-base-stations with the central processing node bypassed.

Optionally, the second bearer switching request message may carry identification information of the at least two second-base-stations. After receiving the second bearer switching request message, the first GW may generate bearers from the first GW to the at least two second-base-stations according to the identification information of the at least two second-base-stations that is carried in the second bearer switching request message, and transmit first downlink non-CoMP user data to the at least two second-base-stations on the bearers from the first GW to the at least two second-base-stations.

It may be understood that, in this embodiment, the at least two second-base-stations are all connected to the first GW.

Optionally, after receiving the second bearer switching request message, the first GW may further release a bearer that is from the first GW to the central processing node and that is used for transmitting the first downlink non-CoMP user data.

Optionally, after receiving the second bearer switching request message, the first GW may further generate second indication information and send the second indication information to the central processing node. The second indication information is used to indicate that the first GW has stopped sending the first downlink CoMP user data to the central processing node. It may be understood that the second indication information is an end marker. Specifically, the second indication information is an end marker of the process in which the first GW sends the first downlink CoMP user data to the central processing node.

Optionally, if k number of second-base-stations in the at least two second-base-stations are connected to a second GW, the second bearer switching request message is specifically used to instruct the first GW to transmit the first downlink CoMP user data to another base station in the at least two second-base-stations than the k number of second-base-stations with the central processing node bypassed, and is further used to instruct the first GW to generate a forwarding bearer from the first GW to the second GW and send the first downlink CoMP user data to the second GW on the forwarding bearer, where k is a positive integer, and k is less than a quantity of base stations in the at least two second-base-stations.

It may be understood that the another base station in the at least two second-base-stations than the k number of second-base-stations is connected to the first GW.

In this way, the first GW may transmit subsequent first downlink CoMP user data to the another base station in the at least two second-base-stations than the k number of second-base-stations with the central processing node bypassed, and send the subsequent first downlink CoMP user data to the second GW on the forwarding bearer from the first GW to the second GW, and then, the second GW sends the subsequent first downlink CoMP user data to the k number of second-base-stations in the at least two second-base-stations on bearers from the second GW to the k number of second-base-stations in the at least two second-base-stations. Further, the at least two second-base-stations then send the subsequent first downlink CoMP user data to a target user of the first downlink CoMP user data in a coordinated manner.

Optionally, if the at least two second-base-stations are all connected to a second GW, the second bearer switching request message is used to instruct the first GW to generate a forwarding bearer from the first GW to the second GW, and the first GW sends the first downlink CoMP user data to the second GW on the forwarding bearer.

In this way, the first GW may send subsequent first downlink CoMP user data to the second GW on the forwarding bearer from the first GW to the second GW. The second GW may send the subsequent first downlink CoMP user data to the at least two second-base-stations on bearers from the second GW to the at least two second-base-stations. Then, the at least two second-base-stations send the subsequent first downlink CoMP user data to a target user of the first downlink CoMP user data in a coordinated manner.

If the user data is the downlink CoMP user data, the downlink CoMP user data includes first downlink CoMP user data and second downlink CoMP user data, and the first bearer switching request message is specifically used to instruct the first GW to transmit the first downlink CoMP user data to at least two second-base-stations with the central processing node bypassed, step 703 may include: transmitting, by the first device, the first downlink CoMP user data to the at least two second-base-stations with the central processing node bypassed, and sending the second downlink CoMP user data to the central processing node, so that the central processing node sends the second downlink CoMP user data to at least two third-base-stations. The second device includes the at least two second-base-stations and the at least two third-base-stations, the at least two second-base-stations are configured to send the first downlink CoMP user data in a coordinated manner, and the at least two third-base-stations are configured to send the second downlink CoMP user data in a coordinated manner.

Optionally, if k number of second-base-stations in the at least two second-base-stations are connected to a second GW, the first bearer switching request message is specifically used to instruct the first GW to transmit the first downlink CoMP user data to another base station in the at least two second-base-stations than the k number of second-base-stations with the central processing node bypassed, and is further used to instruct the first GW to generate a forwarding bearer from the first GW to the second GW and send the first downlink CoMP user data to the second GW on the forwarding bearer. The transmitting the first downlink CoMP user data to the at least two second-base-stations with the central processing node bypassed includes: transmitting the first downlink CoMP user data to the another base station in the at least two second-base-stations than the k number of second-base-stations with the central processing node bypassed, and sending the first downlink CoMP user data to the second GW on the forwarding bearer, so that the second GW transmits the first downlink CoMP user data to the k number of second-base-stations with the central processing node bypassed, where k is a positive integer.

Specifically, in this embodiment, for transmitting, by the first GW according to the first bearer switching request message, the first downlink CoMP user data with the central processing node bypassed, reference may be made to a process, in the foregoing embodiment, in which the first GW transmits, according to the second bearer switching request message, the first downlink CoMP user data with the central processing node bypassed. To avoid repetition, details are not described herein again.

If the user data is the downlink non-CoMP user data, it may be understood that, in this embodiment, the user data does not include the downlink CoMP user data. There may be M groups of downlink non-CoMP user data, where M is a positive integer. The first bearer switching request message may be used to instruct the first GW to switch one or more groups in the M groups of downlink non-CoMP user data. The present invention sets no limitation thereon. Each group of downlink non-CoMP user data may have multiple target users, and serving base stations of the multiple target users are the same. The switching described herein refers to switching from transmission by way of the central processing node to transmission with the central processing node bypassed.

Specifically, for a method for switching, by the first GW, the one or more groups in the M groups of downlink non-CoMP user data according to the first bearer switching request message, reference may be made to a method in the foregoing embodiment for transmitting, by the first GW according to the first bearer switching request message, the downlink non-CoMP user data with the central processing node bypassed. To avoid repetition, details are not described herein again.

It should be noted that, in the method shown in FIG. 7, when the first device is a first GW, reference may be made to related descriptions of the method implemented by the first GW in FIG. 4. To avoid repetition, details are not described.

Optionally, in another embodiment, in FIG. 7, the first device is a first base station, the second device is a first GW, the user data includes uplink non-CoMP user data, and the first bearer switching request message is specifically used to instruct the first device to transmit the uplink non-CoMP user data to the second device with the central processing node bypassed. Step 703 may include: transmitting, by the first device, the uplink non-CoMP user data to the second device with the central processing node bypassed.

Optionally, the first bearer switching request message may include first bearer context information. After receiving the first bearer switching request message, the first base station may establish a user plane according to the first bearer context information. Specifically, a third bearer from the first base station to the first GW may be generated according to the first bearer switching request message, and subsequent uplink non-CoMP user data may be sent to the first GW on the third bearer.

Optionally, after receiving the first bearer switching request message, the first base station may release an uplink transmission resource that is from the first base station to the central processing node and that is used for transmitting the uplink non-CoMP user data.

Optionally, after receiving the first bearer switching request message, the first base station may generate first indication information and send the first indication information to the central processing node. It may be understood that the first indication information is an end marker. Specifically, the first indication information is an end marker of the process in which the first base station sends the uplink non-CoMP user data to the central processing node.

If the user data further includes uplink CoMP user data, step 703 further includes: sending, by the first device, the uplink CoMP user data to the central processing node in a coordinated manner together with at least one base station, so that the central processing node sends the uplink CoMP user data to the second device. The first device and the at least one base station are configured to send the uplink CoMP user data in a coordinated manner.

It should be noted that, in the method shown in FIG. 7, when the first device is a first base station, reference may be made to related descriptions of the method implemented by the first base station in FIG. 6. To avoid repetition, details are not described.

Optionally, after the method shown in FIG. 7, the method may further include: receiving, by the first device, a third bearer switching request message sent by the central processing node, where the second bearer switching request message is used to instruct the first device to transmit data by way of the central processing node; and sending, by the first device, the user data to the second device according to the second bearer switching request message.

Specifically, when the first device is a first GW, reference may be made to related descriptions of the method implemented by the first GW in FIG. 5. When the first device is a first base station, reference may be made to related descriptions of the method implemented by the first base station in FIG. 6 according to the second bearer switching request message. To avoid repetition, details are not described herein again.

Figure 8:
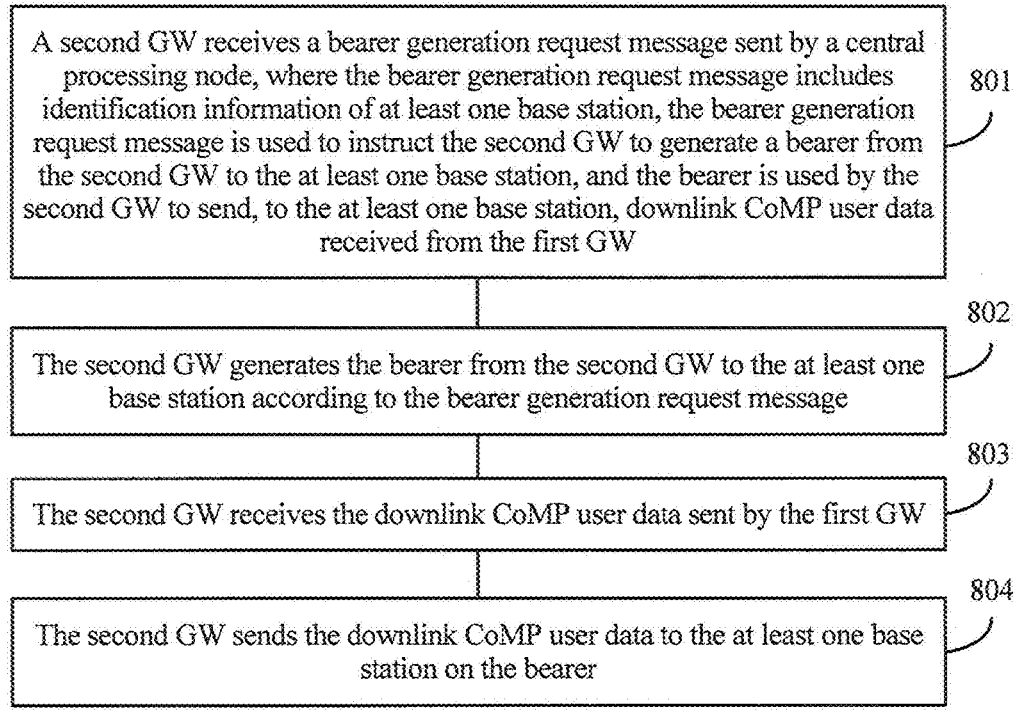
FIG. 8 is a flowchart of a data transmission method according to another embodiment of the present invention.

FIG. 8 is a flowchart of a data transmission method according to another embodiment of the present invention. The method shown in FIG. 8 includes:

801. A second GW receives a bearer generation request message sent by a central processing node, where the bearer generation request message includes identification information of at least one base station, the bearer generation request message is used to instruct the second GW to generate a bearer from the second GW to the at least one base station, and the bearer is used by the second GW to send, to the at least one base station, downlink CoMP user data received from a first GW.

802. The second GW generates the bearer from the second GW to the at least one base station according to the bearer generation request message.

803. The second GW receives the downlink CoMP user data sent by the first GW.

804. The second GW sends the downlink CoMP user data to the at least one base station on the bearer.

In this embodiment of the present invention, a second GW generates a bearer from the second GW to at least one base station according to a bearer generation request message sent by a central processing node, so that downlink CoMP user data sent by a first GW can be sent to the at least one base station by way of the second GW.

It may be understood that the at least one base station is connected to the second GW.

Specifically, in this embodiment of the present invention, for a method implemented by the second GW, reference may be made to related descriptions of the second GW in the foregoing embodiment in FIG. 4. To avoid repetition, details are not described herein again.

Figure 9:
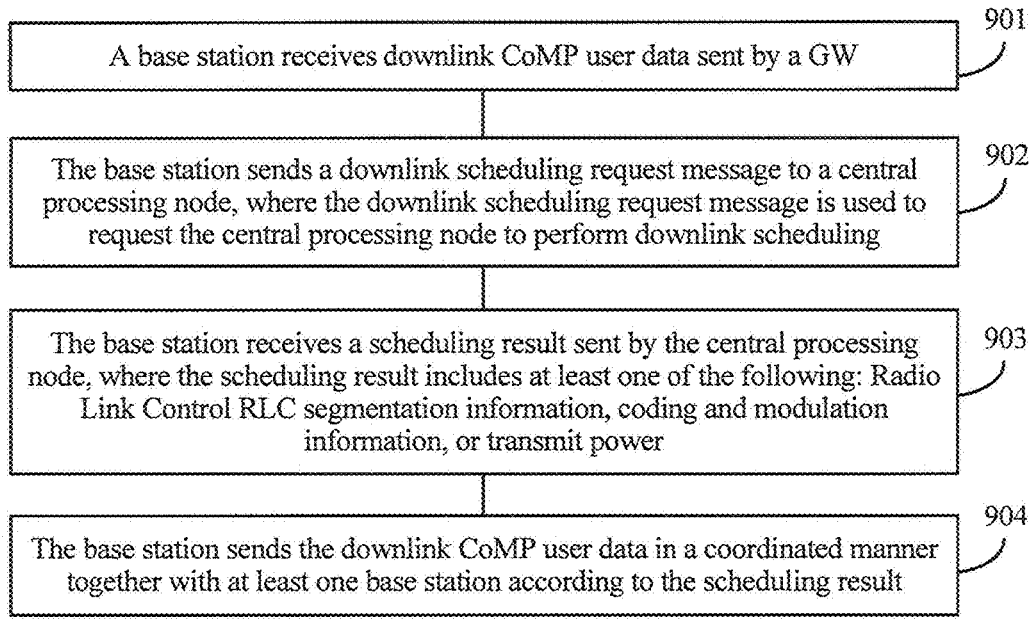
FIG. 9 is a flowchart of a data transmission method according to another embodiment of the present invention.

FIG. 9 is a flowchart of a data transmission method according to another embodiment of the present invention. The method shown in FIG. 9 includes:

901. A base station receives downlink CoMP user data sent by a GW.

902. The base station sends a downlink scheduling request message to a central processing node, where the downlink scheduling request message is used to request the central processing node to perform downlink scheduling.

903. The base station receives a scheduling result sent by the central processing node, where the scheduling result includes at least one of the following:

Radio Link Control RLC segmentation information, coding and modulation information, or transmit power.

904. The base station sends the downlink CoMP user data in a coordinated manner together with at least one base station according to the scheduling result.

In this embodiment of the present invention, a base station receives downlink CoMP user data from a GW, and sends, according to a scheduling result of a central processing node, the downlink CoMP user data to a target user in a coordinated manner together with at least one base station, which can ensure transmission of the downlink CoMP user data.

In this embodiment of the present invention, the GW sends the downlink CoMP user data to the base station and the at least one base station with the central processing node bypassed.

The at least one base station may receive the downlink CoMP user data from the GW; or the at least one base station may receive the downlink CoMP user data from another GW; or k base stations in the at least one base station receive the downlink CoMP user data from another GW, and another base station in the at least one base station than the k base stations receives the downlink CoMP user data from the GW. The present invention sets no limitation thereon.

It may be understood that the base station is a serving base station of the target user of the downlink CoMP user data.

In this embodiment of the present invention, the downlink scheduling request message in step 902 may include at least one of the following: identification information of the base station, identification information of the target user of the downlink CoMP user data, or a total amount of data that is in a buffer and waits to be sent. Alternatively, the downlink scheduling request message may further include a data priority and an amount of data waiting to be sent of each priority.

Correspondingly, the scheduling result may further include PRB quantity and location information, transmit layer quantity information, antenna quantity information, or the like.

In step 904, the base station may send, together with the at least one base station, the downlink CoMP user data to the target user of the downlink CoMP user data according to the scheduling result. The base station receives feedback information of the target user. Specifically, the feedback information is an ACK message or a NACK message.

Further, the base station sends the feedback information to the central processing node.

In one case, the base station sends an ACK message to the central processing node; the base station receives a first message sent by the central processing node, where the first message is used to instruct the base station to delete a data copy of the downlink CoMP user data; and the base station deletes the data copy of the downlink CoMP user data.

If the base station performs ACK decoding, the base station receives an ACK message sent by the target user, and performs ACK decoding, so that it may be determined that the downlink CoMP user data is transmitted successfully. In this case, the base station sends the ACK message to the central processing node, and the base station deletes the stored data copy of the downlink CoMP user data. Then, after receiving the ACK message, the central processing node generates the first message and sends the first message to the at least one base station, where the first message is used to instruct the at least one base station to delete the data copy of the downlink CoMP user data. After receiving the first message, the base station deletes the data copy of the downlink CoMP user data.

If the central processing node performs ACK decoding, after receiving an ACK message sent by the target user, the base station forwards the ACK message to the central processing node, which may mean that the ACK message is transparently transmitted to the central processing node. After receiving the ACK message, the central processing node performs ACK decoding and determines that the downlink CoMP user data is transmitted successfully. Then, the central processing node generates the first message and sends the first message to the base station and the at least one base station, where the first message is used to instruct the base station and the at least one base station to delete the data copy of the downlink CoMP user data. After receiving the first message, the base station deletes the data copy of the downlink CoMP user data.

In another case, the base station sends a NACK message to the central processing node; the base station receives a retransmission scheduling acknowledgement message or a first message sent by the central processing node, where the retransmission rescheduling acknowledgement message is used to instruct the base station to send the downlink CoMP user data in a coordinated manner together with the at least one base station again, and the first message is used to instruct the base station to delete a data copy of the downlink CoMP user data; and the base station sends the downlink CoMP user data in a coordinated manner together with the at least one base station again according to the retransmission rescheduling acknowledgement message; or the base station deletes the data copy of the downlink CoMP user data according to the first message.

In the another case, the base station may perform NACK decoding, or the central processing node may perform NACK decoding. The present invention sets no limitation thereon.

In this embodiment of the present invention, a base station receives downlink CoMP user data from a GW, and sends, according to a scheduling result of a central processing node, the downlink CoMP user data to a target user in a coordinated manner together with at least one base station, which can ensure transmission of the downlink CoMP user data.

Figure 10:
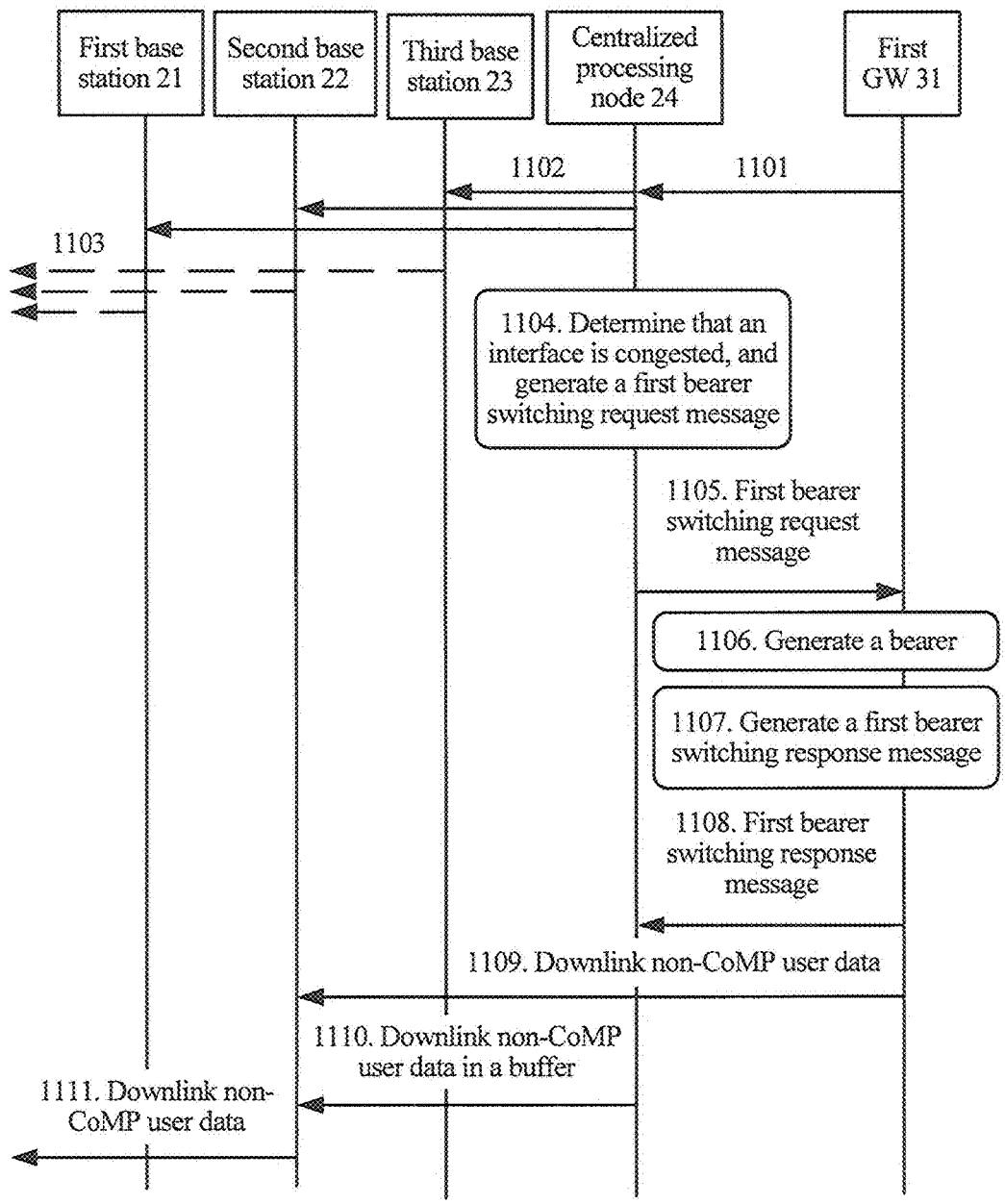
FIG. 10 is a schematic flowchart of a data transmission method according to an embodiment of the present invention.

FIG. 10 is a schematic flowchart of a data transmission method according to an embodiment of the present invention. FIG. 10 shows a first GW 31, a first base station 21, a second base station 22, a third base station 23, and a central processing node 24. In addition, it is assumed that there are two terminals (not shown in FIG. 10) that are a first terminal and a second terminal respectively, where a serving base station of the first terminal is the first base station 21, and a serving base station of the second terminal is the second base station 22.

1101. The first GW 31 sends downlink user data to the central processing node 24 by using an interface between the central processing node 24 and the first GW 31, where the downlink user data includes first downlink CoMP user data to the first terminal, second downlink CoMP user data to the second terminal, and downlink non-CoMP user data to the second terminal, where the interface between the central processing node 24 and the first GW 31 is an S1 interface of the central processing node 24.

The first downlink CoMP user data needs to be sent by the first base station 21 and the second base station 22 in a coordinated manner, and the second downlink CoMP user data needs to be sent by the first base station 21, the second base station 22, and the third base station 23 in a coordinated manner.

1102. The central processing node 24 sends the downlink user data to a corresponding base station, where specifically, the central processing node 24 sends the first downlink CoMP user data and the second downlink CoMP user data to the first base station 21, sends the first downlink CoMP user data, the second downlink CoMP user data, and the downlink non-CoMP user data to the second base station 22, and sends the second downlink CoMP user data to the third base station 23.

It should be noted that three solid arrows are shown in FIG. 10 for this step.

It should be noted that herein, the central processing node 24 may first perform joint precoding on the first downlink CoMP user data, and then send jointly-precoded first downlink CoMP user data to the first base station 21 and the second base station 22. Likewise, the central processing node 24 may first perform joint precoding on the second downlink CoMP user data, and then send jointly-precoded second downlink CoMP user data to the first base station 21, the second base station 22, and the third base station 23.

Alternatively, the central processing node 24 may generate first precoding control information, and send the first precoding control information and the first downlink CoMP user data to the first base station 21 and the second base station 22. Likewise, the central processing node 24 may generate second precoding control information, and send the second precoding control information and the second downlink CoMP user data to the first base station 21, the second base station 22, and the third base station 23. The present invention sets no limitation thereon.

It should be noted that a moment at which the central processing node 24 performs sending is not limited in this embodiment of the present invention. For example, the central processing node 24 may first send CoMP user data and then send non-CoMP user data, or may first send non-CoMP user data and then send CoMP user data, or may send CoMP user data and non-CoMP user data simultaneously or alternately. For example, the central processing node 24 may first send corresponding user data to the first base station 21, or may first send corresponding user data to the second base station 22, or may send corresponding user data first to the third base station 23, or simultaneously to the first base station 21, the second base station 22, and the third base station 23. The present invention sets no limitation thereon.

1103. The first base station 21 and the second base station 22 send the first downlink CoMP user data to the first terminal in a coordinated manner, the first base station 21, the second base station 22, and the third base station 23 send the second downlink CoMP user data to the second terminal in a coordinated manner, and the second base station 22 sends the downlink non-CoMP user data to the second terminal.

It should be noted that three dashed arrows are shown in FIG. 10 for this step.

It should be noted that the downlink user data sent by the first GW 31 in this embodiment of the present invention is merely an illustrative example. For example, actually, the downlink user data may include only downlink CoMP user data, or actually, the downlink user data may be sent to another terminal that is not shown in FIG. 10. The present invention sets no limitation thereon.

However, the downlink user data does not include user data sent to a terminal that uses the central processing node 24 as a serving base station.

For example, it is assumed that a serving base station of a fourth terminal is the central processing node 24.

The first GW 31 sends fourth downlink non-CoMP user data to the central processing node 24, and then, the central processing node 24 sends the fourth downlink non-CoMP user data to the fourth terminal.

In another aspect, it is assumed that coordinating base stations of fourth downlink CoMP user data sent by the first GW 31 to the fourth terminal are the first base station 21, the second base station 22, and the central processing node 24. The first GW 31 sends the fourth downlink CoMP user data to the central processing node 24, and then, the central processing node 24 sends the fourth downlink CoMP user data to the first base station 21 and the second base station 22. Finally, the first base station 21, the second base station 22, and the central processing node 24 send the fourth downlink CoMP user data to the fourth terminal in a coordinated manner.

It may be understood that downlink user data sent by the first GW 31 to the fourth terminal is not considered in this embodiment of the present invention.

1104. When determining that the interface between the central processing node 24 and the first GW 31 is congested, the central processing node 24 generates a first bearer switching request message.

1105. The central processing node 24 sends the first bearer switching request message to the first GW 31.

Specifically, the first bearer switching request message indicates that the central processing node 24 determines that the interface is congested, and the first bearer switching request message is used to instruct the first GW 31 to switch a downlink path of the downlink non-CoMP user data from the central processing node 24 to the second base station 22. That is, the first bearer switching request message instructs the first GW 31 to switch the downlink path of the downlink non-CoMP user data, so that downlink transmission of the downlink non-CoMP user data is performed with the central processing node 24 bypassed.

The first bearer switching request message may include identification information of the second base station 22.

1106. The first GW 31 generates a first bearer from the first GW 31 to the second base station 22 according to the first bearer switching request message.

In addition, the first GW 31 may also release a bearer that is from the first GW 31 to the central processing node 24 and that is used for transmitting the downlink non-CoMP user data.

It should be noted that, before step 1106, after receiving the first bearer switching request message, the first GW 31 may (not shown in FIG. 10) generate first indication information and send the first indication information to the central processing node 24. The first indication information is used to indicate that the first GW 31 has stopped sending the downlink non-CoMP user data to the central processing node 24. It may be understood that the first indication information is an end marker.

1107. The first GW 31 generates a first bearer switching response message.

1108. The first GW 31 sends the first bearer switching response message to the central processing node 24.

1109. The first GW 31 sends the downlink non-CoMP user data to the second base station 22 on the first bearer.

Specifically, the first GW 31 sends the downlink non-CoMP user data to the second base station 22 by using an S1 interface of the second base station 22.

It should be noted that step 1109 is performed after step 1106. Specifically, a sequence for performing step 1109 and steps 1107 or step 1108 is not limited. That is, step 1109 may be performed before or after step 1107, or step 1109 may be performed before or after step 1108. The present invention sets no limitation thereon.

In addition, a buffer of the central processing node 24 further stores downlink non-CoMP user data received from the first GW 31 before step 1105; therefore, the following steps are performed.

1110. The central processing node 24 sends downlink non-CoMP user data in a buffer of the central processing node 24 to the second base station 22.

Further, the central processing node 24 may send (not shown in FIG. 10), to the second base station 22, the first indication information received from the first GW 31.

1111. The second base station 22 sends, to the second terminal, the downlink non-CoMP user data received from the first GW 31.

Specifically, only after receiving the first indication information, the second base station 22 starts to send, to the second terminal, the downlink non-CoMP user data received from the first GW 31 in step 1109.

Specifically, only after sending, to the second terminal, all of the downlink non-CoMP user data received from the central processing node 24, the second base station 22 starts to send, to the second terminal, the downlink non-CoMP user data received from the first GW 31.

In this way, after this embodiment, the downlink non-CoMP user data in the downlink user data sent by the first GW 31 is transmitted to the second base station 22 by using the S1 interface of the second base station 22, as shown in step 1109 in FIG. 10. Then, the second base station 22 sends the downlink non-CoMP user data to the second terminal, as shown in step 1111 in FIG. 10.

The first downlink CoMP user data and the second downlink CoMP user data in the downlink user data sent by the first GW 31 are still sent to the central processing node 24 by using the S1 interface of the central processing node 24 according to methods described in step 1101 to step 1103, and then are sent by the central processing node 24 to base stations for coordinated sending. Specifically, the central processing node 24 sends the first downlink CoMP user data to the first base station 21 and the second base station 22, and sends the second downlink CoMP user data to the first base station 21, the second base station 22, and the third base station 23. Finally, the first base station 21 and the second base station 22 send the first downlink CoMP user data to the first terminal in a coordinated manner, and the first base station 21, the second base station 22, and the third base station 23 send the second downlink CoMP user data to the second terminal in a coordinated manner.

In this way, in this embodiment of the present invention, when it is determined that an interface between a central processing node and a first GW is congested, downlink non-CoMP user data is transmitted to a corresponding base station with the central processing node bypassed, so that data traffic on the interface between the central processing node and the first GW can be reduced, and further, a congestion state of the interface can be relieved or eliminated. Downlink CoMP user data is still transmitted by way of the central processing node, which can ensure transmission efficiency of the downlink CoMP user data.

Optionally, in an embodiment, after the embodiment shown in FIG. 10, the method may further include:

determining, by the central processing node 24, that the interface between the central processing node 24 and the first GW 31 is in a normal state. For example, the central processing node may determine that bandwidth utilization of the interface is greater than a second threshold and less than a first threshold, and downlink transmission is still performed according to the foregoing reception.

It indicates that congestion of the interface has been eliminated after the embodiment described in FIG. 10.

Figure 11:
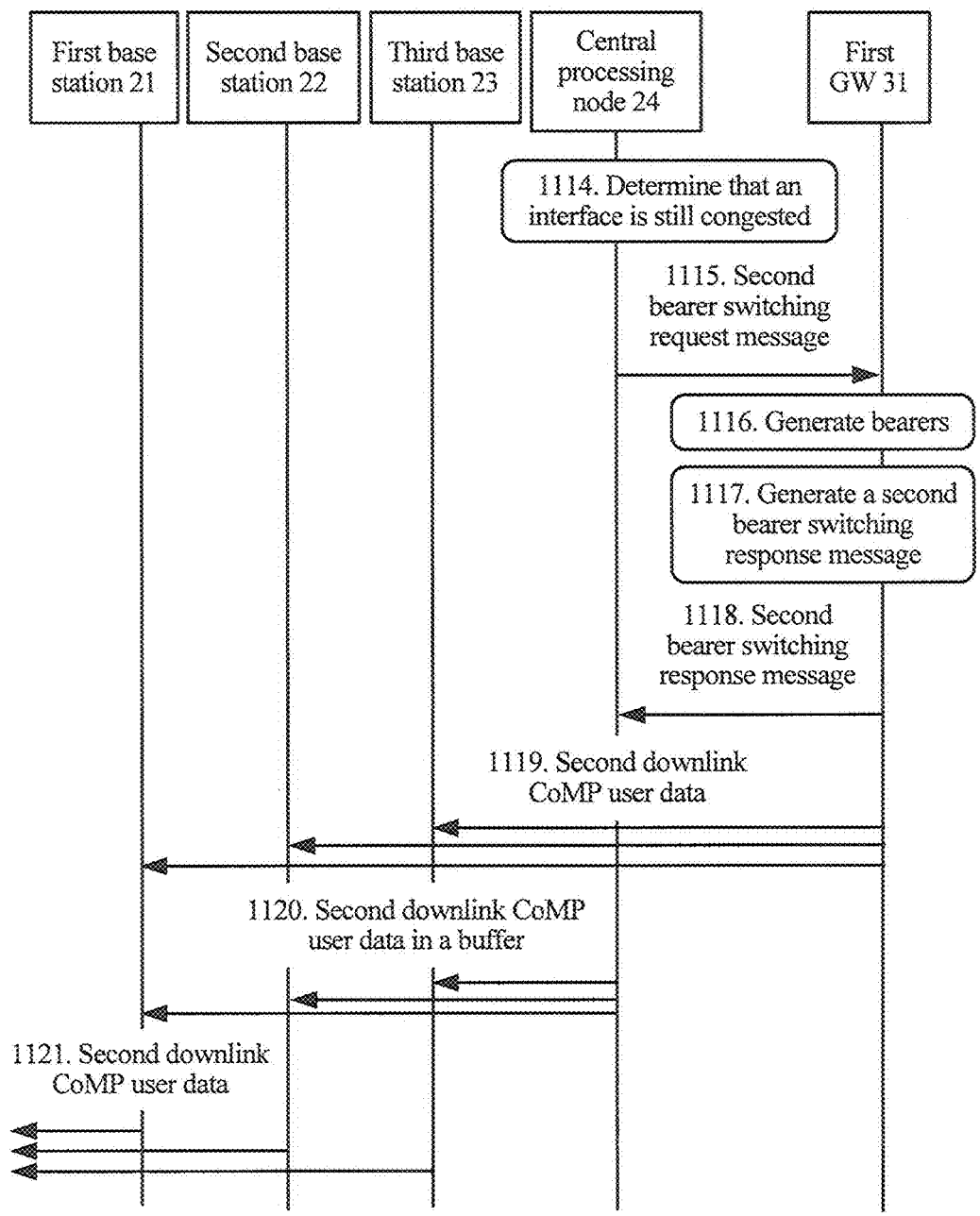
FIG. 11 is a schematic flowchart of a data transmission method according to another embodiment of the present invention.

Optionally, in another embodiment, after the embodiment shown in FIG. 10, as shown in FIG. 11, the method may further include:

1114. The central processing node 24 determines that the interface between the central processing node 24 and the first GW 31 is still congested.

1115. The central processing node 24 sends a second bearer switching request message to the first GW 31.

Specifically, the second bearer switching request message indicates that the central processing node 24 determines that the interface is still congested, and the second bearer switching request message is used to instruct the first GW 31 to switch a downlink path of the second downlink CoMP user data from the central processing node 24 to corresponding base stations. Herein, the base stations corresponding to the second downlink CoMP user data are the first base station 21, the second base station 22, and the third base station 23. That is, the second bearer switching request message instructs the first GW 31 to switch the downlink path of the second downlink CoMP user data, so that downlink transmission of the second downlink CoMP user data is performed with the central processing node 24 bypassed.

The second bearer switching request message may include identification information of the first base station 21, the identification information of the second base station 22, and identification information of the third base station 23.

Optionally, in another embodiment, the second bearer switching request message may be used to instruct the first GW 31 to switch a downlink path of the first downlink CoMP user data. The present invention sets no limitation thereon.

1116. The first GW 31 generates, according to the second bearer switching request message, a second bearer from the first GW 31 to the first base station 21, a third bearer from the first GW 31 to the second base station 22, and a fourth bearer from the first GW 31 to the third base station 23.

It may be understood that, in the embodiment shown in FIG. 11, the first base station 21, the second base station 22, and the third base station 23 are connected to the first GW 31.

In addition, the first GW 31 may also release a bearer that is from the first GW 31 to the central processing node 24 and that is used for transmitting the second downlink CoMP user data.

It should be noted that, before step 1116, after receiving the second bearer switching request message, the first GW 31 may (not shown in FIG. 11) generate second indication information and send the second indication information to the central processing node 24. The second indication information is used to indicate that the first GW 31 has stopped sending the second downlink CoMP user data to the central processing node 24.

It may be understood that the second indication information is an end marker.

1117. The first GW 31 generates a second bearer switching response message.

1118. The first GW 31 sends the second bearer switching response message to the central processing node 24.

1119. The first GW 31 sends the second downlink CoMP user data to the first base station 21, the second base station 22, and the third base station 23.

Specifically, the first GW 31 sends the second downlink CoMP user data to the first base station 21 on the second bearer by using an S1 interface of the first base station 21, sends the second downlink CoMP user data to the second base station 22 on the third bearer by using the S1 interface of the second base station 22, and sends the second downlink CoMP user data to the third base station 23 on the fourth bearer by using an S1 interface of the third base station 23.

It should be noted that step 1119 is performed after step 1116. Specifically, a sequence for performing step 1119 and step 1117 or step 1118 is not limited. That is, step 1119 may be performed before or after step 1117, or step 1119 may be performed before or after step 1118. The present invention sets no limitation thereon.

In addition, the buffer of the central processing node 24 further stores second downlink CoMP user data received from the first GW 31 before step 1115; therefore, the following steps are performed.

1120. The central processing node 24 sends second downlink CoMP user data in the buffer of the central processing node 24 to the first base station 21, the second base station 22, and the third base station 23.

Further, the central processing node 24 may send (not shown in FIG. 11), to the first base station 21, the second base station 22, and the third base station 23, the second indication information received from the first GW 31.

1121. The first base station 21, the second base station 22, and the third base station 23 send, to the second terminal in a coordinated manner, the second downlink CoMP user data received from the first GW 31.

Specifically, only after receiving the second indication information, the first base station 21, the second base station 22, and the third base station 23 start to send, to the second terminal in a coordinated manner, the second downlink CoMP user data received from the first GW 31 in step 1119.

When the first base station 21, the second base station 22, and the third base station 23 perform coordinated sending, the serving base station, that is, the second base station 22, of the second terminal first needs to send a downlink scheduling request message to the central processing node 24, and after the central processing node 24 performs centralized scheduling, the first base station 21, the second base station 22, and the third base station 23 send the second downlink CoMP user data to the second terminal in a coordinated manner according to a scheduling result. Specifically, reference may be made to related descriptions in the embodiment in FIG. 9. To avoid repetition, details are not described herein again.

In this way, after the embodiment shown in FIG. 10, in the downlink user data sent by the first GW 31, user data on which downlink transmission is performed by using the S1 interface of the central processing node includes only downlink CoMP user data that is specifically the first downlink CoMP user data and the second downlink CoMP user data. After the embodiment shown in FIG. 11, in the downlink user data sent by the first GW 31, the second downlink CoMP user data is sent to the first base station 21, the second base station 22, and the third base station 23 respectively by using the S1 interface of the first base station 21, the S1 interface of the second base station 22, and the S1 interface of the third base station 23, as shown in step 1119 in FIG. 11. Then, the first base station 21, the second base station 22, and the third base station 23 send the second downlink CoMP user data to the second terminal in a coordinated manner, as shown in step 1121 in FIG. 11.

The first downlink CoMP user data in the downlink user data sent by the first GW 31 is still sent to the central processing node 24 by using the S1 interface of the central processing node 24 according to the method described in step 1101 to step 1103, then is sent by the central processing node 24 to the first base station 21 and the second base station 22, and finally, is sent by the first base station 21 and the second base station 22 to the first terminal in a coordinated manner.

In this way, in this embodiment of the present invention, after downlink non-CoMP user data is transmitted with a central processing node bypassed, if it is determined that an interface between the central processing node and a first GW is still congested, second downlink CoMP user data in downlink user data is transmitted with the central processing node bypassed. In this way, data traffic that passes through the interface between the central processing node and the first GW can be further reduced, further, a congestion state of the interface can be relieved or eliminated, and transmission efficiency of first downlink CoMP user data can be ensured.

Optionally, if further, the central processing node 24 determines that the interface is in a normal state, it indicates that the congestion state of the interface has been eliminated after the procedures shown in FIG. 10 and FIG. 11.

Optionally, if further, the central processing node 24 determines that the interface is still congested, it indicates that the congestion state of the interface is only relieved after the procedures shown in FIG. 10 and FIG. 11. However, in this case, data on which downlink transmission is performed by using the interface includes only the first downlink CoMP user data sent to the first terminal; therefore, no further processing is performed for the congestion state in this case in this procedure.

Figure 12:
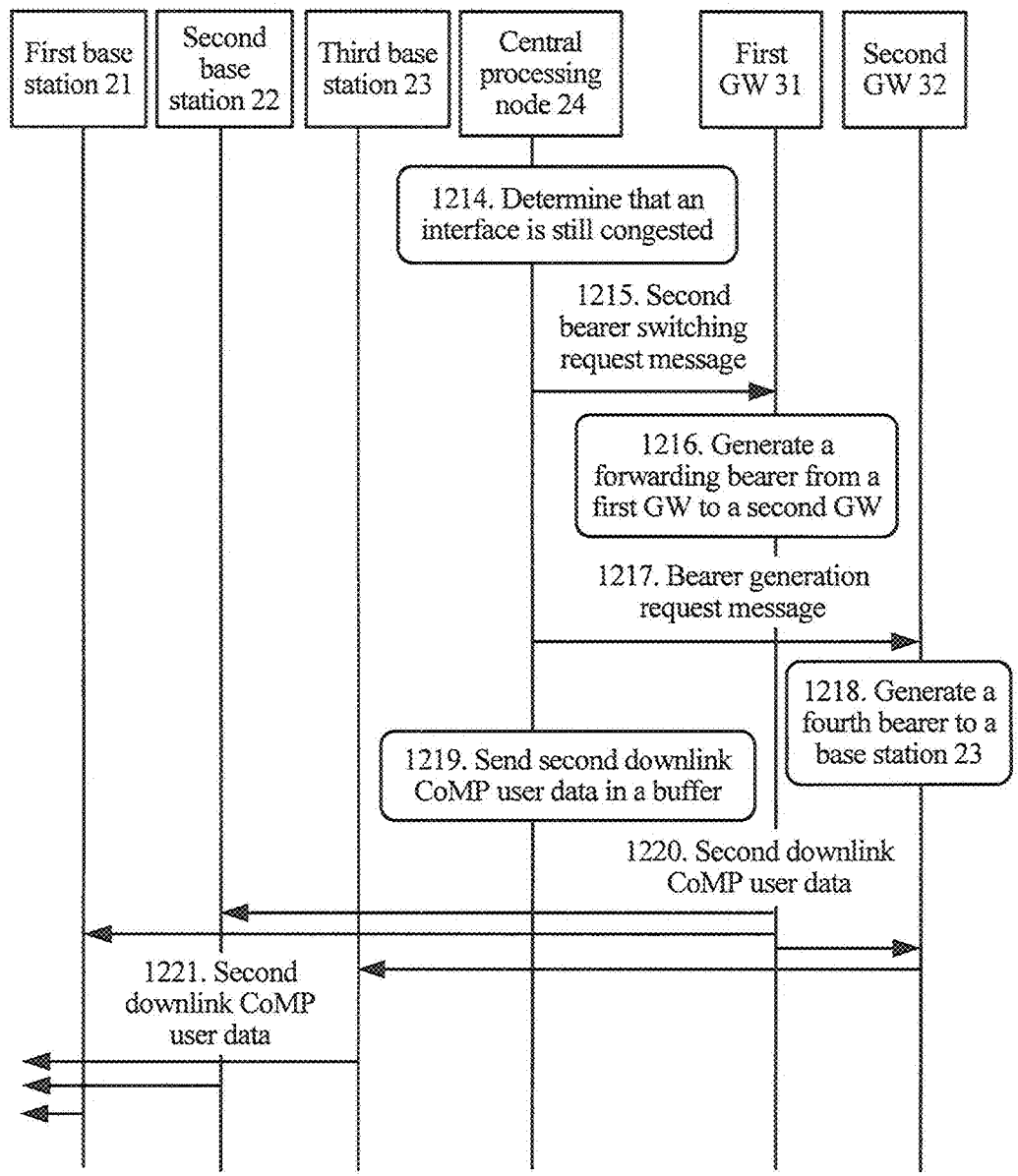
FIG. 12 is a schematic flowchart of a data transmission method according to another embodiment of the present invention.

Optionally, in another embodiment, if the third base station 23 is connected to a second GW, after the embodiment shown in FIG. 10, as shown in FIG. 12, the method may further include:

1214. The central processing node 24 determines that the interface between the central processing node 24 and the first GW 31 is still congested.

1215. The central processing node 24 sends a second bearer switching request message to the first GW 31.

Specifically, the second bearer switching request message indicates that the central processing node 24 determines that the interface is still congested, and the second bearer switching request message is used to instruct the first GW 31 to switch a downlink path of the second downlink CoMP user data from the central processing node 24 to corresponding base stations. The third base station 23 is connected to the second GW 32; in this case, the second bearer switching request message is specifically used for the first GW 31 to send the second downlink CoMP user data to the first base station 21 and the second base station 22 with the central processing node 24 bypassed and generate a forwarding bearer from the first GW 31 to the second GW 32, where the forwarding bearer from the first GW 31 to the second GW 32 is used by the first GW 31 to send the second downlink CoMP user data to the second GW 32.

1216. The first GW 31 generates a forwarding bearer from the first GW 31 to a second GW 32 according to the second bearer switching request message.

In this embodiment, the second bearer switching request message may carry identification information of the first base station 21 and the identification information of the second base station 22. The first GW 31 may generate, according to the second bearer switching request message, a second bearer from the first GW 31 to the first base station 21, and a third bearer from the first GW 31 to the second base station 22.

In addition, the first GW 31 may also release a bearer that is from the first GW 31 to the central processing node 24 and that is used for transmitting the second downlink CoMP user data.

It should be noted that, before step 1216, after receiving the second bearer switching request message, the first GW 31 may (not shown in FIG. 12) generate second indication information and send the second indication information to the central processing node 24. The second indication information is used to indicate that the first GW 31 has stopped sending the second downlink CoMP user data to the central processing node 24.

It may be understood that the second indication information is an end marker.

Optionally, the first GW 31 may also generate a second bearer switching response message and send the second bearer switching response message to the central processing node 24.

1217. The central processing node 24 sends a bearer generation request message to the second GW 32.

It may be understood that the central processing node 24 may have an MME function, and the central processing node 24 may directly send the bearer generation request message to the second GW 32. Alternatively, the central processing node 24 may indirectly send the bearer generation request message to the second GW 32 by way of an MME. The present invention sets no limitation thereon.

The bearer generation request message may include identification information of the third base station 23. The bearer generation request message is used to instruct the second GW 32 to generate a fourth bearer from the second GW to the third base station 23.

1218. The second GW 32 generates a fourth bearer from the second GW 32 to the third base station 23 according to the bearer generation request message.

In this way, the second GW 32 may send, to the third base station 23 on the fourth bearer, the second downlink CoMP user data received from the first GW 31.

Optionally, the second GW 32 may generate a bearer generation response message and send the bearer generation response message to the central processing node 24.

1219. The buffer of the central processing node 24 further stores second downlink CoMP user data received from the first GW 31 before step 1215; therefore, the central processing node 24 sends the second downlink CoMP user data in the buffer of the central processing node 24 to the first base station 21, the second base station 22, and the third base station 23.

Further, the central processing node 24 may send (not shown in FIG. 13), to the first base station 21, the second base station 22, and the third base station 23, the second indication information received from the first GW 31.

Specifically, for step 1219, reference may be made to related descriptions in step 1120 in FIG. 11. To avoid repetition, details are not described herein again.

1220. The first GW 31 sends the second downlink CoMP user data to the first base station 21 on a second bearer, sends the second downlink CoMP user data to the second base station 22 on a third bearer, and sends the second downlink CoMP user data to the second GW 32 on the forwarding bearer from the first GW 31 to the second GW 32, and then, the second GW 32 sends the second downlink CoMP user data to the third base station 23 on the fourth bearer.

1221. The first base station 21, the second base station 22, and the third base station 23 send the second downlink CoMP user data to the second terminal in a coordinated manner.

Specifically, only after receiving the second indication information, the first base station 21, the second base station 22, and the third base station 23 start to send, to the second terminal in a coordinated manner, the second downlink CoMP user data received from the first GW 31 and the second GW 32.

When the first base station 21, the second base station 22, and the third base station 23 perform coordinated sending, the serving base station, that is, the second base station 22, of the second terminal first needs to send a downlink scheduling request message to the central processing node 24, and after the central processing node 24 performs centralized scheduling, the first base station 21, the second base station 22, and the third base station 23 send the second downlink CoMP user data to the second terminal in a coordinated manner according to a scheduling result. Specifically, reference may be made to related descriptions in the embodiment in FIG. 9. To avoid repetition, details are not described herein again.

Optionally, if further, the central processing node 24 determines that the interface is in a normal state, it indicates that a congestion state of the interface has been eliminated after the procedures shown in FIG. 10 and FIG. 12.

Optionally, if further, the central processing node 24 determines that the interface is still congested, it indicates that a congestion state of the interface is only relieved after the procedures shown in FIG. 10 and FIG. 12. However, in this case, data on which downlink transmission is performed by using the interface includes only the first downlink CoMP user data sent to the first terminal; therefore, no further processing is performed for the congestion state in this case in this procedure.

In this way, after the procedures shown in FIG. 10 and FIG. 12, a first GW 31 transmits downlink non-CoMP user data to a second base station 22 with a central processing node 24 bypassed; transmits second downlink CoMP user data to a first base station 21 and the second base station 22 with the central processing node 24 bypassed, and sends the second downlink CoMP user data to a second GW 32, so that the second GW 32 transmits the second downlink CoMP user data to a third base station 23 with the central processing node 24 bypassed; and sends first downlink CoMP user data to the central processing node 24. In this way, a congestion state of an interface between the central processing node 24 and the first GW 31 is relieved or eliminated, and transmission efficiency of the first downlink CoMP user data is ensured.

Figure 13:
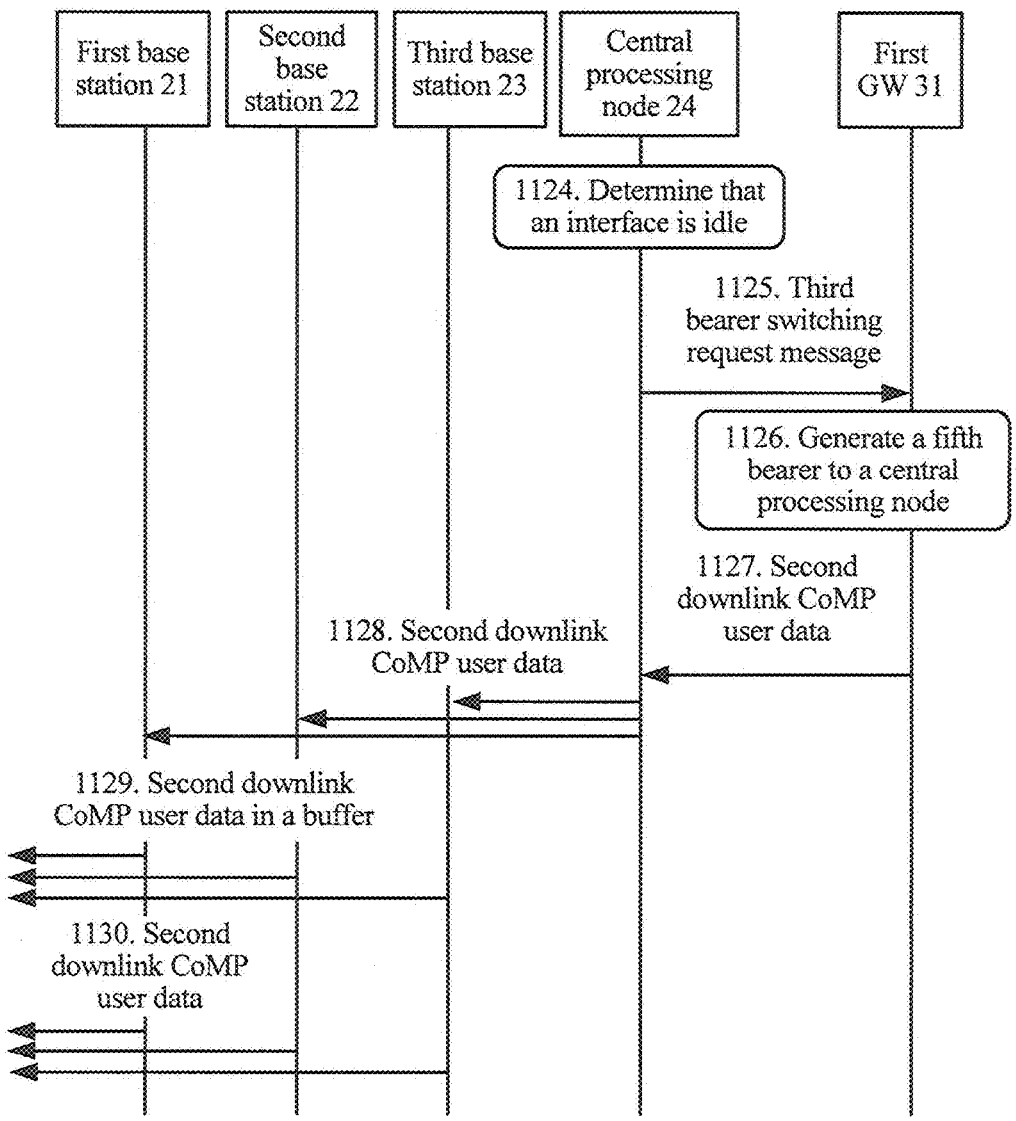
FIG. 13 is a schematic flowchart of a data transmission method according to another embodiment of the present invention.

Optionally, after the method shown in FIG. 11 or FIG. 12, as shown in FIG. 13, the method may further include:

1124. The central processing node 24 determines that the interface between the central processing node 24 and the first GW 31 is idle.

1125. The central processing node 24 sends a third bearer switching request message to the first GW 31.

The third bearer switching request message is used to instruct the first GW 31 to switch the downlink transmission path of the second downlink CoMP user data, so that the central processing node 24 is used for transmission of the second downlink CoMP user data.

1126. The first GW 31 generates a fifth bearer from the first GW 31 to the central processing node 24 according to the third bearer switching request message.

In addition, the first GW 31 may also release bearers that are from the first GW 31 to the first base station 21, the second base station 22, and the third base station 23 and that are used for transmitting the second downlink CoMP user data.

Alternatively, if the third base station 23 is connected to the second GW 32, the first GW 31 may also release bearers that are from the first GW 31 to the first base station 21 and the second base station 22 and that are used for transmitting the second downlink CoMP user data, and release the forwarding bearer from the first GW 31 to the second GW 32.

It should be noted that, after step 1125, the first GW 31 may (not shown in FIG. 13) generate third indication information and send the third indication information to the first base station 21, the second base station 22, and the third base station 23. The third indication information is used to indicate that the first GW 31 has stopped sending the second downlink CoMP user data to the first base station 21, the second base station 22, and the third base station 23.

It may be understood that the third indication information is an end marker.

Optionally, the first GW 31 may generate a third bearer switching response message and send the third bearer switching response message to the central processing node 24.

1127. The first GW 31 sends the second downlink CoMP user data to the central processing node 24 on the fifth bearer.

1128. Further, the central processing node 24 sends, to the first base station 21, the second base station 22, and the third base station 23, the second downlink CoMP user data received from the first GW 31.

In addition, buffers of the first base station 21, the second base station 22, and the third base station 23 further store second downlink CoMP user data received from the first GW 31 or from the first GW 31 and the second GW 32 before step 1128; therefore, the following steps are performed.

1129. The first base station 21, the second base station 22, and the third base station 23 send second downlink CoMP user data respectively in a buffer of the first base station 21, a buffer of the second base station 22, and a buffer of the third base station 23 to the second terminal in a coordinated manner.

1130. The first base station 21, the second base station 22, and the third base station 23 send, to the second terminal in a coordinated manner, the second downlink CoMP user data received from the central processing node 24.

Specifically, after receiving the third indication information, the first base station 21, the second base station 22, and the third base station 23 send, to the second terminal in a coordinated manner, the second downlink CoMP user data received from the central processing node 24.

In this way, in this embodiment, when it is determined that an interface between a central processing node and a first GW is idle, second downlink CoMP user data is switched from transmission with the central processing node bypassed to transmission by way of the central processing node. In this way, utilization of the interface can be improved, and transmission efficiency of CoMP user data can be ensured.

Figure 14:
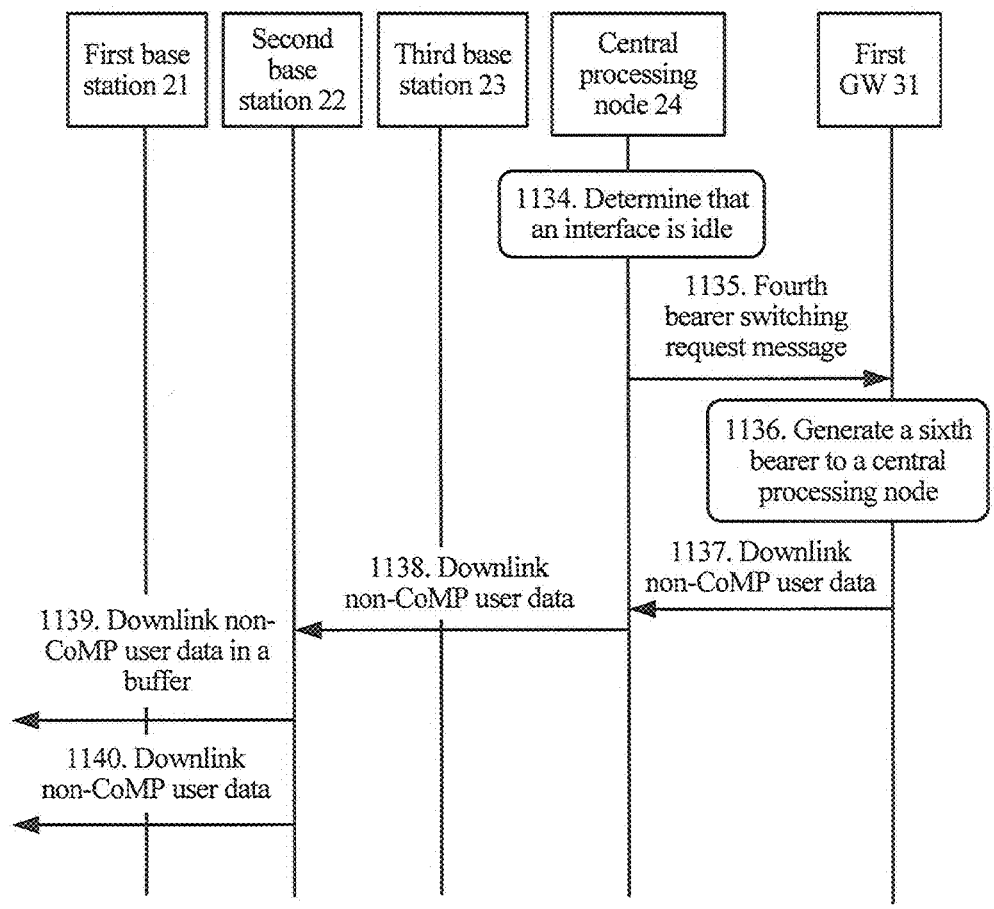
FIG. 14 is a schematic flowchart of a data transmission method according to another embodiment of the present invention.

Optionally, further, after the method shown in FIG. 13, as shown in FIG. 14, the method may further include:

1134. The central processing node 24 determines that the interface between the central processing node 24 and the first GW 31 is still idle.

1135. The central processing node 24 sends a fourth bearer switching request message to the first GW 31.

The fourth bearer switching request message is used to instruct the first GW 31 to switch the downlink transmission path of the downlink non-CoMP user data, so that the central processing node 24 is used for transmission of the downlink non-CoMP user data.

1136. The first GW 31 generates a sixth bearer from the first GW 31 to the central processing node according to the fourth bearer switching request message.

In addition, the first GW 31 may also release the bearer that is from the first GW 31 to the second base station 22 and that is used for transmitting the downlink non-CoMP user data.

It should be noted that, after step 1135, the first GW 31 may (not shown in FIG. 14) generate fourth indication information and send the fourth indication information to the second base station 22. The fourth indication information is used to indicate that the first GW 31 has stopped sending the downlink non-CoMP user data to the second base station 22.

It may be understood that the fourth indication information is an end marker.

For example, the first GW 31 may add the fourth indication information to the last data packet sent to the second base station 22.

Optionally, the first GW 31 may generate a fourth bearer switching response message and send the fourth bearer switching response message to the central processing node 24.

1137. The first GW 31 may send the downlink non-CoMP user data to the central processing node 24 on the sixth bearer.

Specifically, the first GW 31 sends the downlink non-CoMP user data to the central processing node 24 by using the interface between the central processing node 24 and the first GW 31.

1138. Further, the central processing node 24 sends, to the second base station 22, the downlink non-CoMP user data received from the first GW 31.

In addition, the buffer of the second base station 22 further stores downlink non-CoMP user data received from the first GW 31 before step 1135; therefore, the following steps are performed.

1139. The second base station 22 sends downlink non-CoMP user data in the buffer of the second base station 22 to the second terminal.

1140. The second base station 22 sends, to the second terminal, the downlink non-CoMP user data received from the central processing node 24.

Specifically, only after receiving the fourth indication information sent by the first GW 31, the second base station 22 sends, to the second terminal, the downlink non-CoMP user data received from the central processing node 24.

In this way, in this embodiment, all CoMP user data sent by a first GW is transmitted by way of a central processing node, and when the central processing node further determines that the interface is still idle, downlink non-CoMP user data sent by the first GW is also transmitted by way of the central processing node. In this way, utilization of the interface can be improved.

In this way, in the embodiments shown in FIG. 13 and FIG. 14, when a central processing node determines that an interface between the central processing node and a first GW is idle, second downlink CoMP user data is switched from downlink transmission with the central processing node bypassed to transmission by way of the central processing node. In this way, not only utilization of the interface can be improved, but also transmission efficiency of the second downlink CoMP user data can be ensured. Further, if the central processing node determines that the interface between the central processing node and the first GW is still idle, downlink non-CoMP user data may also be switched from downlink transmission with the central processing node bypassed to transmission by way of the central processing node. In this way, the utilization of the interface can be further improved.

Figure 15:
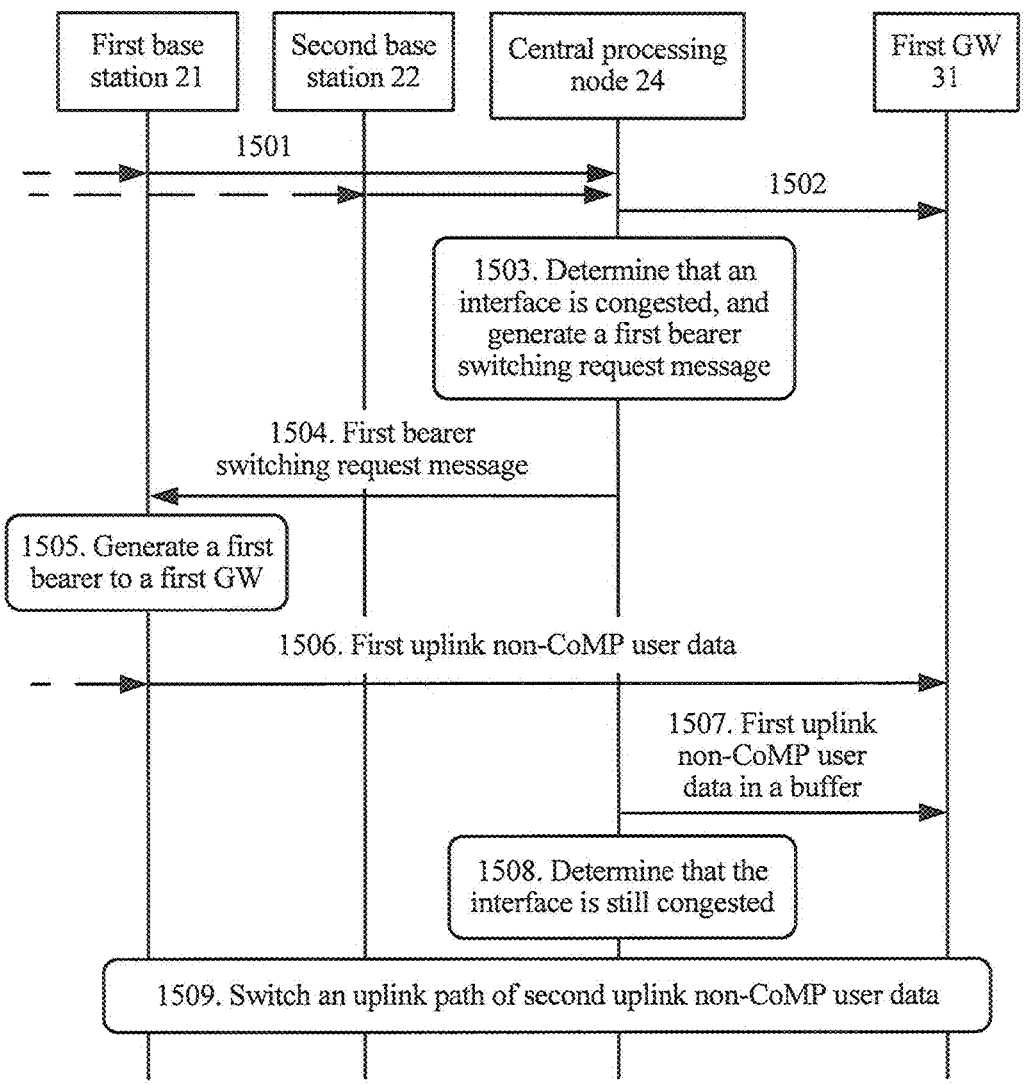
FIG. 15 is a schematic flowchart of a data transmission method according to another embodiment of the present invention.

FIG. 15 is a schematic flowchart of a data transmission method according to another embodiment of the present invention. FIG. 15 shows a first GW 31, a first base station 21, a second base station 22, and a central processing node 24. In addition, it is assumed that there are three terminals (not shown in FIG. 15) that are a first terminal, a second terminal, and a third terminal respectively, where a serving base station of the first terminal is the first base station 21, a serving base station of the second terminal is the second base station 22, and a serving base station of the third terminal is also the second base station 22.

1501. The first base station 21 receives first uplink non-CoMP user data from the first terminal, and sends the first uplink non-CoMP user data to the central processing node 24; the second base station 22 receives second uplink non-CoMP user data from the second terminal, and sends the second uplink non-CoMP user data to the central processing node 24; and the first base station 21 and the second base station 22 receive uplink CoMP user data from the third terminal, and send the uplink CoMP user data to the central processing node 24 in a coordinated manner.

1502. The central processing node 24 sends the first uplink non-CoMP user data, the second uplink non-CoMP user data, and the uplink CoMP user data to the first GW 31.

Specifically, the central processing node 24 sends the first uplink non-CoMP user data, the second uplink non-CoMP user data, and the uplink CoMP user data to the first GW 31 by using an interface between the central processing node 24 and the first GW 31. The interface between the central processing node 24 and the first GW 31 may be an S1 interface of the central processing node 24.

1503. When determining that an interface between the central processing node 24 and the first GW 31 is congested, the central processing node 24 generates a first bearer switching request message.

1504. The central processing node 24 sends the first bearer switching request message to the first base station 21, where the first bearer switching request message is used to instruct the first base station 21 to transmit the first uplink non-CoMP user data to the first GW 31 with the central processing node 24 bypassed.

1505. The first base station 21 generates a first bearer from the first base station 21 to the first GW 31 according to the first bearer switching request message.

Optionally, after step 1504, the first base station 21 may (not shown in FIG. 15) generate first indication information and send the first indication information to the central processing node 24. The first indication information is used to indicate that the first base station 21 has stopped sending the first uplink non-CoMP user data to the central processing node 24. It may be understood that the first indication information is an end marker.

Optionally, the first base station 21 may also (not shown in FIG. 15) generate a first bearer switching response message and send the first bearer switching response message to the central processing node 24.

1506. In this way, the first base station 21 may send the first uplink non-CoMP user data to the first GW 31 on the first bearer, that is, the first base station 21 transmits the first uplink non-CoMP user data to the first GW 31 with the central processing node 24 bypassed.

It may be understood that the first base station 21 sends the first uplink non-CoMP user data to the first GW 31 by using an interface between the first base station 21 and the first GW 31. The interface between the first base station 21 and the first GW 31 may be an S1 interface of the first base station 21.

In addition, the first base station 21 may further release an uplink transmission resource that is from the first base station 21 to the central processing node 24 and that is used for transmitting the first uplink non-CoMP user data.

In addition, a buffer of the central processing node 24 further stores first uplink non-CoMP user data received from the first base station 21 before step 1504; therefore, the following step is performed.

1507. The central processing node 24 sends first uplink non-CoMP user data in a buffer of the central processing node 24 to the first GW 31.

Optionally, the central processing node 24 may send (not shown in FIG. 15), to the first GW 31, the first indication information received from the first base station 21.

For example, the central processing node 24 may add the first indication information to the last data packet of the first uplink non-CoMP user data sent to the first GW 31. In this way, only after receiving the first indication information, the first GW 31 sends (not shown in FIG. 15), to a core network, the first uplink non-CoMP user data received from the first base station 21 in step 1506.

In this way, in the foregoing embodiment, when a central processing node determines that an interface between the central processing node and a first GW is congested, first uplink non-CoMP user data is switched from uplink transmission by way of the central processing node to transmission with the central processing node bypassed. In this way, data traffic that passes through the interface can be reduced, and further, a congestion state of the interface can be relieved or eliminated. It may be understood that, in this embodiment, a part of non-CoMP user data in uplink non-CoMP user data is transmitted with the central processing node bypassed.

Optionally, if further, after the foregoing embodiment,

1508. The central processing node 24 determines that the interface between the central processing node 24 and the first GW 31 is still congested.

It indicates that after step 1507, the congestion state of the interface is merely relieved; therefore, the following step is performed.

1509. An uplink path of the second uplink non-CoMP user data may be further switched, where specifically, the central processing node 24 may send another bearer switching request message to the second base station 22, and the another bearer switching request message is used to instruct the second base station 22 to transmit the second uplink non-CoMP user data with the central processing node 24 bypassed.

Specifically, a method for switching the uplink path of the second uplink non-CoMP user data is similar to the foregoing step 1504 to step 1507. To avoid repetition, details are not described herein again.

Optionally, if further, after step 1507, the central processing node 24 determines that the interface between the central processing node 24 and the first GW 31 is in a normal state, it indicates that the congestion state of the interface has been eliminated after step 1507.

It should be noted that, after step 1509, if the central processing node 24 determines that the interface is still congested, it indicates that the congestion state of the interface is only relieved after the the method shown in FIG. 15. However, in this case, data on which uplink transmission is performed by way of the central processing node 24 includes only the uplink CoMP user data; therefore, the central processing node 24 performs no processing for the congestion state in this case.

It may be understood that uplink CoMP user data needs to be transmitted to a first GW by way of a central processing node.

In this way, in this embodiment of the present invention, in an uplink data transmission process, when a central processing node determines that an interface between the central processing node and a first GW is congested, a part of non-CoMP user data or all non-CoMP user data in uplink user data is transmitted to the first GW with the central processing node bypassed, so that data traffic that passes through the interface can be reduced, further, a congestion state of the interface can be relieved or eliminated, and transmission efficiency of uplink CoMP user data transmitted by way of the central processing node can be ensured.

Figure 16:
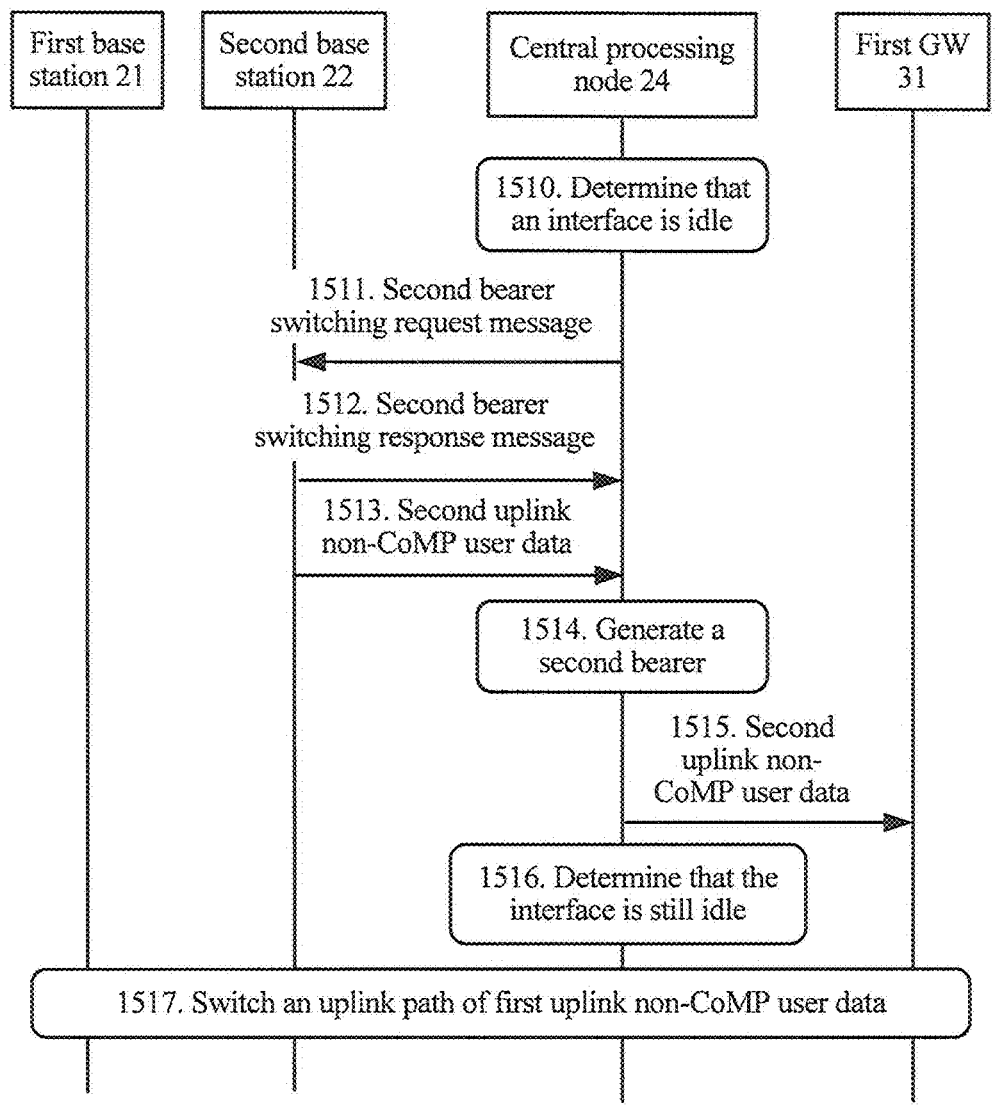
FIG. 16 is a schematic flowchart of a data transmission method according to another embodiment of the present invention.

Optionally, in another embodiment, after the embodiment shown in FIG. 15, as shown in FIG. 16, the method may further include:

1510. When determining that the interface between the central processing node 24 and the first GW 31 is idle, the central processing node 24 generates a second bearer switching request message.

1511. The central processing node 24 sends the second bearer switching request message to the second base station 22.

The second bearer switching request message is used to instruct the second base station 22 to transmit the second uplink non-CoMP user data to the first GW 31 by way of the central processing node 24.

Optionally, after step 1511, the second base station 22 may (not shown in FIG. 16) generate second indication information and send the second indication information to the first GW 31. The second indication information is used to indicate that the second base station 22 has stopped sending the second uplink non-CoMP user data to the first GW 31. It may be understood that the second indication information is an end marker. For example, the second base station 22 may add the second indication information to the last data packet of the second uplink non-CoMP user data sent to the first GW 31.

1512. The second base station 22 may also (not shown in FIG. 16) generate a second bearer switching response message and send the second bearer switching response message to the central processing node 24.

1513. The second base station 22 switches the uplink transmission path of the second uplink non-CoMP user data according to the second bearer switching request message, and specifically sends the second uplink non-CoMP user data to the central processing node 24.

It should be noted that this step may be performed after step 1511, for example, may be performed before or after step 1512, or may be performed before or after step 1514. The present invention sets no limitation thereon.

1514. The central processing node 24 generates a second bearer from the central processing node 24 to the first GW 31 according to the second bearer switching response message.

1515. In this way, the central processing node 24 may send, to the first GW 31 on the second bearer, the second uplink non-CoMP user data received from the second base station 22.

Specifically, the central processing node 24 may send the second uplink non-CoMP user data to the first GW 31 on the second bearer by using the interface between the central processing node 24 and the first GW 31.

It should be noted that only after receiving the second indication information sent by the second base station 22, the first GW 31 sends, to the core network, the second uplink non-CoMP user data received from the central processing node 24.

In this way, in this embodiment of the present invention, in an uplink transmission process, when a central processing node determines that an interface between the central processing node and a first GW is idle, second uplink non-CoMP user data is switched from uplink transmission with the central processing node bypassed to uplink transmission by way of the central processing node. In this way, utilization of the interface can be improved.

It should be noted that, in this embodiment of the present invention, the central processing node may also receive fourth uplink non-CoMP user data sent by a terminal within a service range of the central processing node. The present invention sets no limitation thereon. However, in this embodiment of the present invention, uplink non-CoMP user data sent by the terminal within the service range of the central processing node is not switched.

Optionally, if further,

1516. The central processing node 24 determines that the interface between the central processing node 24 and the first GW 31 is still idle.

1517. An uplink path of the first uplink non-CoMP user data may be further switched, where specifically, the central processing node 24 may send a third bearer switching request message to the first base station 21, and the third bearer switching request message is used to instruct the first base station 21 to transmit the first uplink non-CoMP user data by way of the central processing node.

Specifically, a method for switching the uplink path of the first uplink non-CoMP user data is similar to the foregoing step 1511 to step 1515. To avoid repetition, details are not described herein again.

Optionally, if further, after step 1515, the central processing node 24 determines that the interface between the central processing node 24 and the first GW 31 is in a normal state, step 1517 does not need to be performed.

In this way, in this embodiment of the present invention, in an uplink transmission process, when a central processing node determines that an interface between the central processing node and a first GW is idle, a part of non-CoMP user data or all non-CoMP user data is switched from uplink transmission with the central processing node bypassed to transmission by way of the central processing node. In this way, utilization of the interface can be improved.

Figure 17:
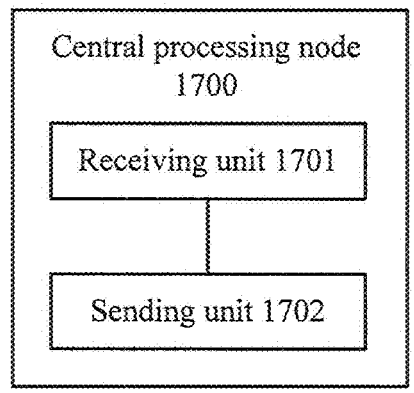
FIG. 17 is a block diagram of a central processing node according to an embodiment of the present invention.

FIG. 17 is a block diagram of a central processing node according to an embodiment of the present invention. A central processing node 1700 shown in FIG. 17 includes a receiving unit 1701 and a sending unit 1702.

The receiving unit 1701 is configured to receive downlink user data from a first gateway GW.

The sending unit 1702 is configured to send, to a corresponding base station, the downlink user data received by the receiving unit 1701.

The sending unit 1702 is further configured to: when it is determined that an interface between the central processing node 1700 and the first GW is congested, send a first bearer switching request message to the first GW, where the first bearer switching request message is used to instruct the first GW to transmit data with the central processing node 1700 bypassed.

In this embodiment of the present invention, when determining that an interface between a central processing node and a first GW is congested, the central processing node sends a first bearer switching request message to the first GW, so that the first GW transmits downlink user data with the central processing node bypassed. In this way, data traffic on the interface between the central processing node and the first GW can be reduced, and further, a congestion state of the interface can be relieved or eliminated.

Optionally, in an embodiment, the downlink user data includes downlink non-coordinated multipoint transmission/reception CoMP user data and downlink CoMP user data. The sending unit 1702 is specifically configured to: send the downlink non-CoMP user data to a first base station, and send the downlink CoMP user data to at least two base stations, where the first base station is a base station serving a target user of the downlink non-CoMP user data, the at least two base stations are configured to send the downlink CoMP user data in a coordinated manner, and the first bearer switching request message is specifically used to instruct the first GW to transmit the downlink non-CoMP user data to the first base station with the central processing node 1700 bypassed.

Optionally, in another embodiment, the downlink CoMP user data includes first downlink CoMP user data and second downlink CoMP user data, and the sending the downlink CoMP user data to at least two base stations includes: sending the first downlink CoMP user data to at least two second-base-stations, and sending the second downlink CoMP user data to at least two third-base-stations, where the at least two second-base-stations are configured to send the first downlink CoMP user data in a coordinated manner, and the at least two third-base-stations are configured to send the second downlink CoMP user data in a coordinated manner. The sending unit 1702 is further configured to: when it is determined that the interface is still congested, send a second bearer switching request message to the first GW, where the second bearer switching request message is used to instruct the first GW to transmit the first downlink CoMP user data to the at least two second-base-stations with the central processing node 1700 bypassed.

Optionally, in another embodiment, k number of second-base-stations in the at least two second-base-stations are connected to a second GW, and the second bearer switching request message is specifically used to instruct the first GW to transmit the first downlink CoMP user data to another base station in the at least two second-base-stations than the k number of second-base-stations with the central processing node 1700 bypassed, and is further used to instruct the first GW to generate a forwarding bearer from the first GW to the second GW and send the first downlink CoMP user data to the second GW on the forwarding bearer. The sending unit 1702 is further configured to send a bearer generation request message to the second GW, where the bearer generation request message includes identification information of the k number of second-base-stations, and the bearer generation request message is used to instruct the second GW to generate bearers from the second GW to the k number of second-base-stations, so that the second GW transmits, to the k number of second-base-stations, on the bearers with the central processing node 1700 bypassed, the first downlink CoMP user data received from the first GW, where k is a positive integer.

Optionally, in another embodiment, the downlink user data is downlink CoMP user data, the downlink CoMP user data includes first downlink CoMP user data and second downlink CoMP user data, and the sending unit 1702 is specifically configured to: send the first downlink CoMP user data to at least two second-base-stations, and send the second downlink CoMP user data to at least two third-base-stations. The at least two second-base-stations are configured to send the first downlink CoMP user data in a coordinated manner, the at least two third-base-stations are configured to send the second downlink CoMP user data in a coordinated manner, and the first bearer switching request message is specifically used to instruct the first GW to transmit the first downlink CoMP user data to the at least two second-base-stations with the central processing node 1700 bypassed.

Optionally, in another embodiment, k number of second-base-stations in the at least two second-base-stations are connected to a second GW, and the first bearer switching request message is specifically used to instruct the first GW to transmit the first downlink CoMP user data to another base station in the at least two second-base-stations than the k number of second-base-stations with the central processing node 1700 bypassed, and is further used to instruct the first GW to generate a forwarding bearer from the first GW to the second GW and send the first downlink CoMP user data to the second GW on the forwarding bearer. The sending unit 1702 is further configured to send a bearer generation request message to the second GW, where the bearer generation request message includes identification information of the k number of second-base-stations, and the bearer generation request message is used to instruct the second GW to generate bearers from the second GW to the k number of second-base-stations, so that the second GW transmits, to the k number of second-base-stations, on the bearers with the central processing node 1700 bypassed, the first downlink CoMP user data received from the first GW, where k is a positive integer.

Optionally, in another embodiment, the central processing node 1700 further includes a processing unit. The receiving unit 1701 is further configured to receive a downlink scheduling request message sent by a serving base station that is of a target user of the first downlink CoMP user data and that is in the at least two second-base-stations; the processing unit is configured to perform downlink scheduling; and the sending unit 1702 is further configured to send a scheduling result of the processing node to the at least two second-base-stations. The scheduling result includes at least one of the following: Radio Link Control RLC segmentation information, coding and modulation information, or transmit power.

Optionally, in another embodiment, the receiving unit 1701 is further configured to receive an ACK message sent by the base station serving the target user of the first downlink CoMP user data; and the sending unit 1702 is further configured to send a first message to the at least two second-base-stations, where the first message is used to instruct the at least two second-base-stations to delete a data copy of the first downlink CoMP user data.

Optionally, in another embodiment, the receiving unit 1701 is further configured to receive a NACK message sent by the base station serving the target user of the first downlink CoMP user data; and the sending unit 1702 is further configured to: when a quantity of retransmissions does not reach a preset maximum quantity of retransmissions, send a retransmission scheduling acknowledgement message to the at least two second-base-stations, where the retransmission scheduling acknowledgement message is used to instruct the at least two second-base-stations to send the first downlink CoMP user data in a coordinated manner again; or when a quantity of retransmissions reaches a preset maximum quantity of retransmissions, send a first message to the at least two second-base-stations, where the first message is used to instruct the at least two second-base-stations to delete a data copy of the first downlink CoMP user data.

Optionally, in another embodiment, the sending unit 1702 is further configured to: when it is determined that the interface is idle, send a third bearer switching request message to the first GW, where the third bearer switching request message is used to instruct the first GW to transmit the downlink user data to the corresponding base station by way of the central processing node 1700.

The central processing node 1700 shown in FIG. 17 can implement processes executed by central processing nodes in FIG. 4, FIG. 5, and FIG. 8 to FIG. 14. To avoid repetition, details are not described herein again.

Figure 18:
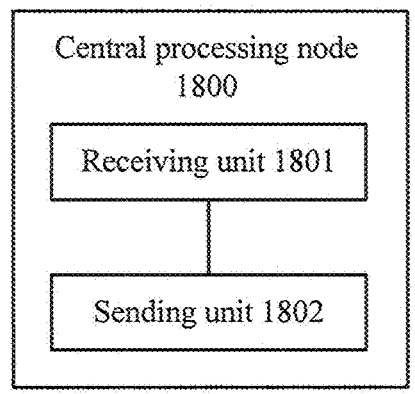
FIG. 18 is a block diagram of a central processing node according to another embodiment of the present invention.

FIG. 18 is a block diagram of a central processing node according to another embodiment of the present invention. A central processing node 1800 shown in FIG. 18 includes a receiving unit 1801 and a sending unit 1802.

The receiving unit 1801 is configured to receive uplink user data, where the uplink user data includes uplink non-coordinated multipoint transmission/reception CoMP user data sent by a first base station.

The sending unit 1802 is configured to send, to a first gateway GW, the uplink user data received by the receiving unit 1801.

The sending unit 1802 is further configured to: when it is determined that an interface between the central processing node 1800 and the first GW is congested, send a first bearer switching request message to the first base station, where the first bearer switching request message is used to instruct the first base station to transmit the uplink non-CoMP user data to the first GW with the central processing node 1800 bypassed.

In this embodiment of the present invention, in an uplink data transmission process, when a central processing node determines that an interface between the central processing node and a first GW is congested, the central processing node sends a first bearer switching request message to a first base station, so that uplink non-CoMP user data is transmitted to the first GW with the central processing node bypassed, so that data traffic that passes through the interface between the central processing node and the first GW can be reduced, and further, a congestion state of the interface can be relieved or eliminated.

Optionally, in an embodiment, the uplink user data further includes uplink CoMP user data, and the receiving unit 1801 is specifically configured to: receive the uplink non-CoMP user data from the first base station, and receive the uplink CoMP user data from at least two second-base-stations.

Optionally, in another embodiment, the sending unit 1802 is further configured to: when it is determined that the interface is idle, send a second bearer switching request message to the first base station, where the second bearer switching request message is used to instruct the first base station to transmit the uplink non-CoMP user data to the first GW by way of the central processing node 1800.

The central processing node 1800 in FIG. 18 can implement processes executed by central processing nodes in FIG. 6, FIG. 15, and FIG. 16. To avoid repetition, details are not described herein again.

Figure 19:
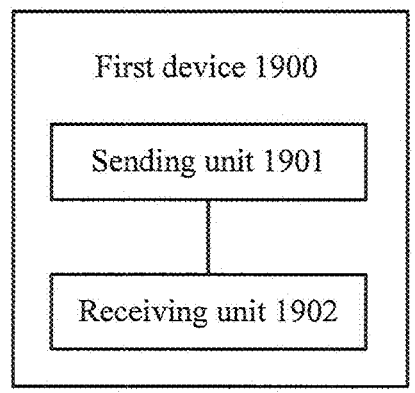
FIG. 19 is a block diagram of a first device according to an embodiment of the present invention.

FIG. 19 is a block diagram of a first device according to an embodiment of the present invention. A first device 1900 shown in FIG. 19 includes a sending unit 1901 and a receiving unit 1902.

The sending unit 1901 is configured to send user data to a central processing node, so that the central processing node sends the user data to a second device.

The receiving unit 1902 is configured to receive a first bearer switching request message sent by the central processing node, where the first bearer switching request message is used to instruct the first device 1900 to bypass the central processing node when transmitting data.

The sending unit 1901 is further configured to send the user data to the second device according to the first bearer switching request message received by the receiving unit 1902.

In this embodiment of the present invention, a first device switches, according to a first bearer switching request message sent by a central processing node, a part of data in user data from transmission by way of the central processing node to transmission with the central processing node bypassed. In this way, data traffic that passes through an interface between the central processing node and a first GW can be reduced, and further, a congestion state of the interface can be relieved or eliminated.

Optionally, in an embodiment, the first device 1900 is a first gateway GW, and the second device is a base station corresponding to the user data.

Optionally, the user data includes downlink non-coordinated multipoint transmission/reception CoMP user data and downlink CoMP user data, the first bearer switching request message is specifically used to instruct the first device 1900 to bypass the central processing node when transmitting the downlink non-CoMP user data to a first base station, and the first base station is a base station serving a target user of the downlink non-CoMP user data. The sending unit 1901 is specifically configured to: bypass the central processing node when transmitting the downlink non-CoMP user data to the first base station, and send the downlink CoMP user data to the central processing node, so that the central processing node sends the downlink CoMP user data to at least two base stations, where the at least two base stations are configured to send the downlink CoMP user data in a coordinated manner, and the second device includes the first base station and the at least two base stations.

Optionally, the downlink CoMP user data includes first downlink CoMP user data and second downlink CoMP user data. The receiving unit 1902 is further configured to receive a second bearer switching request message sent by the central processing node, where the second bearer switching request message is used to instruct the first device 1900 to transmit the first downlink CoMP user data to at least two second-base-stations with the central processing node bypassed. The sending unit 1901 is further configured to: transmit, according to the second bearer switching request message received by the receiving unit 1902, the first downlink CoMP user data to the at least two second-base-stations with the central processing node bypassed, and send the second downlink CoMP user data to the central processing node, so that the central processing node sends the second downlink CoMP user data to at least two third-base-stations. The at least two base stations include the at least two second-base-stations and the at least two third-base-stations, the at least two second-base-stations are configured to send the first downlink CoMP user data in a coordinated manner, and the at least two third-base-stations are configured to send the second downlink CoMP user data in a coordinated manner.

Optionally, k number of second-base-stations in the at least two second-base-stations are connected to a second GW, the second bearer switching request message is specifically used to instruct the first GW to transmit the first downlink CoMP user data to another base station in the at least two second-base-stations than the k number of second-base-stations with the central processing node bypassed, and is further used to instruct the first GW to generate a forwarding bearer from the first GW to the second GW and send the first downlink CoMP user data to the second GW on the forwarding bearer, and the transmitting the first downlink CoMP user data to the at least two second-base-stations with the central processing node bypassed includes: transmitting the first downlink CoMP user data to the another base station in the at least two second-base-stations than the k number of second-base-stations with the central processing node bypassed, and sending the first downlink CoMP user data to the second GW on the forwarding bearer, so that the second GW transmits the first downlink CoMP user data to the k number of second-base-stations with the central processing node bypassed, where k is a positive integer.

Optionally, the user data is downlink CoMP user data, the downlink CoMP user data includes first downlink CoMP user data and second downlink CoMP user data, and the first bearer switching request message is specifically used to instruct the first GW to transmit the first downlink CoMP user data to at least two second-base-stations with the central processing node bypassed. The sending unit 1901 is specifically configured to: bypass the central processing node when transmitting the first downlink CoMP user data to the at least two second-base-stations, and send the second downlink CoMP user data to the central processing node, so that the central processing node sends the second downlink CoMP user data to at least two third-base-stations. The second device includes the at least two second-base-stations and the at least two third-base-stations, the at least two second-base-stations are configured to send the first downlink CoMP user data in a coordinated manner, and the at least two third-base-stations are configured to send the second downlink CoMP user data in a coordinated manner.

Optionally, k number of second-base-stations in the at least two second-base-stations are connected to a second GW, the first bearer switching request message is specifically used to instruct the first GW to transmit the first downlink CoMP user data to another base station in the at least two second-base-stations than the k number of second-base-stations with the central processing node bypassed, and is further used to instruct the first GW to generate a forwarding bearer from the first GW to the second GW and send the first downlink CoMP user data to the second GW on the forwarding bearer, and the transmitting the first downlink CoMP user data to the at least two second-base-stations with the central processing node bypassed includes: transmitting the first downlink CoMP user data to the another base station in the at least two second-base-stations than the k number of second-base-stations with the central processing node bypassed, and sending the first downlink CoMP user data to the second GW on the forwarding bearer, so that the second GW transmits the first downlink CoMP user data to the k number of second-base-stations with the central processing node bypassed, where k is a positive integer.

Optionally, in another embodiment, the first device 1900 is a first base station, the second device is a first GW, the user data includes uplink non-CoMP user data, and the first bearer switching request message is specifically used to instruct the first device 1900 to transmit the uplink non-CoMP user data to the second device with the central processing node bypassed. The sending unit 1901 is specifically configured to transmit the uplink non-CoMP user data to the second device with the central processing node bypassed.

Optionally, the user data further includes uplink CoMP user data, and the sending unit 1901 is further configured to send the uplink CoMP user data to the central processing node in a coordinated manner together with at least one base station, so that the central processing node sends the uplink CoMP user data to the second device, where the first device 1900 and the at least one base station are configured to send the uplink CoMP user data in a coordinated manner.

Optionally, the receiving unit 1902 is further configured to receive a third bearer switching request message sent by the central processing node, where the second bearer switching request message is used to instruct the first device 1900 to transmit data by way of the central processing node; and the sending unit 1901 is further configured to send the user data to the second device according to the second bearer switching request message received by the receiving unit 1902.

When the first device 1900 in FIG. 19 is a first GW, the first device 1900 can implement processes executed by first GWs in FIG. 4, FIG. 5, and FIG. 8 to FIG. 14, and processes executed by a first device in FIG. 7 when the first device is a first GW. To avoid repetition, details are not described herein again.

When the first device 1900 in FIG. 19 is a first base station, the first device 1900 can implement processes executed by first base stations in FIG. 6, FIG. 15, and FIG. 16, and processes executed by a first device in FIG. 7 when the first device is a first base station. To avoid repetition, details are not described herein again.

Figure 20:
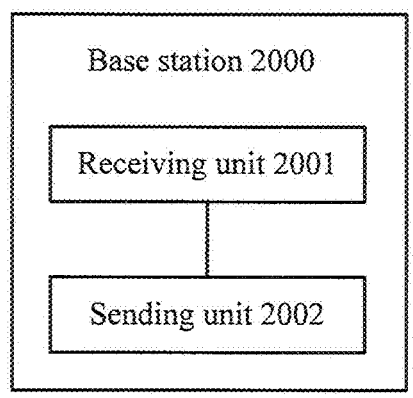
FIG. 20 is a block diagram of a base station according to an embodiment of the present invention.

FIG. 20 is a block diagram of a base station according to an embodiment of the present invention. A base station 2000 shown in FIG. 20 includes a receiving unit 2001 and a sending unit 2002.

The receiving unit 2001 is configured to receive downlink coordinated multipoint transmission/reception CoMP user data sent by a gateway GW.

The sending unit 2002 is configured to send a downlink scheduling request message to a central processing node, where the downlink scheduling request message is used to request the central processing node to perform downlink scheduling.

The receiving unit 2001 is further configured to receive a scheduling result sent by the central processing node, where the scheduling result includes at least one of the following: Radio Link Control RLC segmentation information, coding and modulation information, or transmit power.

The sending unit 2002 is further configured to send, in a coordinated manner together with at least one base station according to the scheduling result received by the receiving unit 2001, the downlink CoMP user data received by the receiving unit 2001, where the base station is a base station serving a target user of the downlink CoMP user data.

In this embodiment of the present invention, a base station receives downlink CoMP user data from a GW, and sends, according to a scheduling result of a central processing node, the downlink CoMP user data to a target user in a coordinated manner together with at least one base station, which can ensure transmission of the downlink CoMP user data.

In this embodiment of the present invention, the GW sends the downlink CoMP user data to the base station and the at least one base station with the central processing node bypassed.

Optionally, in an embodiment, the base station 2000 further includes a processing unit. The sending unit 2002 is further configured to send an ACK message to the central processing node; the receiving unit 2001 is further configured to receive a first message sent by the central processing node, where the first message is used to instruct the base station 2000 to delete a data copy of the downlink CoMP user data; and the processing unit is configured to delete the data copy of the downlink CoMP user data according to the first message received by the receiving unit 2001.

Optionally, in another embodiment, the base station 2000 further includes a processing unit. The sending unit 2002 is further configured to send a NACK message to the central processing node; the receiving unit 2001 is further configured to receive a retransmission scheduling acknowledgement message or a first message sent by the central processing node, where the retransmission scheduling acknowledgement message is used to instruct the base station 2000 to send the downlink CoMP user data in a coordinated manner together with the at least one base station again, and the first message is used to instruct the base station 2000 to delete a data copy of the downlink CoMP user data; and the processing unit is configured to send the downlink CoMP user data in a coordinated manner together with the at least one base station again according to the retransmission scheduling acknowledgement message received by the receiving unit 2001; or delete the data copy of the downlink CoMP user data according to the first message received by the receiving unit 2001.

The base station 2000 in FIG. 20 can implement processes executed by serving base stations of target users of downlink CoMP user data in FIG. 4, FIG. 5, and FIG. 9 to FIG. 14. To avoid repetition, details are not described herein again.

Figure 21:
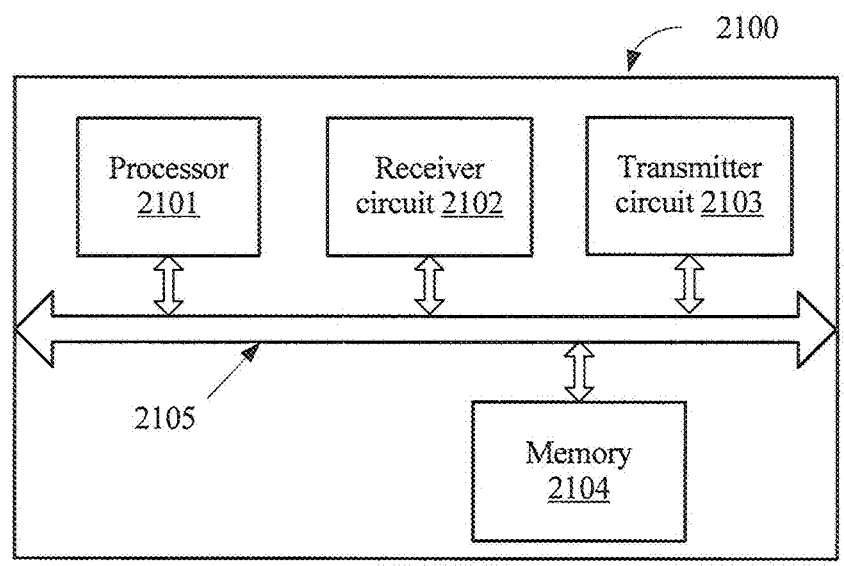
FIG. 21 is a block diagram of a central processing node according to another embodiment of the present invention.

FIG. 21 is a block diagram of a central processing node according to another embodiment of the present invention. A central processing node 2100 shown in FIG. 21 includes a processor 2101, a receiver circuit 2102, a transmitter circuit 2103, and a memory 2104.

The receiver circuit 2102 is configured to receive downlink user data from a first gateway GW.

The transmitter circuit 2103 is configured to send, to a corresponding base station, the downlink user data received by the receiver circuit 2102.

The transmitter circuit 2103 is further configured to: when the processor 2101 determines that an interface between the central processing node 2100 and the first GW is congested, send a first bearer switching request message to the first GW, where the first bearer switching request message is used to instruct the first GW to transmit data with the central processing node 2100 bypassed.

In this embodiment of the present invention, when determining that an interface between a central processing node and a first GW is congested, the central processing node sends a first bearer switching request message to the first GW, so that the first GW transmits downlink user data with the central processing node bypassed. In this way, data traffic on the interface between the central processing node and the first GW can be reduced, and further, a congestion state of the interface can be relieved or eliminated.

Components of the central processing node 2100 are coupled together by using a bus system 2105, where in addition to a data bus, the bus system 2105 includes a power bus, a control bus, and a status signal bus. However, for clarity of description, various buses are marked as the bus system 2105 in FIG. 21.

Optionally, in an embodiment, the downlink user data includes downlink non-coordinated multipoint transmission/reception CoMP user data and downlink CoMP user data. The transmitter circuit 2103 is specifically configured to: send the downlink non-CoMP user data to a first base station, and send the downlink CoMP user data to at least two base stations, where the first base station is a base station serving a target user of the downlink non-CoMP user data, the at least two base stations are configured to send the downlink CoMP user data in a coordinated manner, and the first bearer switching request message is specifically used to instruct the first GW to transmit the downlink non-CoMP user data to the first base station with the central processing node 2100 bypassed.

Optionally, in another embodiment, the downlink CoMP user data includes first downlink CoMP user data and second downlink CoMP user data, and the sending the downlink CoMP user data to at least two base stations includes: sending the first downlink CoMP user data to at least two second-base-stations, and sending the second downlink CoMP user data to at least two third-base-stations, where the at least two second-base-stations are configured to send the first downlink CoMP user data in a coordinated manner, and the at least two third-base-stations are configured to send the second downlink CoMP user data in a coordinated manner. The transmitter circuit 2103 is further configured to: when it is determined that the interface is still congested, send a second bearer switching request message to the first GW, where the second bearer switching request message is used to instruct the first GW to transmit the first downlink CoMP user data to the at least two second-base-stations with the central processing node 2100 bypassed.

Optionally, in another embodiment, k number of second-base-stations in the at least two second-base-stations are connected to a second GW, and the second bearer switching request message is specifically used to instruct the first GW to transmit the first downlink CoMP user data to another base station in the at least two second-base-stations than the k number of second-base-stations with the central processing node 2100 bypassed, and is further used to instruct the first GW to generate a forwarding bearer from the first GW to the second GW and send the first downlink CoMP user data to the second GW on the forwarding bearer. The transmitter circuit 2103 is further configured to send a bearer generation request message to the second GW, where the bearer generation request message includes identification information of the k number of second-base-stations, and the bearer generation request message is used to instruct the second GW to generate bearers from the second GW to the k number of second-base-stations, so that the second GW transmits, to the k number of second-base-stations, on the bearers with the central processing node 2100 bypassed, the first downlink CoMP user data received from the first GW, where k is a positive integer.

Optionally, in another embodiment, the downlink user data is downlink CoMP user data, the downlink CoMP user data includes first downlink CoMP user data and second downlink CoMP user data, and the transmitter circuit 2103 is specifically configured to: send the first downlink CoMP user data to at least two second-base-stations, and send the second downlink CoMP user data to at least two third-base-stations. The at least two second-base-stations are configured to send the first downlink CoMP user data in a coordinated manner, the at least two third-base-stations are configured to send the second downlink CoMP user data in a coordinated manner, and the first bearer switching request message is specifically used to instruct the first GW to transmit the first downlink CoMP user data to the at least two second-base-stations with the central processing node 2100 bypassed.

Optionally, in another embodiment, k number of second-base-stations in the at least two second-base-stations are connected to a second GW, and the first bearer switching request message is specifically used to instruct the first GW to transmit the first downlink CoMP user data to another base station in the at least two second-base-stations than the k number of second-base-stations with the central processing node 2100 bypassed, and is further used to instruct the first GW to generate a forwarding bearer from the first GW to the second GW and send the first downlink CoMP user data to the second GW on the forwarding bearer. The transmitter circuit 2103 is further configured to send a bearer generation request message to the second GW, where the bearer generation request message includes identification information of the k number of second-base-stations, and the bearer generation request message is used to instruct the second GW to generate bearers from the second GW to the k number of second-base-stations, so that the second GW transmits, to the k number of second-base-stations, on the bearers with the central processing node 2100 bypassed, the first downlink CoMP user data received from the first GW, where k is a positive integer.

Optionally, in another embodiment, the receiver circuit 2102 is further configured to receive a downlink scheduling request message sent by a serving base station that is of a target user of the first downlink CoMP user data and that is in the at least two second-base-stations; the processor 2101 is configured to perform downlink scheduling; and the transmitter circuit 2103 is further configured to send a scheduling result of the processing node to the at least two second-base-stations. The scheduling result includes at least one of the following: Radio Link Control RLC segmentation information, coding and modulation information, or transmit power.

Optionally, in another embodiment, the receiver circuit 2102 is further configured to receive an ACK message sent by the base station serving the target user of the first downlink CoMP user data; and the transmitter circuit 2103 is further configured to send a first message to the at least two second-base-stations, where the first message is used to instruct the at least two second-base-stations to delete a data copy of the first downlink CoMP user data.

Optionally, in another embodiment, the receiver circuit 2102 is further configured to receive a NACK message sent by the base station serving the target user of the first downlink CoMP user data; and the transmitter circuit 2103 is further configured to: when a quantity of retransmissions does not reach a preset maximum quantity of retransmissions, send a retransmission scheduling acknowledgement message to the at least two second-base-stations, where the retransmission scheduling acknowledgement message is used to instruct the at least two second-base-stations to send the first downlink CoMP user data in a coordinated manner again; or when a quantity of retransmissions reaches a preset maximum quantity of retransmissions, send a first message to the at least two second-base-stations, where the first message is used to instruct the at least two second-base-stations to delete a data copy of the first downlink CoMP user data.

Optionally, in another embodiment, the transmitter circuit 2103 is further configured to: when it is determined that the interface is idle, send a third bearer switching request message to the first GW, where the third bearer switching request message is used to instruct the first GW to transmit the downlink user data to the corresponding base station by way of the central processing node 2100.

The foregoing methods disclosed in the embodiments of the present invention may be applied to the processor 2101, or implemented by the processor 2101. The processor 2101 may be an integrated circuit chip and has a signal processing capability. In an implementation process, the steps of the foregoing methods may be completed by means of an integrated logic circuit of hardware in the processor 2101 or an instruction in a form of software. The foregoing processor 2101 may be a general-purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic component, a discrete gate or a transistor logic component, or a discrete hardware component, and may implement or execute methods, steps, and logical block diagrams disclosed in the embodiments of the present invention. The general-purpose processor may be a microprocessor or the processor may be any conventional processor or the like. Steps of the methods disclosed with reference to the embodiments of the present invention may be directly executed and completed by means of a hardware decoding processor, or may be executed and completed by using a combination of hardware and software modules in a decoding processor. The software module may be located in a mature storage medium in the art, such as a random access memory (Random Access Memory, RAM), a flash memory, a read-only memory (Read-Only Memory, ROM), a programmable read-only memory, an electrically-erasable programmable memory, or a register. The storage medium is located in the memory 2104, and the processor 2101 reads information in the memory 2104 and completes the steps of the foregoing methods in combination with hardware of the processor 2101.

The central processing node 2100 shown in FIG. 21 can implement processes executed by central processing nodes in FIG. 4, FIG. 5, and FIG. 8 to FIG. 14. To avoid repetition, details are not described herein again.

Figure 22:
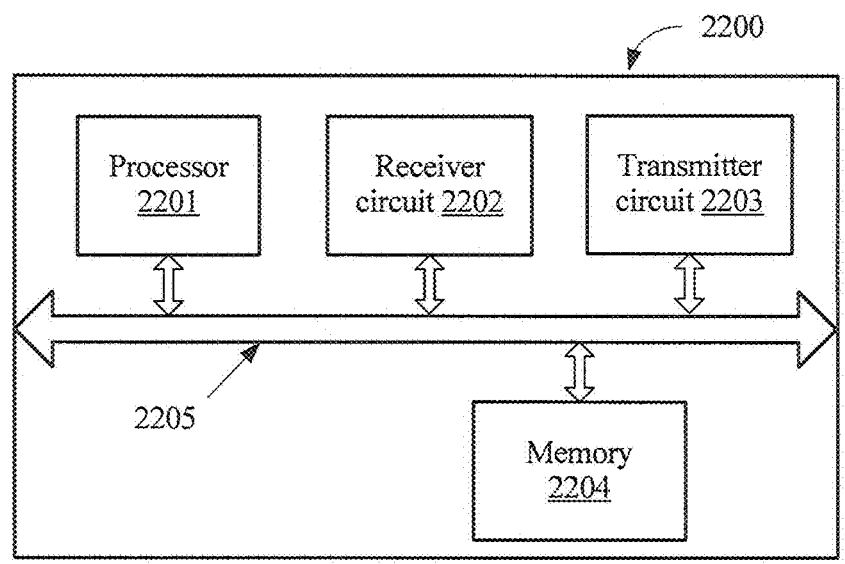
FIG. 22 is a block diagram of a central processing node according to another embodiment of the present invention.

FIG. 22 is a block diagram of a central processing node according to another embodiment of the present invention. A central processing node 2200 shown in FIG. 22 includes a processor 2201, a receiver circuit 2202, a transmitter circuit 2203, and a memory 2204.

The receiver circuit 2202 is configured to receive uplink user data, where the uplink user data includes uplink non-coordinated multipoint transmission/reception CoMP user data sent by a first base station.

The transmitter circuit 2203 is configured to send, to a first gateway GW, the uplink user data received by the receiver circuit 2202.

The transmitter circuit 2203 is further configured to: when the processor 2201 determines that an interface between the central processing node 2200 and the first GW is congested, send a first bearer switching request message to the first base station, where the first bearer switching request message is used to instruct the first base station to transmit the uplink non-CoMP user data to the first GW with the central processing node 2200 bypassed.

In this embodiment of the present invention, in an uplink data transmission process, when a central processing node determines that an interface between the central processing node and a first GW is congested, the central processing node sends a first bearer switching request message to a first base station, so that uplink non-CoMP user data is transmitted to the first GW with the central processing node bypassed, so that data traffic that passes through the interface between the central processing node and the first GW can be reduced, and further, a congestion state of the interface can be relieved or eliminated.

Components of the central processing node 2200 are coupled together by using a bus system 2205, where in addition to a data bus, the bus system 2205 includes a power bus, a control bus, and a status signal bus. However, for clarity of description, various buses are marked as the bus system 2205 in FIG. 22.

Optionally, in an embodiment, the uplink user data further includes uplink CoMP user data, and the receiver circuit 2202 is specifically configured to: receive the uplink non-CoMP user data from the first base station, and receive the uplink CoMP user data from at least two second-base-stations.

Optionally, in another embodiment, the transmitter circuit 2203 is further configured to: when the processor 2201 determines that the interface is idle, send a second bearer switching request message to the first base station, where the second bearer switching request message is used to instruct the first base station to transmit the uplink non-CoMP user data to the first GW by way of the central processing node 2200.

The foregoing methods disclosed in the embodiments of the present invention may be applied to the processor 2201, or implemented by the processor 2201. The processor 2201 may be an integrated circuit chip and has a signal processing capability. In an implementation process, the steps of the foregoing methods may be completed by means of an integrated logic circuit of hardware in the processor 2201 or an instruction in a form of software. The foregoing processor 2201 may be a general-purpose processor, a DSP, an ASIC, an FPGA or another programmable logic component, a discrete gate or a transistor logic component, or a discrete hardware component, and may implement or execute methods, steps, and logical block diagrams disclosed in the embodiments of the present invention. The general-purpose processor may be a microprocessor or the processor may be any conventional processor or the like. Steps of the methods disclosed with reference to the embodiments of the present invention may be directly executed and completed by means of a hardware decoding processor, or may be executed and completed by using a combination of hardware and software modules in a decoding processor. The software module may be located in a mature storage medium in the field, such as a RAM, a flash memory, a ROM, a programmable read-only memory, an electrically-erasable programmable memory, or a register. The storage medium is located in the memory 2204, and the processor 2201 reads information in the memory 2204 and completes the steps of the foregoing methods in combination with hardware of the processor 2201.

The central processing node 2200 in FIG. 22 can implement processes executed by central processing nodes in FIG. 6, FIG. 15, and FIG. 16. To avoid repetition, details are not described herein again.

Figure 23:
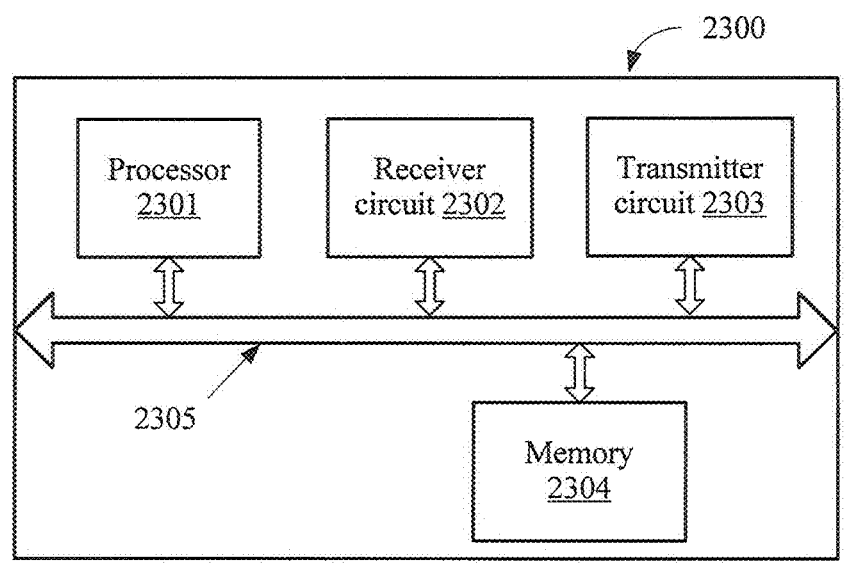
FIG. 23 is a block diagram of a first device according to another embodiment of the present invention.

FIG. 23 is a block diagram of a first device according to another embodiment of the present invention. A first device 2300 shown in FIG. 23 includes a processor 2301, a receiver circuit 22302, a transmitter circuit 2303, and a memory 2304.

The transmitter circuit 2303 is configured to send user data to a central processing node, so that the central processing node sends the user data to a second device.

The receiver circuit 2302 is configured to receive a first bearer switching request message sent by the central processing node, where the first bearer switching request message is used to instruct the first device 2300 to bypass the central processing node when transmitting data.

The transmitter circuit 2303 is further configured to send the user data to the second device according to the first bearer switching request message received by the receiver circuit 2302.

In this embodiment of the present invention, a first device switches, according to a first bearer switching request message sent by a central processing node, a part of data in user data from transmission by way of the central processing node to transmission with the central processing node bypassed. In this way, data traffic that passes through an interface between the central processing node and a first GW can be reduced, and further, a congestion state of the interface can be relieved or eliminated.

Components of the first device 2300 are coupled together by using a bus system 2305, where in addition to a data bus, the bus system 2305 includes a power bus, a control bus, and a status signal bus. However, for clarity of description, various buses are marked as the bus system 2305 in FIG. 23.

Optionally, in an embodiment, the first device 2300 is a first gateway GW, and the second device is a base station corresponding to the user data.

Optionally, the user data includes downlink non-coordinated multipoint transmission/reception CoMP user data and downlink CoMP user data, the first bearer switching request message is specifically used to instruct the first device 2300 to bypass the central processing node when transmitting the downlink non-CoMP user data to a first base station, and the first base station is a base station serving a target user of the downlink non-CoMP user data. The transmitter circuit 2303 is specifically configured to: bypass the central processing node when transmitting the downlink non-CoMP user data to the first base station, and send the downlink CoMP user data to the central processing node, so that the central processing node sends the downlink CoMP user data to at least two base stations, where the at least two base stations are configured to send the downlink CoMP user data in a coordinated manner, and the second device includes the first base station and the at least two base stations.

Optionally, the downlink CoMP user data includes first downlink CoMP user data and second downlink CoMP user data. The receiver circuit 2302 is further configured to receive a second bearer switching request message sent by the central processing node, where the second bearer switching request message is used to instruct the first device 2300 to transmit the first downlink CoMP user data to at least two second-base-stations with the central processing node bypassed. The transmitter circuit 2303 is further configured to: transmit, according to the second bearer switching request message received by the receiver circuit 2302, the first downlink CoMP user data to the at least two second-base-stations with the central processing node bypassed, and send the second downlink CoMP user data to the central processing node, so that the central processing node sends the second downlink CoMP user data to at least two third-base-stations. The at least two base stations include the at least two second-base-stations and the at least two third-base-stations, the at least two second-base-stations are configured to send the first downlink CoMP user data in a coordinated manner, and the at least two third-base-stations are configured to send the second downlink CoMP user data in a coordinated manner.

Optionally, k number of second-base-stations in the at least two second-base-stations are connected to a second GW, the second bearer switching request message is specifically used to instruct the first GW to transmit the first downlink CoMP user data to another base station in the at least two second-base-stations than the k number of second-base-stations with the central processing node bypassed, and is further used to instruct the first GW to generate a forwarding bearer from the first GW to the second GW and send the first downlink CoMP user data to the second GW on the forwarding bearer, and the transmitting the first downlink CoMP user data to the at least two second-base-stations with the central processing node bypassed includes: transmitting the first downlink CoMP user data to the another base station in the at least two second-base-stations than the k number of second-base-stations with the central processing node bypassed, and sending the first downlink CoMP user data to the second GW on the forwarding bearer, so that the second GW transmits the first downlink CoMP user data to the k number of second-base-stations with the central processing node bypassed, where k is a positive integer.

Optionally, the user data is downlink CoMP user data, the downlink CoMP user data includes first downlink CoMP user data and second downlink CoMP user data, and the first bearer switching request message is specifically used to instruct the first GW to transmit the first downlink CoMP user data to at least two second-base-stations with the central processing node bypassed. The transmitter circuit 2303 is specifically configured to: bypass the central processing node when transmitting the first downlink CoMP user data to the at least two second-base-stations, and send the second downlink CoMP user data to the central processing node, so that the central processing node sends the second downlink CoMP user data to at least two third-base-stations. The second device includes the at least two second-base-stations and the at least two third-base-stations, the at least two second-base-stations are configured to send the first downlink CoMP user data in a coordinated manner, and the at least two third-base-stations are configured to send the second downlink CoMP user data in a coordinated manner.

Optionally, k number of second-base-stations in the at least two second-base-stations are connected to a second GW, the first bearer switching request message is specifically used to instruct the first GW to transmit the first downlink CoMP user data to another base station in the at least two second-base-stations than the k number of second-base-stations with the central processing node bypassed, and is further used to instruct the first GW to generate a forwarding bearer from the first GW to the second GW and send the first downlink CoMP user data to the second GW on the forwarding bearer, and the transmitting the first downlink CoMP user data to the at least two second-base-stations with the central processing node bypassed includes: transmitting the first downlink CoMP user data to the another base station in the at least two second-base-stations than the k number of second-base-stations with the central processing node bypassed, and sending the first downlink CoMP user data to the second GW on the forwarding bearer, so that the second GW transmits the first downlink CoMP user data to the k number of second-base-stations with the central processing node bypassed, where k is a positive integer.

Optionally, in another embodiment, the first device 2300 is a first base station, the second device is a first GW, the user data includes uplink non-CoMP user data, and the first bearer switching request message is specifically used to instruct the first device 2300 to transmit the uplink non-CoMP user data to the second device with the central processing node bypassed. The transmitter circuit 2303 is specifically configured to transmit the uplink non-CoMP user data to the second device with the central processing node bypassed.

Optionally, the user data further includes uplink CoMP user data, and the transmitter circuit 2303 is further configured to send the uplink CoMP user data to the central processing node in a coordinated manner together with at least one base station, so that the central processing node sends the uplink CoMP user data to the second device, where the first device 2300 and the at least one base station are configured to send the uplink CoMP user data in a coordinated manner.

Optionally, the receiver circuit 2302 is further configured to receive a third bearer switching request message sent by the central processing node, where the second bearer switching request message is used to instruct the first device 2300 to transmit data by way of the central processing node; and the transmitter circuit 2303 is further configured to send the user data to the second device according to the second bearer switching request message received by the receiver circuit 2302.

The foregoing methods disclosed in the embodiments of the present invention may be applied to the processor 2301, or implemented by the processor 2301. The processor 2301 may be an integrated circuit chip and has a signal processing capability. In an implementation process, the steps of the foregoing methods may be completed by means of an integrated logic circuit of hardware in the processor 2301 or an instruction in a form of software. The foregoing processor 2301 may be a general-purpose processor, a DSP, an ASIC, an FPGA or another programmable logic component, a discrete gate or a transistor logic component, or a discrete hardware component, and may implement or execute methods, steps, and logical block diagrams disclosed in the embodiments of the present invention. The general-purpose processor may be a microprocessor or the processor may be any conventional processor or the like. Steps of the methods disclosed with reference to the embodiments of the present invention may be directly executed and completed by means of a hardware decoding processor, or may be executed and completed by using a combination of hardware and software modules in a decoding processor. The software module may be located in a mature storage medium in the field, such as a RAM, a flash memory, a ROM, a programmable read-only memory, an electrically-erasable programmable memory, or a register. The storage medium is located in the memory 2304, and the processor 2301 reads information in the memory 2304 and completes the steps of the foregoing methods in combination with hardware of the processor 2301.

When the first device 2300 in FIG. 23 is a first GW, the first device 2300 can implement processes executed by first GWs in FIG. 4, FIG. 5, and FIG. 10 to FIG. 14, and processes executed by a first device in FIG. 7 when the first device is a first GW. To avoid repetition, details are not described herein again.

When the first device 2300 in FIG. 23 is a first base station, the first device 2300 can implement processes executed by first base stations in FIG. 6, FIG. 15, and FIG. 16, and processes executed by a first device in FIG. 7 when the first device is a first base station. To avoid repetition, details are not described herein again.

Figure 24:
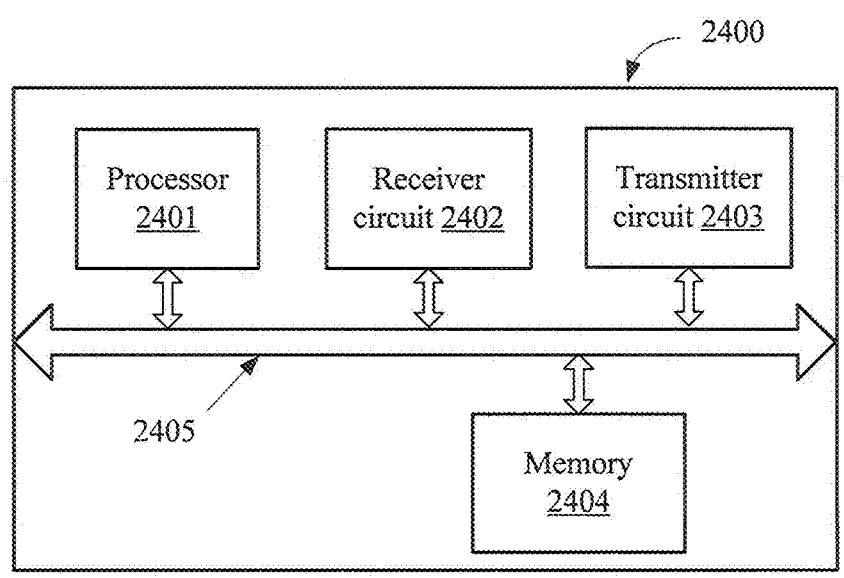
FIG. 24 is a block diagram of a base station according to another embodiment of the present invention.

FIG. 24 is a block diagram of a base station according to another embodiment of the present invention. A base station 2400 shown in FIG. 24 includes a processor 2401, a receiver circuit 2402, a transmitter circuit 2403, and a memory 2404.

The receiver circuit 2402 is configured to receive downlink coordinated multipoint transmission/reception CoMP user data sent by a gateway GW.

The transmitter circuit 2403 is configured to send a downlink scheduling request message to a central processing node, where the downlink scheduling request message is used to request the central processing node to perform downlink scheduling.

The receiver circuit 2402 is further configured to receive a scheduling result sent by the central processing node, where the scheduling result includes at least one of the following: Radio Link Control RLC segmentation information, coding and modulation information, or transmit power.

The transmitter circuit 2403 is further configured to send, in a coordinated manner together with at least one base station according to the scheduling result received by the receiver circuit 2402, the downlink CoMP user data received by the receiver circuit 2402, where the base station is a base station serving a target user of the downlink CoMP user data.

In this embodiment of the present invention, a base station receives downlink CoMP user data from a GW, and sends, according to a scheduling result of a central processing node, the downlink CoMP user data to a target user in a coordinated manner together with at least one base station, which can ensure transmission of the downlink CoMP user data.

In this embodiment of the present invention, the GW sends the downlink CoMP user data to the base station and the at least one base station with the central processing node bypassed.

Components of the base station 2400 are coupled together by using a bus system 2405, where in addition to a data bus, the bus system 2405 includes a power bus, a control bus, and a status signal bus. However, for clarity of description, various buses are marked as the bus system 2405 in FIG. 24.

Optionally, in an embodiment, the transmitter circuit 2403 is further configured to send an ACK message to the central processing node; the receiver circuit 2402 is further configured to receive a first message sent by the central processing node, where the first message is used to instruct the base station 2400 to delete a data copy of the downlink CoMP user data; and the processor 2401 is configured to delete the data copy of the downlink CoMP user data according to the first message received by the receiver circuit 2402.

Optionally, in another embodiment, the transmitter circuit 2403 is further configured to send a NACK message to the central processing node; the receiver circuit 2402 is further configured to receive a retransmission scheduling acknowledgement message or a first message sent by the central processing node, where the retransmission scheduling acknowledgement message is used to instruct the base station 2400 to send the downlink CoMP user data in a coordinated manner together with the at least one base station again, and the first message is used to instruct the base station 2400 to delete a data copy of the downlink CoMP user data; and the processor 2401 is configured to send the downlink CoMP user data in a coordinated manner together with the at least one base station again according to the retransmission scheduling acknowledgement message received by the receiver circuit 2402; or delete the data copy of the downlink CoMP user data according to the first message received by the receiver circuit 2402.

The foregoing methods disclosed in the embodiments of the present invention may be applied to the processor 2401, or implemented by the processor 2401. The processor 2401 may be an integrated circuit chip and has a signal processing capability. In an implementation process, the steps of the foregoing methods may be completed by means of an integrated logic circuit of hardware in the processor 2401 or an instruction in a form of software. The foregoing processor 2401 may be a general-purpose processor, a DSP, an ASIC, an FPGA or another programmable logic component, a discrete gate or a transistor logic component, or a discrete hardware component, and may implement or execute methods, steps, and logical block diagrams disclosed in the embodiments of the present invention. The general-purpose processor may be a microprocessor or the processor may be any conventional processor or the like. Steps of the methods disclosed with reference to the embodiments of the present invention may be directly executed and completed by means of a hardware decoding processor, or may be executed and completed by using a combination of hardware and software modules in a decoding processor. The software module may be located in a mature storage medium in the field, such as a RAM, a flash memory, a ROM, a programmable read-only memory, an electrically-erasable programmable memory, or a register. The storage medium is located in the memory 2404, and the processor 2401 reads information in the memory 2404 and completes the steps of the foregoing methods in combination with hardware of the processor 2401.

The base station 2400 in FIG. 24 can implement processes executed by serving base stations of target users of downlink CoMP user data in FIG. 4, FIG. 5, and FIG. 9 to FIG. 14. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not repeatedly described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, wherein the method comprises:
   receiving, by a central processing node, downlink user data from a first gateway (GW), wherein the downlink user data comprises downlink non-coordinated multipoint transmission/reception (non-CoMP) user data and downlink CoMP user data;
   sending, by the central processing node, the downlink user data to a corresponding base station, wherein the sending comprises: sending, by the central processing node, the downlink non-CoMP user data to a first base station, and sending the downlink CoMP user data to at least two base stations; and
   when an interface between the central processing node and the first GW is congested, sending, by the central processing node, a first bearer switching request message to the first GW, wherein the first bearer switching request message is used to instruct the first GW to bypass the central processing node when transmitting data; and, wherein
   the first base station is a base station serving a target user of the downlink non-CoMP user data,
   the at least two base stations are configured to send the downlink CoMP user data in a coordinated manner, and
   the first bearer switching request message is used to instruct the first GW to bypass the central processing node when transmitting the downlink non-CoMP user data to the first base station.

2. The method according to claim 1, wherein the downlink CoMP user data comprises first downlink CoMP user data and second downlink CoMP user data;
   the sending the downlink CoMP user data to at least two base stations comprises:
   sending the first downlink CoMP user data to at least two second-base-stations, and sending the second downlink CoMP user data to at least two third-base-stations; and, wherein
   the at least two second-base-stations are configured to send the first downlink CoMP user data in a coordinated manner, and the at least two third-base-stations are configured to send the second downlink CoMP user data in a coordinated manner; and
   after the sending, by the central processing node, a first bearer switching request message to the first GW, the method further comprises:
   when it is determined that the interface is still congested, sending, by the central processing node, a second bearer switching request message to the first GW, wherein the second bearer switching request message is used to instruct the first GW to bypass the central processing node when transmitting the first downlink CoMP user data to the at least two second-base-stations.

3. The method according to claim 2, wherein k number of second-base-stations in the at least two second-base-stations are connected to a second GW, the second bearer switching request message is specifically used to instruct the first GW to bypass the ceneral processing node when transmitting the first downlink CoMP user data to a base station in the at least two second-base-stations that is not in the k number of second-base-stations, and is further used to instruct the first GW to generate a forwarding bearer from the first GW to the second GW and send the first downlink CoMP user data to the second GW on the forwarding bearer, and the method further comprises:

sending, by the central processing node, a bearer generation request message to the second GW, wherein the bearer generation request message comprises identification information of the k number of second-base-stations, and the bearer generation request message is used to instruct the second GW to generate bearers from the second GW to the k number of second-base-stations, so that the second GW transmits, to the k number of second-base-stations, on the bearers with the central processing node bypassed, the first downlink CoMP user data received from the first GW; wherein k is a positive integer.

4. The method according to claim 1, wherein the downlink user data is downlink CoMP user data, and the downlink CoMP user data comprises first downlink CoMP user data and second downlink CoMP user data; and the sending, by the central processing node, the downlink user data to a corresponding base station comprises:

sending, by the central processing node, the first downlink CoMP user data to at least two second-base-stations, and sending the second downlink CoMP user data to at least two third-base-stations; wherein the at least two second-base-stations are configured to send the first downlink CoMP user data in a coordinated manner, the at least two third-base-stations are configured to send the second downlink CoMP user data in a coordinated manner, and the first bearer switching request message is specifically used to instruct the first GW to bypass the central processing node when transmitting the first downlink CoMP user data to the at least two second-base-stations.

5. The method according to claim 4, wherein k number of second-base-stations in the at least two second-base-stations are connected to a second GW, the first bearer switching request message is specifically used to instruct the first GW to transmit the first downlink CoMP user data to another base station in the at least two second-base-stations than the k number of second-base-stations with the central processing node bypassed, and is further used to instruct the first GW to generate a forwarding bearer from the first GW to the second GW and send the first downlink CoMP user data to the second GW on the forwarding bearer, and the method further comprises:

sending, by the central processing node, a bearer generation request message to the second GW, wherein the bearer generation request message comprises identification information of the k number of second-base-stations, and the bearer generation request message is used to instruct the second GW to generate bearers from the second GW to the k number of second-base-stations, so that the second GW transmits, to the k number of second-base-stations, on the bearers with the central processing node bypassed, the first downlink CoMP user data received from the first GW; wherein k is a positive integer.

6. The method according to claim 2, wherein the method further comprises:

receiving, by the central processing node, a downlink scheduling request message sent by a serving base station that is of a target user of the first downlink CoMP user data and that is in the at least two second-base-stations; and performing, by the central processing node, downlink scheduling, and sending a scheduling result to the at least two second-base-stations; wherein the scheduling result comprises at least one of the following: Radio Link Control RLC segmentation information, coding and modulation information, or transmit power.

7. The method according to claim 6, wherein the method further comprises:

receiving, by the central processing node, an ACK message sent by the base station serving the target user of the first downlink CoMP user data; and sending, by the central processing node, a first message to the at least two second-base-stations, wherein the first message is used to instruct the at least two second-base-stations to delete a data copy of the first downlink CoMP user data.

8. The method according to claim 6, wherein the method further comprises:

receiving, by the central processing node, a NACK message sent by the base station serving the target user of the first downlink CoMP user data; and when a quantity of retransmissions does not reach a preset maximum quantity of retransmissions, sending, by the central processing node, a retransmission scheduling acknowledgement message to the at least two second-base-stations, wherein the retransmission scheduling acknowledgement message is used to instruct the at least two second-base-stations to send the first downlink CoMP user data in a coordinated manner again; or when a quantity of retransmissions reaches a preset maximum quantity of retransmissions, sending, by the central processing node, a first message to the at least two second-base-stations, wherein the first message is used to instruct the at least two second-base-stations to delete a data copy of the first downlink CoMP user data.

9. The method according to claim 1, wherein the method further comprises:

when it is determined that the interface is idle, sending, by the central processing node, a third bearer switching request message to the first GW, wherein the third bearer switching request message is used to instruct the first GW to transmit the downlink user data to the corresponding base station by way of the central processing node.

10. A central processing node, wherein the central processing node comprises:

a receiving unit, configured to receive uplink user data, wherein the uplink user data comprises uplink non-coordinated multipoint transmission/reception (non-CoMP) user data sent by a first base station, and receive the uplink CoMP user data from at least two second-base-stations, wherein the first base station is a base station serving a user sending the non-CoMP user data, the at least two base stations are configured to receive the uplink CoMP user data in a coordinated manner; and a sending unit, configured to send, to a first gateway GW, the uplink user non-CoMP data and the uplink user CoMP data received by the receiving unit; and, wherein the sending unit is further configured to: when it is determined that an interface between the central processing node and the first GW is congested, send a first bearer switching request message to the first base station, wherein the first bearer switching request message is used to instruct the first base station to transmit the uplink non-CoMP user data to the first GW with the central processing node bypassed.

11. The central processing node according to claim 10, wherein the sending unit is further configured to:
when it is determined that the interface is idle, send a second bearer switching request message to the first base station, wherein the second bearer switching request message is used to instruct the first base station to transmit the uplink non-CoMP user data to the first GW by way of the central processing node.

12. A first device, wherein the first device comprises:
a sending unit, configured to send user data to a central processing node, so that the central processing node sends the user data to a second device; and
a receiving unit, configured to receive a first bearer switching request message sent by the central processing node, wherein the first bearer switching request message is used to instruct the first device to bypass the central processing node when transmitting data; and, wherein
the user data comprises downlink non-coordinated multipoint transmission/reception (non-CoMP) user data and downlink CoMP user data, the first bearer switching request message is used to instruct the first device to bypass the central processing node when transmitting the downlink non-CoMP user data to a first base station, and the first base station is a base station serving a target user of the downlink non-CoMP user data;
the sending unit is configured to: bypass the central processing node when transmitting the downlink non-CoMP user data to the first base station, and send the downlink CoMP user data to the central processing node, so that the central processing node sends the downlink CoMP user data to at least two base stations, wherein the at least two base stations are configured to send the downlink CoMP user data in a coordinated manner;
the sending unit is further configured to send the user data to the second device according to the first bearer switching request message received by the receiving unit, wherein the second device comprises the first base station and the at least two base stations.

13. The first device according to claim 12, wherein the first device is a first gateway GW, and the second device is a base station corresponding to the user data.

14. The first device according to claim 12, wherein the downlink CoMP user data comprises first downlink CoMP user data and second downlink CoMP user data;
the receiving unit is further configured to receive a second bearer switching request message sent by the central processing node, wherein the second bearer switching request message is used to instruct the first device to transmit the first downlink CoMP user data to at least two second-base-stations with the central processing node bypassed; and
the sending unit is further configured to: transmit, according to the second bearer switching request message received by the receiving unit, the first downlink CoMP user data to the at least two second-base-stations with the central processing node bypassed, and send the second downlink CoMP user data to the central processing node, so that the central processing node sends the second downlink CoMP user data to at least two third-base-stations; wherein
the at least two base stations comprise the at least two second-base-stations and the at least two third-base-stations, the at least two second-base-stations are configured to send the first downlink CoMP user data in a coordinated manner, and the at least two third-base-stations are configured to send the second downlink CoMP user data in a coordinated manner.

15. The first device according to claim 14, wherein k number of second-base-stations in the at least two second-base-stations are connected to a second GW, and the second bearer switching request message is specifically used to instruct the first GW to bypass the central processing node when transmitting the first downlink CoMP user data to a base station in the at least two second-base-stations that is not in the k number of second-base-stations, and is further used to instruct the first GW to generate a forwarding bearer from the first GW to the second GW and send the first downlink CoMP user data to the second GW on the forwarding bearer; and
the transmitting the first downlink CoMP user data to the at least two second-base-stations with the central processing node bypassed comprises:
bypassing the central processing node when transmitting the first downlink CoMP user data to a base station in the at least two second-base-stations that is not in the k number of second-base-stations, and sending the first downlink CoMP user data to the second GW on the forwarding bearer, so that the second GW transmits the first downlink CoMP user data to the k number of second-base-stations with the central processing node bypassed; wherein
k is a positive integer.

16. The first device according to claim 13, wherein the user data is downlink CoMP user data, the downlink CoMP user data comprises first downlink CoMP user data and second downlink CoMP user data, and the first bearer switching request message is specifically used to instruct the first GW to bypass the central processing node when transmitting the first downlink CoMP user data to the at least two second-base-stations; and
the sending unit is specifically configured to: bypass the central processing node when transmitting the first downlink CoMP user data to the at least two second-base-stations, and send the second downlink CoMP user data to the central processing node, so that the central processing node sends the second downlink CoMP user data to at least two third-base-stations; wherein
the second device comprises the at least two second-base-stations and the at least two third-base-stations, the at least two second-base-stations are configured to send the first downlink CoMP user data in a coordinated manner, and the at least two third-base-stations are configured to send the second downlink CoMP user data in a coordinated manner.

17. The first device according to claim 16, wherein k number of second-base-stations in the at least two second-base-stations are connected to a second GW, and the first bearer switching request message is specifically used to instruct the first GW to transmit the first downlink CoMP user data to another base station in the at least two second-base-stations than the k number of second-base-stations with the central processing node bypassed, and is further used to instruct the first GW to generate a forwarding bearer from the first GW to the second GW and send the first downlink CoMP user data to the second GW on the forwarding bearer; and the transmitting the first downlink CoMP user data to the at least two second-base-stations with the central processing node bypassed comprises:

transmitting the first downlink CoMP user data to the another base station in the at least two second-base-stations than the k number of second-base-stations with the central processing node bypassed, and sending the first downlink CoMP user data to the second GW on the forwarding bearer, so that the second GW transmits the first downlink CoMP user data to the k number of second-base-stations with the central processing node bypassed; wherein k is a positive integer.

* * * * *